United States Patent [19]

Sutherland

[11] Patent Number: 5,515,477
[45] Date of Patent: May 7, 1996

[54] NEURAL NETWORKS

[76] Inventor: John Sutherland, 27 Ontario Avenue Apartment 3, Hamilton, Ontario, Canada

[21] Appl. No.: 133,196
[22] PCT Filed: Apr. 22, 1992
[86] PCT No.: PCT/CA92/00162
  § 371 Date: Oct. 20, 1993
  § 102(e) Date: Oct. 20, 1993
[87] PCT Pub. No.: WO92/18946
  PCT Pub. Date: Oct. 29, 1992

[30] Foreign Application Priority Data

Apr. 22, 1991 [CA] Canada .................. 2040903

[51] Int. Cl.$^6$ .................. G06F 15/80; G06F 15/18
[52] U.S. Cl. .................. 395/27; 395/21; 395/24; 382/156
[58] Field of Search .................. 395/27, 21–25; 382/14, 15, 153–159

[56] References Cited

U.S. PATENT DOCUMENTS

| | | | |
|---|---|---|---|
| 4,979,126 | 12/1990 | Pao et al. .................. | 395/24 |
| 5,040,230 | 8/1991 | Takatori et al. .................. | 382/15 |
| 5,050,095 | 9/1991 | Samad .................. | 395/23 |
| 5,214,745 | 5/1993 | Sutherland .................. | 395/22 |

OTHER PUBLICATIONS

Grant et al, "Synthesis of a class of artificial neural network using a CMOS current mode building block approach"; IEEE Colloquim on 'Advances in Analogue VLSI', p. 8/1–10, 14 May 1991.

Tsai et al, "An associative memory knowledge base for diagnostic and high level control functions"; Proceedings of the 2nd international IEEE conference on tools for artificial intelligence, p. 283–8, 6–9 Nov. 1990.

Specht, "Probabalistic nerual networks for classification, mapping, or associative memory"; IEEE International Conference on Neural Networks, p. 525–32 vol. 1, 24–27 Jul. 1988.

*Primary Examiner*—David K. Moore
*Assistant Examiner*—Tariq Rafiq Hafiz

[57] ABSTRACT

The present invention relates to adaptive information processing systems, and in particular to associative memories utilizing confidence-mediated associations, and especially neural network systems comprising an auto-organizational apparatus and processes for dynamically mapping an input onto a semantically congruous and contemporaneously-valid, learned response. In particular the present invention relates to such an associative memory system in which provision is made for improving the congruence between an associative memory, by impressing a desired response on an associative memory mapping based on complex polar values.

21 Claims, 21 Drawing Sheets

Figure 1

| P/N Ratio | Average Analog Error in Generated Response (% full scale) |
|---|---|
| 0.05 | 2.5 |
| 0.1 | 3.4 |
| 0.15 | 4.2 |
| 0.2 | 4.7 |
| 0.25 | 5.2 |
| 0.3 | 5.6 |
| 0.35 | 6.0 |
| 0.4 | 6.3 |
| 0.45 | 6.6 |
| 0.5 | 6.9 |

Figure 7A
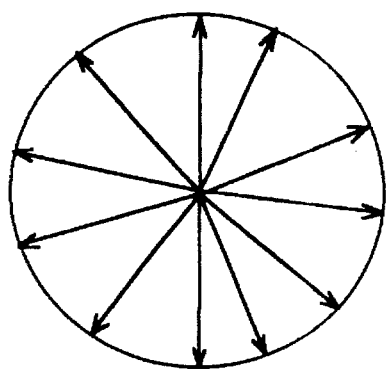
Figure 7B
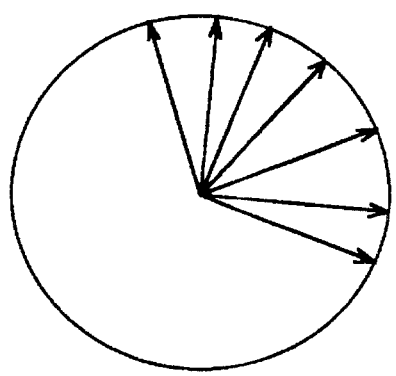
Figure 8
$$\begin{pmatrix} 0 & 0 & 0 & 1 \\ 0 & 1 & 0 & 0 \\ 0 & 0 & 0 & 0 \\ 0 & 0 & 0 & 0 \end{pmatrix} \rightarrow \begin{pmatrix} 0 & 0 & 1 & 0 \\ 1 & 0 & 0 & 0 \\ 0 & 0 & 1 & 0 \\ 0 & 1 & 0 & 0 \end{pmatrix} \rightarrow \cdots \begin{pmatrix} 0 & 1 & 0 & 0 \\ 1 & 1 & 0 & 1 \\ 0 & 1 & 1 & 0 \\ 0 & 1 & 0 & 1 \end{pmatrix}$$

AUDITORY INPUT

VISUAL INPUT

Figure 22

Stimulus Field Index

|   | 1 | 2 | 3 | 4 | 5 | 6 | 7 | 8 | 9 | 10 |
|---|---|---|---|---|---|---|---|---|---|----|
| 1 | $X_{11}$ | $X_{12}$ | · | · | · | · |   |   |   |    |
| 2 | $X_{21}$ | · | · | · | · |   |   |   |   |    |
| 3 | · | · | · | · |   |   |   |   |   |    |
| 4 |   |   |   |   |   |   |   |   |   |    |
| 5 |   |   |   |   |   |   |   |   |   |    |

Response Index

Coarse Targeting

Fine Targeting and Identification

Navigational Control

Stimulus
(ground topography)

Desired response
(axial coordinates)

Recurrent Associator

Visual Field
(associates from)

Visual Field
(associates to)

NEURAL NETWORKS

TECHNICAL FIELD

The present invention relates to adaptive information processing systems, and in particular to associative memories utilizing confidence-mediated associations, and especially neural network systems comprising an auto-organizational apparatus and processes for dynamically mapping an input onto a semantically congruous and contemporaneously-valid, learned response.

BACKGROUND OF ART

Broadly speaking, an associative memory system is one in which stimulus/response pairs of information are stored in such a way that the introduction of a stimulus pattern results in the recall of a memory associated response. Memory systems of this type have a very broad range of potential applications including, for example, logical operations management, pattern recognition, and image interpolation.

Traditional associative processes, such as those that are often used in artificial intelligence applications, are dependent on explicitly predefined rule sets that are externally impressed on an associative memory. Expert systems are examples of such traditional architectures. Such expert systems are rules-based paradigms that are managed by an inferential engine. These follow an orthodox von Neumann approach by providing a deterministic software/hardware relationship that follows a series of pre-declared relationships and sequential instructions formatted as predetermined sets of IF—THEN statements. They are inherently limited to those associations that are expressly pre-ordained or are expressly permitted to be logically deduced by preestablished inferential rules. There is no intrinsic adaptive capability in these processes. In consequence there is no dynamic responsiveness to changing environments or, more generally, any ability to develop a set of input-appropriate responses in the absence of an impressed set of applicable rules specifically intended to deal with a changed or changing or otherwise unknown environment. Moreover, as with any purely heuristic programming, the more complex the application, the greater the number of rules that are required, and the proportionately longer the processing time required to deal with those rules. There is a general acceptance that these short comings limit the practical usefulness of pre-defined-rules-based approaches to associative memory systems.

Neural networks, on the other hand, generate their own rules of association through a learning process that draws on the networks exposure to either supervised or unsupervised input data samples drawn from a statistical universe. These systems have, to various degrees, some ability to make generalizations about that universe as a whole, based on the input sampling.

Neural networks are associative memory systems comprising strategic organizations, (architectures), of processing elements. Individually, these elements are each analogous to an individual neuron in a biological system. Individual processing elements have a plurality of inputs, which are functionally analogous to the dendritic processes of a neuron cell. As such, these elements are conditioned in accordance with a paradigm over the course of an ongoing learning process, to dynamically assign and assert a ceratin "weight", based on the current state of the systems knowledge, to the respective inputs. The associative "weights" form the data that is stored in the associative memory of the system.

Digital computer implementations of neural networks typically employ numerical methodologies to realize the desired associative recall of stimulus-appropriate responses through weighted summation of the inputs in a digital computing environment. These virtual networks take advantage of the current commercial availability of von Neumann machines, which while inherently deterministic, are nevertheless capable of being used to advantages attached to stochastic architectures in neural network hardware implementations.

An early forerunner to modern neural networks, howsoever they may now be implemented, was an actual hardware device that came to be known as the Perceptron. This was a pattern classification system that could identify both abstract and geometric patterns. A grid of photocells where arranged to receive a primary optical stimulus. These photocells where in turn randomly connected to a plurality of associator elements which perform the functions associated with the front end of what is now recognized as the inputs (or notional dendritic processes) of a neural network processing element. When the cumulative electrical inputs from the cells to the associators units exceeded a certain threshold, the associator units triggered response units to produce an output signal.

The Perceptron, regardless of the form of its hardware implementation, proved to have serious inherent limitations. These are concerned with the systems practical inability to learn certain known functions, in particular the logical "XOR" function of Boolean algebra. In order to be able to learn this type of parity function, the Perceptron paradigm would require either an architecture of multiple interconnected layers of weighted processing elements, or alternatively a system having 2 to the N hidden processing elements. The Perceptron could not properly adjust more than one layer of modifiable weights, thus precluding the first alternative. The alternative of using 2 to the N hidden processing units presents three fundamental problems: There must be 2 to the N processing units in the system for all possible functions which the system might ever have to learn, (which amounts to system design by crystal ball gazing); The number of processing elements required in any such system increases exponentially with the number of required inputs to solve the functions which can be prescribed, and quickly runs into the billions; There is empirical evidence that with large numbers of hidden processing elements, the system loses the ability to formulate reliable generalizations. With these inherent limitations, it was clear that such networks could not emulate or even approximate the functions or efficiencies of the human brain.

The advent of back propagation paradigms for establishing a weighted associative memory for evaluating new stimuli as it is presented to the inputs of the processing elements, represented a major step towards overcoming some of the problems associated with the Perceptron paradigm. For example, back propagation incorporates an error handling mechanism that overcomes at least some of the "linear separability classification" limitations associated with the Perceptron. Back propagation establishes a processing assumption that all processing elements in any given layer of a network architecture introduce errors in the assignment of a response that issues from that layer, to any stimulus received from the preceding layer. The responsibility for that error is then quantified and distributed throughout the weightings of each of the processing element inputs in the previous layer, down to and including the inputs to the network. This learning process is inherently slow, in that several iterations of the back propagation are required before the desired convergence of error terms (ie "dilution" of information error) is achieved.

Current state-of-the-art neural networks can be, in general, all be classified as gradient descent models, in which the network data is stored as "weights" in the manner described above.

In operation these networks work by having weighted, scaler input values summed by the processing element, then normalized in order to maintain some degree of stability in the distribution of generated output response values. Typically, normalization involves a thresholding or scaling of the summation product. Variations on the sigmoid function are usually used for this purpose.

A number of examples of these subsequent developments in neural network technology have pursued models predicated on natural biological systems. One of the better known was the development of so-called "Hopfield Nets" in the early 1980's. Hopfield's model was amongst the first to clearly represent neuron operation as a specific thresholding operation and illustrated memory as information stored in the interconnections between processing elements, which where cast as a minimum energy function.

One example of a gradient descent network is the matrix algebra based associative memory model that is described in "Neural Networks and Physical Systems with Emergent Collective Computational Abilities", J. J. Hopfield, Proc Narl. Academy of Science, USA, 1982, Vol. 79, pp 2554–2558. This model utilizes feedback and non-linear thresholding to force the output pattern to be the stored pattern which most closely matches the input pattern. A major drawback of this model is the large storage and computational effort that is inherently required for the manipulation of an association matrix memory that is used in the model. In essence this represented a special case of the more general features of the Cohen-Grossberg networks, in which the processing elements took on any real activation value resulting from a sigmoid output threshold function alternating between the minimum and maximum values to define that activation value of the processing element. The response to any external stimulus to one of these networks was shown to converge to an equilibrium based on an energy of Lyapunov function.

With the ongoing advancement of neural network technology, networks have been further enhanced by various multi-layer architectures. Weighting of processing element inputs through normalization and competition have continued to improve some of the drawbacks that nevertheless continue to be associated with neural networks.

By way of example, and in addition to all the other short-comings set out above, all of these networks continue to suffer from an inherent form of input information truncation, that is in part a legacy of von Neumann architectures. As with any system, information loss results in an increase in error rates, and error remediation in turn requires that compensatory processing strategies be adopted. That approach in its own turn results in increased processing (both learning and response) time by depending on large numbers of computational and sampling iterations (in the hope of "diluting" out the errors by increasing the sample size), with correspondingly increased memory storage space requirements. Moreover such remediation can at best only diminish the error that is intrinsically introduced by a gradient response regimen. It cannot eradicate it. Accordingly, while normalization in gradient descent networks is essential, it also results in collateral degradation of the informational value of input data. Note too, that the making of generalizations based on the erroneous precepts that can follow from information loss, limits the reliable application of such networks to linearly non-separable stimuli.

A good example of this kind of remediation problem is associated with a connectionist neural network architecture sometimes referred to as a Boltzman machine, that utilizes a back propagation paradigm. This type of machine is intended to deal with what one author has labelled "computational gangrene". This problem is implicit in any deterministic approach that is taken to problem solving, in that a mistaken decision in a deterministic path may foreclose on any possibility of downstream remediation, thereby forever cutting-off the correct interpretative pathway that leads to the problems correct, or at least optimal solution. While neural networks in general, go some distance to ameliorating this problem, it continues to exist.

Boltzman machines are equilibrium-seeking connectionist machines in which processing elements exhibit binary (on-off) behaviour in response to input stimuli. The response of such a processing element in any given circumstance is determined by both the weighted signals passed along by neighbouring processing elements, and also by a probabilistic signal, thus rendering the response stochastic. The behaviour of such a machine can be described in terms of Boltzman's thermodynamic equations, which allow that even though the response states of individual processing units cannot be predicted, the overall equilibrium response of the network is resolvable. In the meantime, the internal "randomness" of individual processing elements response states that contributes to the Boltzman machines overall "directed of non-random" response can help the network to avoid getting stuck in "locally attractive" but "globally sub-optimal" solutions, and thereby side steps some of the risk of computational gangrene that arises in strictly deterministic von Neumann machines. It has been observed, however, that while Boltzman machines have a greater probability of reaching better solutions than are possible with von Neuman architectures, the existence of "noise" in real life problems poses a problem. Theoretically, a Boltzman machine will of necessity arrive at the optimal solution to any of a limited number of specific classification problems, provided that it is given an unlimited amount of time for that purpose. The exigency of real time problems rarely permits protracted problem solving exercises of any significant duration, however, and the inability of Boltzman machines to dependably resolve problems within a reasonable time, inherently limits their usefulness.

Accordingly, there remains a need in the art for alternatives to current neural network systems.

DISCLOSURE OF INVENTION

In accordance with the present invention there are provided associative memory systems for the purposes of which complex polar values are used as semantic input values and are drawn, respectively, from real-valued domains of semantically congruous stimuli and associated stimulus-responses. Combinations of stimuli and responses can then be correlated. In correlated form, the imaginary coefficients embody and preserve the semantic information that is relevant to each of the stimulus/response associations under consideration. The real coefficient is then available for use as a semantics-independent discriminator for adjudicating the associative merits that underlay any subsequent tests of any given stimulus/response combination(s), relative to the other possible combinations within the sampled associative domain. The correlation preferably takes the form of an outer product of respective stimulus and response matrices, to produce a correlation matrix.

Perhaps of even greater significance is the fact that these complex polar values, in accordance with the present invention, permit certain aspects of associative memory (ie. temporally spaced information) to be retrievably stored at very high densities in a superimposed vectorial relation on a memory storage substrate.

In an especially preferred aspect of the present invention, that discriminator ultimately takes the form of a confidence value drawn from a relatively-probabilistic range.

In another especially preferred form of the present invention, there are provided neural network machines, which empirically "learn" confidence values and then utilize them as magnitude coefficients in the assignation of efficacy of operation or dominance over generated mappings within the above mentioned correlation matrix values.

The fact that the mathematical combinations of all stimuli and responses remain addressable in memory, regardless of the discrimination value that may be attached to any of them at any given time, is significant to this aspect of the invention. In particular, this helps to avoid the pitfalls that give rise to "computational gangrene", in that all associated combinations of responses and stimuli remain in memory, against the possibility that ongoing experience might later elevate their respective discrimination values and hence the relevance of any such association to the real world of stimulus and desired response. The flexibility of this approach ensures that the network has the potential to avoid getting stuck in "locally attractive" but "globally sub-optimal" resolutions.

Again, the approach taken in the present invention also yields high association storage density in a selected memory storage means, and requires relatively few iterative operations for setting the standards of acceptance or rejection for any particular association between any given stimulus and any given response.

More particularly, however, the present invention relates to modifications in the mappings that define the association between stimuli and their associated responses, such as usually take place over time. Changes of this type might be driven simply by the inevitable increase in the sampling size of the stimulus and response domains in any given case, or on the other hand might be the result of changing environmental factors that effect qualitative or quantitative aspects of the association between a stimulus and a response. Examples of such circumstances in optical sensing systems might arise when external lighting effects contrast values, or simply where a scanner lens accumulates environmental debris during the normal course of its use, but which alters the input in an extraneous way that is not tied to the semantic relationship between a given stimulus and a desired response. In any case systems such as those generally described immediately herein above, can be undesirably effected by undisciplined learning paradigms. It is possible, for example, that learning (anthropomorphically speaking), or perhaps more accurately "new knowledge acquisition", will progress independently from knowledge previously accumulated by the system. In some cases little or no control is exercised over the degree to which a most recently encoded relationship will displace earlier stimulus-response mappings. For example, within the holographic based associative memory described in J. G. Sutherland, "A Holographic Model of Memory Learning and Expression" International Journal of Neural Systems, Volume 1, No.3 (1990), pp. 259–267, many similar response stimulus associations tend to have a significantly distorting influence on all mappings that are enfolded within the correlation matrix, giving rise to semantically incongruous assymetries in the distribution of values that make up an associative pattern. Such a circumstance in turn favors heavily reinforced stimulus/stimulus-response elements at the expense of the broader range of experience that reposes in the correlation matrix at large. In any extreme manifestation, such a trend is a manifestly undesirable phenomenon which is overtly prejudicial to the reliability of associations drawn from the learned associative pattern in question.

In accordance with one aspect of the present invention, therefore, there is provided an artificial, auto-associative, modifiable memory device comprising an at least one input terminal for receiving a plurality of semantic inputs each corresponding to ones of semantically congruous stimuli and responses of an associated pattern. These inputs are characterized by assigned, representative ones of Argand domain vector values, as has already been mentioned herein above, with each such vector value having a coefficient of magnitude within a range of a probabilistic distribution, and a phase angle coefficient representative of a predetermined semantically relevant attribute of the stimuli and associated responses, as the case may be. Each such value constitutes an element within respective ones of stimulus and stimulus response value sets. The device also includes addressable, re-writable memory storage means having an memory transaction management means. Exemplary of such devices are re-writable media memory storage devices and read-only memory for managing memory address transactions involving such means and media.

Furthermore, a processor is arranged in value communicating relation with the at least one input terminal and with the address transaction management memory of the memory storage means. Typical hardware processors that are currently commercially available, include a number of sub-processors that are relegated specific tasks under a central processor's control. Cumulatively, however, the processor at large is operable to perform a variety of tasks, including those specifically enumerated below:

The following describes the learning (encoding) operation associated with a single neural element:

1. receive the above mentioned input values in an associated pair of sets comprising a stimulus set having a plurality of stimulus values, and a response set comprising a single value for a response corresponding to those stimuli values, from the input terminal;

1a. translate the elements contained within both of the above associated pair of stimulus and response sets into complex values each having a phase angle and a magnitude coefficient, whereby phase orientation of each complex valued element is representative (and in some instances proportional) to the corresponding real valued element within the input set. Form the complex conjugate of all elements within the stimulus set for the above association.

1b. assign a coefficient of magnitude value to each complex element within the above associated pair of stimulus and response sets. This coefficient of magnitude assigns a level of confidence associated with each of the elements within the respective stimulus and response sets.

2. combine sets of these inputs as an outer product thereof to produce an associative memory mapping between associated pairs of elements from the respective sets. This then, comprises an initial associative mapping in the form of a complex valued vector phase difference set, which is representative of a contemporaneous state of association between the represented plurality of associated stimuli and responses;

3. communicate that initial associative mapping, to the memory transaction management means to thereby affect an addressable, re-writable, associative memory mapping within the storage means;

4. receive an additional associative stimulus/desired response input from the at least one input terminal. Translate the elements stored within both the above sets of stimulus and response values into complex values, as defined in steps 1a and 1b above.

5. combine the stimulus input and the correlation set stored within the storage means as defined in step 3 as an inner product thereof, to generate a response set comprised of a set of complex values. This response having been generated from the new stimulus transformation through the prior encoded mapping substrate and correlation set stored therein.

6. evaluate the set of vector differences in the Argand plane between the responses generated from the stimulus transformation through the correlation set mapping as set out in step 5 above, and the complex valued desired response retrieved from the input terminal as described in step 4.

7. retrieve the complex valued response vector difference evaluated in step 6 and the complex valued stimulus input in step 4, combining these sets as an outer product thereof to produce an associative memory mapping between the elements in the new stimulus set to the complex valued response vector phase difference correlation set representative of a contemporaneous mapping of the new stimulus state to the complex valued response difference set, with the difference set determining the vectorial difference between the new stimulus induced generated response through the prior correlation mapping as evaluated in step 5 and the desired response retrieved in step 4.

8. perform and element by element addition of each element generated in the set product evaluated in step 7 above and the correlation set containing the previously encoded stimulus to response mappings and stored within the memory storage means. This addition modifies the correlation set stored within the substrate to produce a nearly exact mapping from the new associated stimulus to desired response se pair retrieved in step 4.

The follow operations describe the response recall function of one neural element according to the present invention:

a. receive a multi-valued stimulus set from the input terminal;

b. translate the elements stored within the above stimulus set into complex values, whereby the complex orientation of each element is representative of, (and sometimes proportional to), the real value of the corresponding element within the stimulus input set received from the input terminal as defined in step a. Form the complex conjugate of all elements within the stimulus set.

c. assign a magnitude value to each element within the above set of values converted to the complex domain as indicated above. The value of magnitude assigns a level of confidence associated with each of the complex elements within the stimulus and response sets.

d. combine the stimulus set prior converted to a set of composite complex values and the correlation set stored within the mapping substrate as an inner product, whereby each complex element within the stimulus set is multiplied by the corresponding element in the correlation set and a sum of products evaluated over the set of the product terms which are associably connected to a particular element in the response set. This sum of products is then re-normalized to within a probabilistic range by a factor "c" evaluated from the complex terms comprising the stimulus input field whereby the factor "c" may be evaluated from the sum of magnitude coefficients over the stimulus set. The factor "c" may alternatively be evaluated by heuristic means to be any real valued coefficient desirably employed to bound the generated complex response magnitude coefficient to within a preestablished probabilistic bound. This procedure performs a mapping of the new stimulus through the correlations set containing a plurality of stimulus to response analog mappings previously encoded into the mapping substrate. The new stimulus is transformed through all of the mappings vectorially superposed therein in a parallel or simultaneous manner in the generation of a response recall.

The device according to the present invention also includes output terminal means arranged in value communicating relation to the processor means for receiving and propagating the at least one associated response vector value to a means for generating a response represented thereby.

Over the course of its operation, the forgoing device inherently moderates the impact of, (ie., anthropomorphically speaking, the amount of attention that is paid to), newly acquired information on a pre-existing stimulus/stimulus-response association mapping. As a consequence of this moderation, only new associations relating to a particular pattern will tend to manifest with maximal effect on that patterns weighted memory values. Conversely, re-encoding of previously "learned" associations between a given stimulus and its associated response for a given pattern will introduce proportionately lesser degrees of effect on the complex valued elements comprising the correlation set having been stored within the mapping substrate. This functionality, in operation inherently constrains the values of the magnitude coefficient of the generated complex valued responses during the operation of the device, to within the range of pre-established probabilistic bounds. The devices operation thereby bounds the distribution of magnitudes for responses engendered from the associative memory pattern, in a semantically coherent way, by implicit assignation of a confidence level in that corresponding analog information phase representation. This confidence level is generally bounded within a probabilistic domain. This occurs notwithstanding any countervailing influences that might otherwise have manifest, (as a result of any semantically disproportionate reinforcement of one or more particular stimulus/stimulus-response association weightings within the pattern in question), during operation of the device. From a practical point of view, this characteristic of the device (sometimes referred to as reinforcement learning) according to the present invention allows associative patters to deal with semantic permutations on input values that relate to such things as, for example, perceptual differences affecting input values that are attributable to such things as scale, translation or rotation, contrast, brightness, etc., which might vary over the course of the devices operation.

In accordance with another aspect of the present invention, there is provided a device substantially as set forth above, and wherein the inputs are inputs from a plurality of semantically discrete associative patterns of stimuli and stimulus-responses, (having substantially mutually non-interfering(non-identical) Argand domain value assignments in their respective sets). Each such pattern has corresponding ones of initial and revised associative-pattern vector difference matrices, and the processor is further operable to:

combine respective ones of associative response generated by a new stimulus mapping through the correlation set, and the desired associative response for that stimuli, whereby complex valued vector differences may be evaluated between the above two response vector sets and through respective vector subtraction transformations, to produce respective ones of updated multiple- pattern superposed correlation sets; and, communicate the initial and updated multiple-superposed-pattern correlation matrices to the address transaction memory to thereby affect respectively, initial and updated addressable, rewritable, semantically co-congruous, inter-set associative memory mappings of each such pattern within a common Argand domain representation in the storage means.

A relatively few successive iterations of the ongoing "supervised learning" according to the last above described device according to the present invention, will implicitly increase the devices ability to resolve between semantically relevant differences between outwardly similar elements of mapped associations represented in the correlation matrix as a whole. This functionality enhances the reliability of inter-element resolution between diverse association patterns, in correlation sets in which use has been made of first or higher order product terms of "statistics", (described in greater detail below). Not only is there a convergence of the association mapping between generated response vectors derived from stimuli elements that are semantically-isometric over a suite of patterns, but there is also a collateral divergence of the association mapping between generated response vectors derived from semantically-non-isometric elements of distinct stimulus patterns. These convergence and divergence trends both contribute to an overall decrease in the average error rate in subsequent response generation, which for large association patterns, asymptotically approaches negligible error levels on response recall and correspondingly allows the system to extract of amplify features that define isomerisms within the suite of learned stimulus-response associations. This feature of extraction may be realized even over high levels of abstraction in the evaluation of higher order statistics, as described elsewhere herein. Error rates of about 2% or less, as measured in terms of an analog input value, can be achieved.

The assignation of real values to inputs is another aspect of the present invention. Such can be accomplished in any number of ways, as will become apparent to the person skilled in the art on reading these presents. In accordance with a particular aspect of the present invention, this assignation is accomplished by way of device as described here before, and further including an input conditioning device which comprises, in combination:

an at least one input conditioning terminal for receiving a set of "n" semantic inputs collectively defining a real-valued distribution of "n" respective ones of representative semantic input values;

an input conditioning processor, connected in input receiving relation to said input terminal, for: receiving and processing each of said inputs in input value transforming relation to form a set of "n" respective, ones of said corresponding Argand domain vector values having phase angle-coefficient values collectively defining a polar-valued distribution of "n", complex phase angle values as output from said input conditioning processor; and, for assigning a magnitude or confidence level to each of said Argand domain vector values having magnitude coefficient values collectively defining a real valued distribution of "n" magnitude values generally bounded within a probabilistic range as output from said input conditioning processor; and, a conditioned output terminal connected in output receiving relation to said input conditioning processor, for receiving and outputting those values to the input terminal.

Note that the input conditioning processor and the first above mentioned processor can be one and the same, where architectural considerations permit.

Preferably the distribution of the phase coefficients of the inputs are transformed from the real-valued domain, (and regardless of the latter's distribution of values), as a symmetrical distribution of phase orientation values about the Argand plane. Although the device according to the present invention is particularly robust in its ability to handle relatively asymmetrical distributions within sets of polar valued inputs, it is very much preferred that the assignments of polar values introduce a symmetrical distribution. This is preferably accomplished by way of a sigmoidal transform. In accordance with another aspect of the present invention, therefore, there is provided a device which further includes provision for input conditioning processor transformation of the semantic input values which results in a set of phase angle-coefficient values, having a polar-valued distribution of "n", complex phase angle values, which are asymptotically bounded over a range of zero to two pi in an Argand plane. This approach finds greatest application in situations wherein the real valued inputs display, for example, a normal distribution about a mean value, as is often the case in natural analog events.

Although this approach greatly improves the performance of the device in connection with many analog stimulus/response applications, there are situations wherein the semantic content of an association pattern can, at least in part, be dependent on an inherent and characteristic distribution of the phase angle-coefficients, as will become apparent to the person skilled in the art, on a case by case basis. In such circumstances, the assignment of a phase co-efficient values can be made in direct proportion to corresponding ones of said real-valued semantic input values.

Similarly, there are situations wherein the assignment of phase coefficients is arbitrary from the strictly semantic-content point of view, in that distribution, per se, is irrelevant to the conveyance of any semantic relationship. Although an input conditioning processor may not be required in such circumstances, it is nevertheless desirable that such arbitrary assignments be as symmetrical as reasonably practical. In any case it is preferred that the preprocessor accomplish transforms of the semantic input to change the real-valued distribution of representative semantic input values to corresponding ones of phase coefficient values which lay within a polar valued distribution having a mean of about pi. Where specific applications permit, there can be advantages in a device in accordance with the present invention, wherein the input terminal is adapted to be connected in semantic input receiving relation to an at least one transducer that is in turn responsive to a stimulus, such as the real world analog stimulus mentioned above.

Typically, the set of "n" inputs collectively will define an at least one dimensional matrix, containing a range of "n" representative semantic values, (s1, s2, s3, . . . s"n"),
reflecting real-valued scaler measures drawn from stimulus or stimulus associated response domains. The input condition processor is preferably further adapted to assign predetermined ones of magnitude-coefficient values selected from a probabilistically-relative range, to each of respective ones of the phase coefficient values. This results in the production of "n" composite values each defining an associated vector address within a two-dimensional Argand domain of values. This might be done in accordance with a generalized transform such as that qualitatively set out below. In this case, kth ones of each of the "n" respective semantic input values are mapped to corresponding ones of the composite values through the qualitative transformation:

$$S_k \to \lambda_k e^{i\theta_k}$$

wherein $S_k$ represents ones of said "n" representative semantic input values; $\lambda_k$ represents said kth ones of assigned predetermined ones of magnitude-coefficient values selected from a probabilistically-relative range; and $e^{i\theta}k$ represents kth ones of said set of "n" corresponding phase-coefficient values collectively defining a polar-valued distribution of "n" proportional, complex phase angle values; and, the term:

$$\lambda_k e^{i\theta_k}$$

represents kth ones of $S_k$ associated vector address within a two-dimensional Argand domain of values.

The assignment of the magnitude coefficients (sometimes referred to herein as $\lambda$ co-efficients) is accomplished, and in some cases changed, in a number of ways. Typically, predetermined ones of the magnitude coefficient values are assigned values equal to unity. Variations in the assignment of such magnitude coefficient values may however, be made on the basis of heuristic considerations. Indeed, situations can arise where the assigned magnitude coefficient is valued a zero, and in such circumstances recourse may have to be taken to sparse matrix techniques in developing the pattern association matrices and the correlation matrix.

Moreover, having been assigned, there is often merit in having the corresponding elements in the pattern association and correlation matrices age with prejudice to the assigned magnitude coefficient. In the case of the later, time variable decay functions that age the magnitude co-efficients in the complex values of the correlation sets, can be employed when the nature of the association indicates a desirability to attenuate the original weighting afforded an association element through the original coefficient value assignment. Such memory profiling is, for example, relevant to the construction of a short term memory which implicitly derives differential characteristics on response recall from long term or permanent memory profiles. Short term memory profiles inherently display a greater discrimination in generated magnitudes (confidence levels) between response recall of prior recent learned stimuli having a generated magnitude value of "one" and non-learned stimulus which has a confidence value of less than "one". Similarly the phase component of the response recall for stimulus learned within a decay time constant of short term memories are proportionally more accurate in the recall of phase response value. Conversely long term memories following a point saturation encoding (ie point at which the number of learned associations is greater than the number of elements within the stimulus field) will display a greater phase error in the response recall, even for stimulus learned with in a reasonably short decay time constant. For the former assignation or modification of magnitude coefficients to the composite complex elements within the stimulus or response sets, this affords a level of control over neural plasticity whereby the efficacy of operation in the corresponding elements phase assignment usefully employed toward either generation of an association mapping within the correlation set as in during learning, or the efficacy of operation in generation of response recall, said efficacy of operation modified in proportion to the magnitude assignation. Higher order statistics details a preprocess operation imposed upon the stimulus sets to expand the size of the set while proportionately increasing the encoding capacity of the pattern-association correlation set. Higher order statistics refers to the process of evaluating the unique combinatorial products of the input stimulus set once translated into the complex valued phase/magnitude representation. The effect of higher order product terms constructs a narrower region of generalization about the learned stimulus loci for each stimulus response association learned or superposed within the correlation set. The use of higher order product terms effects a change in the topological structure of the correlation mapping, permitting a more dense mapping to be constructed within the correlation substrate, whereby the neural system is capable of constructing a more accurate mapping for closely proximal stimulus loci, irrespective of the fact that these loci may be associated to divergent response values. In the process of generating higher order products from the complex valued stimulus set, one may effectively expand an input stimulus field constructed from, for instance, 20 values, thereby defining a control or state space extending over twenty degrees of freedom, and construct a correlation mapping from the higher order statistics, with this mapping being capable of superposition of in excess of several million stimulus response associations of a random nature and subsequent response recall over the suite of learned stimulus patterns capable of achieving an unprecedented low level of error. It is important to note a random nature imposed upon stimulus response associations forms the most restricted of pessimistic scenario for accuracy of response recall. These higher order statistics are in general formed by the following qualitative transform, whereby:

$$s_k = \prod_{n=1}^{n} \lambda_{r(k,n)} e^{i\theta_{r(k,n)}}$$

wherein represents the mth statistic formed in the sequence of generation and N the order of the statistic formed. The function r(k,n) assigns a predetermined or heuristically formed selection of terms from the raw stimulus input set as a function of the kth order term generated and the nth input element combined with the product to form that Nth order statistic. A restriction imposed by the requirement for enhanced operation desirable requires that all higher order terms are formed from unique sets of input composite values and are again unique irrespective of commutative order, of conjugation.

Further aspects of the present invention will become apparent in the course of the following detailed description of the present invention.

BRIEF DESCRIPTION OF DRAWINGS

These and other objects and features shall now be described in relation to the following drawings wherein:

FIG. 1 represents average error within generated response vs ratio of patterns encoded (P) to number of synaptic inputs to cell (N).

FIG. 7 illustrates of symmetric vs asymmetric phase distributions.

FIG. 8 illustrates the approach to a symmetrical state within a binary system.

FIG. 22 illustrates one possible format for the correlation set.

BEST MODE(S) FOR CARRYING OUT THE INVENTION AND INDUSTRIAL APPLICABILITY

Figure 2:
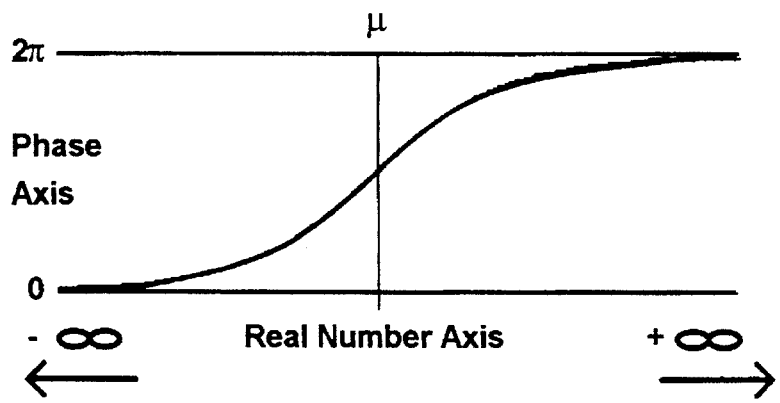
FIG. 2 illustrates a sigmoidal mapping function.

Fundamentally important is the concept of learning and expression of information, represented in the form of analog stimulus-response associations, and an understanding of the manner by which the holographic method is able to generalize about these learned associations. The holographic method principally derives its efficiency of operation in the ability to enfold multiple stimulus-response associations (or more exactly—mappings) onto the identically same correlation set representative of synaptic inputs.

At the most fundamental level one may consider an information or data field as comprised of a set of analog or scalar values. This set of analog values may reflect measured conditions within any external field or environment. To associate one set of analog values or measurements (stimulus field) to another group of values in a manner that the presence of the first field invokes the issuance of the second, is the basis of stimulus-response association. The mathematical basis for holographic neural technology permits stimulus-response associations to be mapped directly onto a correlation set comprised of complex numbers. The holographic mechanism displays a capacity for very high information storage densities in the sense that large numbers of stimulus-response associations may be superimposed upon the identically same set of complex values. Individual associations are encoded or learned, on one non-iterative transformation. The holographic process generalizes in a manner whereby an analog stimulus pattern, of a determined closeness to any of the prior learned stimulus patterns, will transform through the correlation set to regenerate the closest associated analog response with a high level of accuracy.

Standard approaches in pattern recognition (i.e. linear search) implement a convention whereby several pattern templates, whether in original or compressed form (i.e. Fourier transform), must be stored and individually compared against the input reference pattern. These standard methods generally tend to require large amounts of memory, are computationally intensive, and rather limited in their generalization capabilities. The linear search for instance, indicates only a level of closeness for all stored pattern prototypes as compared against the input reference. Scaling problems are often encountered whereby a slight distortion of the input pattern often creates a very large increase in the computed pattern variance (poor generalization properties).

The holographic neural process may be constructed to perform an analogous pattern recognition function although pattern templates are effectively enfolded onto the same storage space, thus reducing memory requirements to only the amount of storage needed for a single pattern prototype. In addition, the response value generated within the holographic neural process indicates both a degree of confidence (magnitude component of the response vector) and an analog information value (phase angle component). Information fields, as learned and expressed within the holographic neural process, are presented to neuron cells in the form of sets of complex numbers. These sets represent the analog stimulus-response associations within the neural system. The holographic neuron cell displays both the capability to learn associations on a single encoding transformation and within the individual neuron cell.

To indicate the potential storage capacity one may construct a cell with 2000 synaptic inputs (or correlation values). For a worst case scenario all elements within the stimulus data field and the associated response value may be constructed to be essentially random. One neuron cell of this size is capable of encoding 1000 random stimulus-response patterns and subsequently decoding a response to each of the learned stimulus patterns exhibiting an average error of <7.2% full scale on one learning trial. Following two further reinforcement learning trials over the same data set, this average analog response error is reduced to ~2%. These error rates are invariant to the size of the neuron cell (i.e. same characteristics apply to a neuron of 64K synaptic inputs having 32K associations or mappings enfolded). Also, the above error values pertain to the limiting worst case scenario where, again, pattern associations are essentially random. The holographic neural systems capability to learn stimulus-response associations which are not random in nature is considerably greater.

This basis of operation presents a fundamental diversion from connectionist models in conventional artificial neural system (ANS) theory. Connectionist models assume associations are encoded by varying the connection weights established between large groups of neuron cells, these cells performing principally real valued multiply and accumulate operations. In the holographic neural model, the individual neuron cell executes a more central role forming a non-connectionist model, in which the capability to learn and subsequently express associations exists principally within the neuron cell itself. The holographic neural model provides an enormous increase in neural based applications whereby the capabilities exhibited by much larger non-holographic networks may be effectively compressed within a single neuron cell. Arrays of holographic cells may be constructed, propagating analog stimulus-response associations through or establishing recurrent loops within multiple arrays of cells. Such configurations may be constructed within multi-neuronal systems whereby each cell functions individually as a powerful "network" emulating ideal characteristics of stimulus-response association or "content addressable memory". These content addressable memory cells have the added feature of deterministically modifiable properties of generalization. One may usefully incorporate the holographic process into a general purpose neural development system as defined in following section permitting designer the flexibly to configure any arrangement of neuron cells and interconnection of data flow paths.

Representation of Information

Elements of information within the holographic neural system are represented by complex numbers. The complex number operates within two degrees of freedom, that is, phase and magnitude. Each of these complex numbers present information in this somewhat novel manner, fundamentally important to the operation of the holographic system. One must remember that in the holographic domain, the phase component reflects analog information and the related vector magnitude indicates a confidence level in that information (phase) value. Confidence or magnitude values for these complex numbers typically extend over a probabilistic scale [0.0 to 1.0]. All elements within stimulus or response data fields of the neural system are therefore described by arrays of complex numbers bounded typically within the unit circle. Complex transformations such as vector multiplies take advantage of the numeric properties occurring within Riemann spaces, for instance, the manner in which multiply operations induce a vector rotation. It is important in this respect, to note that transforms on complex values operate in a fundamentally different manner than multidimensional Euclidian spaces. All of the characteristics of learning whereby analog stimulus-response mappings are enfolded onto a correlation set, expression, and production of confidence values (magnitude) are intrinsic to properties of the Argand plane, as defined within a more generalized Riemann space, by the manner in which complex vectors transform. As stated previously, stimulus [S] and response [R] data fields within the holographic neural process are represented by arrays of complex values. Using the complex exponential convention, these data fields may be represented qualitatively by:

$$[S] = (\lambda_1 e^{i\theta_1}, \lambda_2 e^{i\theta_2}, \lambda_3 e^{i\theta_3}, \ldots, \lambda_N e^{i\theta_N})$$

and $$[R] = (\lambda_1 e^{i\phi_1}, \lambda_2 e^{i\phi_2}, \lambda_3 e^{i\phi_3}, \ldots, \lambda_M e^{i\phi_M}) \quad [1]$$

External signals and response actions are most often represented within a real number domain, therefore conversion of external real number values to the internal phase or information domain is required. This optimally is performed by a sigmoidal preprocessing operation. FIG. 2 indicates the general conversion form, where the real number domain extending along the horizontal axis is essentially unbounded ($-\infty$ to $+\infty$). The phase axis used within the holographic domain and extending along the vertical is bounded by 0 and 2*. The sigmoid function performs a mapping of external real data sets, as experienced and measured within the external environment, to phase values representing information internal to the holographic neural system. The sigmoid transform also exhibits some highly optimal properties, as are discussed in more detail within a following section pertaining to symmetry considerations. The general form of mapping from scalar to complex may be illustrated qualitatively by:

$$S_k \to \lambda_k e^{i\theta_k} \quad [2]$$

The magnitude value ($\lambda_k$) associated with each scalar value ($s_k$) in the input data field must be assigned some level of confidence. These assigned confidence values facilitate the users control over dominance of the corresponding component of information in its efficacy of operation within the encoding and decoding processes. One must understand the concept of signal confidence (magnitude) from the vantage point that all input phase values are weighed in accordance to their magnitude in both the encoding of a stimulus-response association and decoding or expression of a response. For instance, a phase element with an assigned magnitude of 0.0 will produce no contribution in the holographic encoding and expression of stimulus-response associations. Conversely, a confidence level of 1.0 will establish an influence of equal weighting to all other information elements within the data field, providing of course these elements also display unity confidence. One would normally assign unity values to all complex numbers within an input data field, however the effective weighing of these phase elements may be modified to any value, as may be desired in establishing a confidence profile extending over the raw input data field.

During decoding or response recall operations, the generated confidence levels are again of fundamental importance. This confidence (or magnitude) in the generated response indicates a degree of recognition or closeness for the input stimulus pattern to a prior learned stimulus state. By performing encoding-decoding transforms within phase space and using the conventions discussed earlier for information representation, response magnitude is intrinsically expressed within a probabilistic scale [0.0 to 1.0]. A response magnitude close to 0 indicates a low level of confidence in recognition, and conversely, 1 indicates a high level of confidence in recognition. This operational feature permits one to determine if generated response information (phase) is the result of recognized or non-recognized stimulus. This magnitude operates, in a sense, as an analog switch, turning ON the neural element for a recognition response and OFF for non-recognition.

Establishing a range of confidence levels bounded within the probabilistic scale permits operations on data fields to follow case rules of fuzzy logic. This is displayed in the computed confidence level for input events which combine to form higher order product terms or "statistics" (see the following section pertaining to higher order systems). The confidence level of the higher order terms is modified in accordance with probabilistic rules.

$$P_{PROD} = P_A * P_B \quad [3]$$

For instance, if one were to assign a confidence level of 0.5 to element A above and 0.75 to element B, a higher order term formed by the product of the two information elements has a confidence level of 0.375. In both feed forward and recurrent cell structures, associations evoked from a data field and associated higher order statistics may attenuate or decay away depending upon their degree of expressed confidence.

Sigmoidal Preprocessing

Consider the following set of scalar values representing a stimulus field:

$$S = \{s1, s2, s3, s4, \ldots, sN\} \quad [4]$$

The stimulus field may represent any form of measurable quantity; say, pixel intensities of a digitized picture. A sigmoid transformation as discussed briefly in the previous section maps the above data field from the external real valued domain to the neural system's internal information or phase domain. Each element of information, within this internal phase domain contains both the analog information value, representative in this case of pixel intensities, and an associated confidence level. Again, mapping from external to internal information domain is performed by the following general relationship:

$$S_k \rightarrow \lambda_k e^{i\theta_k}$$

where $$\theta_k = 2\pi (1 - e^{\frac{\mu - s_k}{\sigma}})^{-1} \quad [5]$$

μ—mean of distribution over s; k=1 to N
σ—standard deviation of distribution
$\lambda_k$—the assigned confidence level The above transformation maps the above raw input [4] to a set of complex values, indicated as follows:

$$[S] = (\lambda_1 e^{i\theta_1}, \lambda_2 e^{i\theta_2}, \lambda_3 e^{i\theta_3}, \ldots, \lambda_N e^{i\theta_N}) \quad [6]$$

or as illustrated graphically in FIG. 2.

The above mapping is again performed by a non-linear function of a generalized sigmoidal form. A wide range of functions may be used to perform this real valued scalar to phase mapping provided certain conditions are met. That is, principally any continuous function where limits of a real valued scalar range extending over either a bounded or unbounded range (i.e. −∞ to +∞) are mapped to a bounded range extending over 2π. It has been found that the generalized sigmoid form performs this mapping ideally for purposes of establishing symmetry within an input data field that initially displays normal or Gaussian distributions.

Ideal symmetry, in the context of the holographic process, refers to a uniform distribution of phase elements oriented about the origin of the Argand plane. A state of ideal symmetry within stimulus data fields establishes the optimal condition for high encoding densities. Properties exhibited by the sigmoid preprocessing on input real valued sets permit normal or Gaussian distributions commonly occurring in real world systems to be mapped to a highly symmetrical distribution within the phase domain. This ideal mapping presents itself over a wide range of initial input conditions in terms of mean and variance of distributions. The holographic system is however quite robust, in the sense that, close to optimal encoding densities may also be achieved for pattern distributions displaying a considerable degree of asymmetry.

Figure 3A:
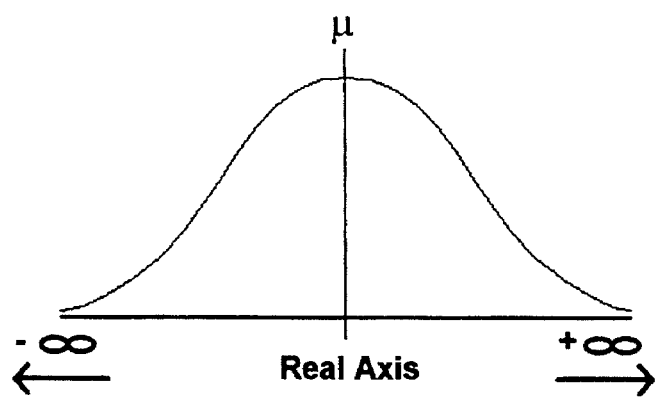
FIG. 3 illustrates a mapping of normal (Gaussian) distribution densities in the real domain to symmetric (uniform) distributions in the complex domain.
Figure 3B:
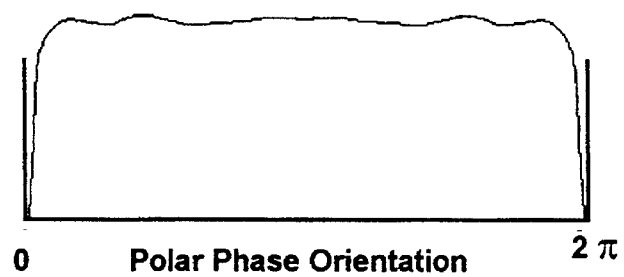

By employing the sigmoid function as a pre-processing operation, a wide family of real valued distributions are mapped to the internal phase representation in an optimal manner, as illustrated by FIG. 3. It is interesting to note also that some varieties of receptor neurons (i.e. retinal rods and cones) preprocess input stimulus signals in a sigmoid relationship. This process is again, fundamentally divergent from most ANS systems, which typically employ a sigmoid function as a post-processing operation.

The limits of the external real valued range (i.e. ±∞) have been defined within the neural system as a point of discontinuity at the 0/2π phase orientation. This establishes a fixed point of reference on the phase plane which is immutable in the sense that external, real number values approaching ± infinity (the external boundary limit) asymptotically approach a fixed point of reference on this phase plane (ie. 0/2π). Information, as represented within the internal phase domain, is therefore essentially bounded and unable to cross this discontinuity. Similarly, the mean of the stimulus data distribution is typically situated on the opposite pole of the phase plane (π). This establishes an internal representation whereby information is not fixed in scale, but is a function of the initial data distribution. This feature normalizes input pattern distributions which may vary as a result of ambient or global conditions i.e. lighting intensity, volume, etc.

Encoding (Learning)

As discussed previously, the learning process enfolds multiple stimulus-response associations onto a correlation set [X] containing complex numbers. These numbers require a relatively low numeric resolution (i.e. 8–16 bit dynamic range) to facilitate very high encoding densities. The encoding process is, at its most fundamental level, executed by a complex inner product over the stimulus and response fields. Evaluating one element within the correlation set (i.e. $x_{j,k}$) maps an association of stimulus element k to response element j, evaluating the following complex multiply and accumulate (+=):

$$x_{j,k} += s_k \cdot r_j \quad [7]*$$

*note a (+=) b translates to a=a+b

Using complex exponential notation, elements of the stimulus and desired response fields are represented by:

$$r_j = \gamma_j e^{i\theta_j}$$

$$s_k = \lambda_k e^{-i\theta_k} \quad [8]$$

The above complex product in [7] may be rewritten in complex exponential notation as:

$$x_{k,j} = \lambda_k \gamma_j e^{i(\theta_j - \theta_k)} \quad [9]$$

One may construct sets of stimulus and response fields extending of a given time frame where the information element index is along the horizontal and time incremented along the vertical:

$$[S] = \begin{matrix} \downarrow \\ t \\ i \\ m \\ e \\ \downarrow \end{matrix} \begin{pmatrix} \lambda_{1,t_1}e^{i\theta_{1,t_1}} & \lambda_{2,t_1}e^{i\theta_{2,t_1}} & . & . \\ \lambda_{1,t_2}e^{i\theta_{1,t_2}} & \lambda_{2,t_2}e^{i\theta_{2,t_2}} & . & . \\ . & . & . & . \\ . & . & . & . \\ . & . & . & . \end{pmatrix} \quad [10]$$

$$[R] = \begin{matrix} \downarrow \\ t \\ i \\ m \\ e \\ \downarrow \end{matrix} \begin{pmatrix} \gamma_{1,t_1}e^{i\phi_{1,t_1}} & \gamma_{2,t_1}e^{i\phi_{2,t_1}} & . & . \\ \gamma_{1,t_2}e^{i\phi_{1,t_2}} & \gamma_{2,t_2}e^{i\phi_{2,t_2}} & . & . \\ . & . & . & . \\ . & . & . & . \\ . & . & . & . \end{pmatrix} \quad [11]$$

The encoding process for multiple patterns as indicated above may be represented in a more canonical form by the following matrix transformation:

$$[X] += [\bar{S}]^T \cdot [R] \quad [12]$$

In the above operation, the entire suite of stimulus-response association is encoded within a matrix product solution over complex valued data sets. Assuming only one element within the response field (i.e. one neuron cell) the resulting correlation set may be presented in the following form:

$$[X] = \begin{pmatrix} \sum_{t}^{p} \lambda_{1,t}\gamma_{1,t}e^{i(\phi_t - \theta_{1,t})} \\ \sum_{t}^{p} \lambda_{2,t}\gamma_{2,t}e^{i(\phi_t - \theta_{2,t})} \\ \cdots \\ \cdots \end{pmatrix} \quad [13]$$

This encoding process collapses or enfolds the dimensional aspect of time while retaining content of information. In practical application, patterns are presented to the network one at a time in sequence and enfolded into the correlation set via a complex vector addition. In practical application one may perform both encoding (learning) and decoding (expression) functions within one execution cycle of the neural engine. Information content in the system is preserved in the sense that one may express any of the prior learned response values upon exposure of [X] to the associated stimulus pattern (see description pertaining to decoding). This encoding process also directly follows the principal of non-disturbance in that stimulus-response mappings which have previously been encoded are minimally influenced by subsequent learning. The property of non-disturbance permits a suite of patterns are encoded in a linear sequence and over a single learning trial. The process displays that on decoding (response recall) the first stimulus patterns produce a relatively small analog component of error, indicating minimal influence from subsequent encodings. Networks based on gradient descent methods do not exhibit this non-disturbance property, in that several iterations about the suite of patterns are required to train the system to learn far more limited sets of stimulus-response associations or "classifications" at a reasonable level of accuracy. The above method presents the holographic encoding process in its most basic form, whereby learning is not influenced by any prior accumulated memory or knowledge within the system.

An enhanced encoding method is described forthwith, whereby learning is a direct function of memory. The enhanced encoding process displays many desirable characteristics, such as automatic control over attention, reinforcement learning, greatly increased storage densities and stability of operation over a wider range of input data field distributions.

Decoding (Response recall)

Decoding or response recall operates in a manner whereby stimulus fields are transformed through all of the stimulus-response mappings enfolded within the correlation set [X] in a concurrent manner to generate the associated response [R]. Elements within the generated response field are again of complex form possessing both phase and magnitude. In the event that the new stimulus field resembles any of the prior learned stimulus patterns, the neural cell will generate the associated response phase values with a high confidence level (magnitude ~1). The decoding transform may be represented by the following inner product form $$[R] = 1/C[S]^* \cdot [X] \quad [14]$$

where [S]* is the new stimulus field exposed to the neuron for issuance of a response. This input stimulus field may be represented by the following linear matrix:

$$[S]^* = [\lambda_1 * e^{i\theta_1 *}, \lambda_2 * e^{i\theta_2 *}, \lambda_3 * e^{i\theta_3 *}, \ldots] \quad [15]$$

The normalization coefficient (c) in [14] is a function of the stimulus field. Optimal characteristics are exhibited using the following relation for this coefficient in normalizing response magnitudes to a probabilistic range [0.0 to 1.0].

$$c = \sum_{k}^{N} \lambda_k * \quad [16]$$

One may investigate the error characteristics exhibited on response recall by constructing sets of complex vectors of random orientation (i.e. random statistical testing). These error characteristics may be evaluated as a ratio of encoding densities by encoding a suite of stimulus-response associations and subsequently decoding each of the prior learned stimulus fields through the neuron cell.

One will observe that in implementation of this process, as the number of patterns encoded increases, the average error on response recall (or difference between the encoded and generated response on decoding) increases in a gradual manner. This association error is sufficiently low that very large numbers of stimulus-response mappings may be enfolded prior to accumulation of significant analog error in decoding or response recall. One may illustrate this information enfolding property in a somewhat more expansive fashion by numerically deconvolving the vector components embedded within the generated response value. This illustration requires a nominal understanding of the manner by which complex vectors transform within a generalized Riemann or complex number domain.

One response term generated within [14] above may be deconvolved into constituent parts whereby each part is itself a complex vector generated by a stimulus [S] transformation through one of the stimulus-response mappings enfolded within the correlation set [X]. The following presents a discrete expansion expressed in complex exponential form for one response value in [R] (assuming we are modelling a single neuron cell having one axonal process). Combining [15] for the new stimulus [S]*, [13] for the correlation set, and the canonical form for the decoding transform [14], the following solution for a generated response value is obtained:

$$r = \frac{1}{c} \sum_{k}^{N} \lambda_k^* \, e^{i\theta_k^*} \sum_{t}^{P} \lambda_{k,t} \gamma_t e^{i(\phi_t - \theta_{k,t})} \quad [17]$$

This solution may be rewritten in the following equivalent form:

$$r = \frac{1}{c} \sum_{t}^{P} \gamma_t e^{i\phi_t} \sum_{k}^{N} \lambda_k^* \lambda_{k,t} e^{i(\theta_k^* - \theta_{k,t})} \quad [18]$$

The above represents a sequence of separate response components summed over time (t=1 to P). Each of these deconvolved response vectors over time corresponds to the response produced from the new stimulus field transform through that stimulus-response mapping encoded at time t. Rewriting the above equation again in a more illustrative form, each of the convolved response vectors may be represented as follows:

$$r = 1/c(\Lambda_1 e^{i\Phi_1^*} + \Lambda_2 e^{i\Phi_2^*} + \ldots + \Lambda_p e^{i\Phi_P^*}) \quad [19]$$

where $\Lambda_t$ is the magnitude or confidence level for one of the convolved response vectors. This response vector again corresponds to the stimulus [S]* transform through a mapping encoded into the correlation set at time t. Resubstituting [18] into the above, each vector component within the deconvolved response may be evaluated directly as:

$$\Lambda_t e^{i\Phi_t^*} = \gamma_t e^{i\phi_t} \sum_{k}^{N} \lambda_k^* \lambda_{k,t} e^{i(\theta_k^* - \theta_{k,t})} \quad [20]$$

Following from the above, the magnitude and phase component for each of the response components may be evaluated directly where:

$$\Lambda_t = \frac{\gamma_t}{c} \left( \left( \sum_{k}^{N} \lambda_k^* \lambda_{k,t} \cos(\theta_k^* - \theta_{k,t}) \right)^2 + \left( \sum_{k}^{N} \lambda_k^* \lambda_{k,t} \sin(\theta_k^*(-\theta_{k,t})) \right)^2 \right)^{1/2} \quad [21]$$

$$\Phi_t^* = \tan^{-1} \left( \frac{\sum_{k}^{N} \lambda_k^* \lambda_{k,t} \sin(\theta_k^* - \theta_{k,t} + \phi_t)}{\sum_{k}^{N} \lambda_k^* \lambda_{k,t} \cos(\theta_k^* - \theta_{k,t} + \phi_t)} \right) \quad [22]$$

adjusting $\Phi_t^*$ for the principal angle}

Figure 4:
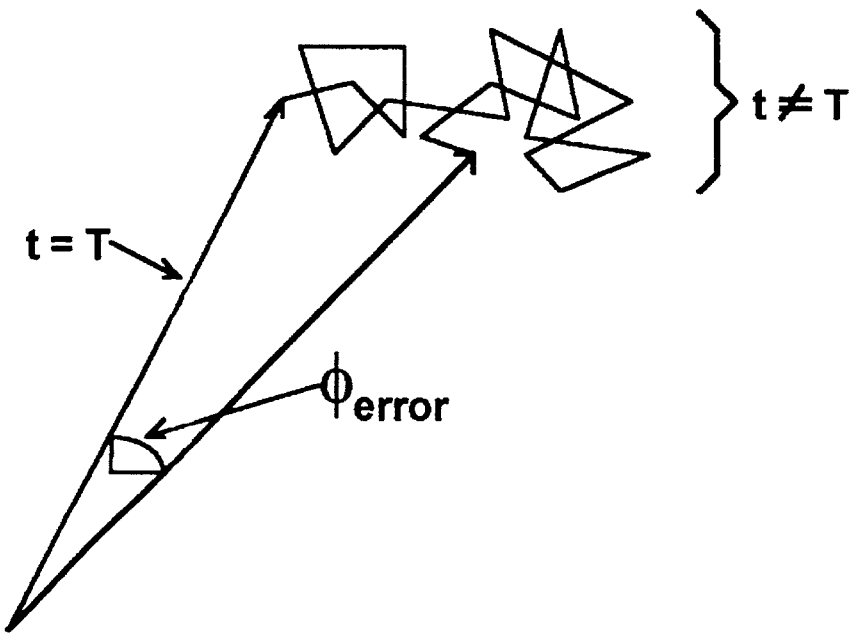
FIG. 4 illustrates a summation of the convolved response terms in the generated response recall.

Each of the response vector terms in [19] (i.e. $\Lambda_t e^{i\Theta}t$) contain a magnitude or confidence statistically proportional to the degree to which the new stimulus pattern falls close to a prior encoded stimulus mapping. In other words, the prior encoded stimulus patterns displaying the greatest similarity to the new input pattern [S]* produce the more dominant vector terms ($\Lambda_t$ as defined by [21]) within the generated response. FIG. 4 illustrates a vector summation of the convolved response terms and the relative dominance of each of the convolved terms. Assuming the pattern encoded at time T is closest to the new stimulus input state, a transform through pattern T issues the most dominant response term, and all the remaining terms generated from a stimulus transform through mappings learned at t≠T manifest a far smaller dominance or magnitude. These disassociated terms (for t≠T) are again summed (as defined by equation [19]) and ideally form a random walk path. The resultant vector produces a small component of error within the generated response, as illustrated in FIG. 4. Random walk characteristics occur ideally for symmetric data field distributions defining the property by which multiple mappings may be enfolded onto the identically same correlation set.

A simple limit theorem may be constructed to evaluate the properties observed of the holographic neural method as any stimulus input pattern approaches a prior learned stimulus state. One may apply a limit argument that $\epsilon_r$ diminishes as the information elements within the new stimulus field [S]* approach the stimulus pattern encoded at time T, numerically:

$$e^{i\theta_k^*} e^{i(\theta_{k,T} + \epsilon_r)} \quad [23]$$

over all stimulus elements k=1 to N
where $\epsilon_r$ is a random error quantity. Resubstituting the above equivalence into [21] and [22], as the phase elements within the stimulus field [S]* tend toward the encoded stimulus pattern (T), then:

$$\epsilon_r \to 0$$

over all k
And substituting [23] into the phase and magnitude relationships for the response, [21] and [22]:

$$\Lambda_T \to \frac{\gamma_T \sum_{k}^{N} \lambda_k^* \lambda_{k,T}}{\sum_{k}^{N} \lambda_k^*} \quad [24]$$

or, $\Lambda_t \to 1$, where,
where $\lambda_k^*$, $\lambda_{k,T}$, $\gamma_T \cong 1$, over all k.
Similarly, for phase:

$$\phi_T^* \to \phi_T \quad [25]$$

The value $\Lambda_{bT}$ is again the magnitude or "confidence" expressed for the stimulus field transformation through a mapping encoded at time T, and presents the most dominant response vector component for a close pattern match between new stimulus [S]* and prior learned stimulus. Similarly, the generated response phase angle ($\phi_T^*$) reproduces the associated response value for the prior encoded stimulus pattern.

The remainder of the terms convolved within the response (i.e. t≠T) characterizes a deterministic "error" or fuzziness within the generated response ($\phi_{error}$ in FIG. 4). The statistical variance on the magnitude for this error term is proportional to the total number of distinct and separate stimulus-response mapping enfolded onto the correlation set. It is this fuzziness which establishes a limit on the number of separate associations which may be accurately enfolded or mapped within the neuron cell. For any multidimensional orthogonal coordinate system, the average magnitude resulting from a sum of P random walks, assuming unit steps is:

$$\sqrt{P}$$

The disassociated set of response terms therefore display an average magnitude approximating:

$$|r_{t \neq T}| = \left| \frac{1}{c} \sum_{t \neq T}^{P} \Lambda_t e^{i\phi_t^*} \right| \cong \sqrt{\frac{P}{N}} \quad [26]$$

for $\gamma_t$, $\lambda_{k,t} \cong 1$ over all k and t

The above residual "error" contribution within the generated response is deterministic and again increases proportionally to the number of stimulus-response associations encoded. For the unenhanced encoding process (previous section) this error relationship for a single learning trial may be approximated assuming properties of random walks:

$$\phi_{error} = \frac{1}{\pi\sqrt{8}} \tan^{-1}\left(\sqrt{\frac{P}{N}}\right) \quad [27]$$

Figure 5:
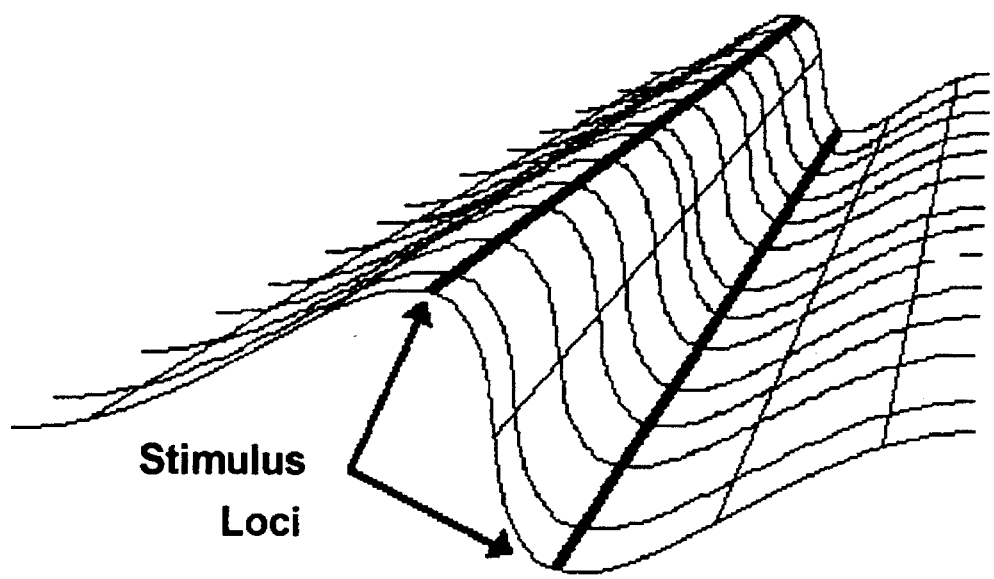
FIG. 5 displays the properties of a topological fold near proximally located stimulus mappings.
Figure 6A:
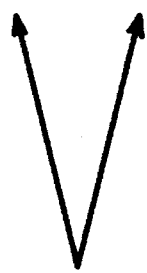
FIG. 6 illustrates mapping convergence for isometric and non-isometric regions within the stimulus field.
Figure 6B:
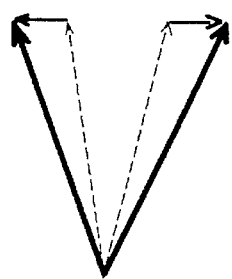
Figure 6C:
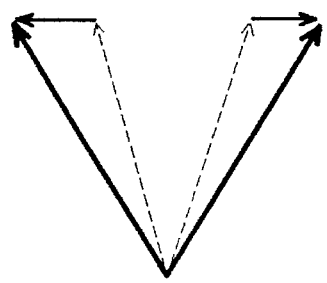
Figure 6D:
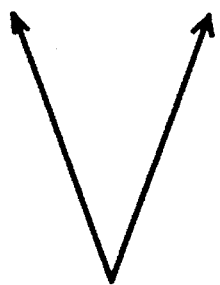
Figure 6E:
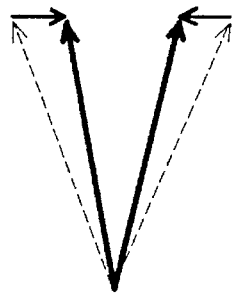
Figure 6F:
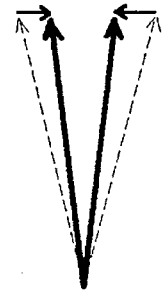

A stimulus pattern may of course invoke responses from several prior encoded mappings all displaying a proportionate degree of confidence. The enhanced encoding process eliminates instabilities within the system resulting from heavily reinforced responses (i.e. many stimulus patterns associated to the same response value). In this enhanced encoding process (see following section), mappings are effectively generated over each point within the stimulus input space. Magnitudes generated in the response recall, defined over the extent of the input state space, are typically bounded within a probabilistic range [0.0 to 1.0]. The enhanced encoding process may is also capable of generating a more sharply defined separation or "topological fold" in the mapping region between proximally located stimulus regions (see FIG. 5). The response recall error as observed within the enhanced encoding process is substantially reduced over the basic holographic process. As well, error on response recall is effectively eliminated using relatively few reinforcement learning trials (typically <4).

A series of further advancements on the above basic operational premise may be used to increase the capabilities of the holographic process far beyond that indicated by the error relation [27]. For instance one may eliminate the pattern storage restriction by expanding the input stimulus field to higher order product terms (see section on page 57) in explicitly generating higher order "statistics" from the input data field. Using this stimulus field expansion process, an input field of say 20 elements may be expanded to several million unique higher order product terms. For these stimulus fields comprised of unique higher order terms, the error relation given by [27] remains valid, permitting a proportional number of mappings to be enfolded onto the neuron cell (i.e. in this case >1 million mappings). The above field expansion facilitates a means by which very large numbers of analog stimulus-response mappings may be enfolded within a state space defined within only 20 degrees of freedom. Linear non-separability therefore does not impose a constraint within the holographic neural process.

Enhancements such as that outlined above, and other fundamentally important properties within the holographic process are listed below. These aspects of the process are defined within the sections following.

Enhanced Encoding

Dynamic memory

Higher order systems

Commutative property

Enhanced Encoding

Operational characteristics of the holographic method are greatly enhanced using a process whereby learning is a function of accumulated memory (i.e. prior stimulus-response associations mapped or encoded within the correlation set). The enhanced process may be used to effectively map out the entire input state space to a set of desired responses. The number of separate mappings that may be encoded, and the topological form of these mappings may be controlled through the order of statistics generated within the system (description page 57 pertaining to higher order statistics).

Within the basic encoding system of the prior section, multiple stimulus-response associations are enfolded onto the correlation set, each association encoded at a preestablished level of confidence. Learning progresses independently from knowledge previously accumulated, and no control is afforded over attention, or the degree to which encoding influences the stimulus-response mapping substrate (physical storage medium containing the correlation set). Within this basic encoding process, operation is nonoptimal in the sense that many similar stimulus-response associations will tend to significantly distort or influence all mappings enfolded within the correlation set [X]. Asymmetries may arise within these enfolded mappings to the extent that all generated responses tend toward a heavily reinforced response. These undesirable characteristics or limitations are not exhibited by the enhanced encoding process.

By allowing encoding to proceed as a function of accumulated memory, the rate of learning (or attention) is automatically controlled by the degree to which similar stimulus-response associations or mappings have previously been learned. Only novel associations will maximally influence this mapping substrate. Conversely, encoding of previously learned associations will introduce a negligible effect on the correlation mapping. Affected is a mechanism which automatically controls the level of attention, again in a manner whereby learning progresses maximally for novel stimulus-response associations. This enhanced learning method is extremely powerful in its ability to construct a mapping topology which enfolds arbitrarily complex images or input signals and their associated set of permutations in scale, translation or rotation over time, onto the identically same correlation set. Stability of operation ensures that the confidence level for generated responses are meaningful and bounded within the probabilistic range [0.0 to 1.0].

Again, in contrast to the basic encoding method, the enhanced process maps new stimulus exactly to the desired response. Fuzziness within the response recall increases at a more gradual rate than the basic encoding scheme, as subsequent stimulus-response mappings are enfolded onto the correlation set. On investigation of the process one will observe that the analog error produced during response recall achieves low values (i.e. <5% analog scale) following generally only two to four reinforcement learning trials and for high encoding densities (i.e. where the number of random associations learned approaches the number of synaptic inputs or "dimensionality" of the cell).

The enhanced learning process operates in essentially three stages. The initial stage transforms a new stimulus field [S] through the correlation set in the generation of a response. The vector difference between the generated and desired response for that stimulus input is then evaluated (Rdif). The final step performs an encoding of the new stimulus field to the above computed difference vector. These steps performed within the enhanced encoding process are illustrated below. These formulations assume one complex value within the response field (i.e. one neuron cell).

1) Decode a stimulus field through the neuron cell to produce a (complex) response value R', i.e:

$$\acute{R} = 1/c[S]\cdot[X] \quad [28]$$

2) A vector difference $R_{dif}$ between the above generated response and the desired response R for this stimulus-response association is evaluated, as follows:

$$R_{dif} = R - \acute{R} \quad [29]$$

3) The correlation mapping is derived from the stimulus field [S] and the above difference vector, and encoded into the neural element, as follows:

$$[X] += [\bar{S}]^T \cdot R_{dif} \quad [30]$$

The above realizes an encoding method whereby the stimulus field is mapped exactly to the desired analog response R. Subsequent encodings will accumulate a distortion of this mapping at a gradual rate, and proportional to the closeness of new stimulus states to the current [S]. A general formulation for the above learning procedure may be expanded to an iterative learning procedure over the same suite of stimulus-response associations by combining above processes 1, 2 and 3; neglecting cross product terms in the above solution method:

$$[X]+=[\bar{S}]^T \cdot ([R]-1/c[S] \cdot [X]) \quad [31]$$

or re-expressing in an equivalent form:

$$[X]+=[\bar{S}]^T \cdot [R]-[H] \cdot [X], \quad [32]$$

wherein $[\bar{S}]^T \cdot [R]$, is the basic encoding term, and $[H] \cdot [X]$ is the enhancement term.

where [H] represents a Hermitian form of [S], that is:

$$[H]=1/c[\bar{S}]^T \cdot [S] \quad [33]$$

The optimal mapping is achieved at the point where [X] converges to a stable locus defined at:

$$[X]=[H]^{-1} \cdot [X]_{basic} \quad [34]$$

where $[X]_{basic}$ is the correlation set produced within the basic holographic encoding scheme presented by [12]. A close to exact mapping over a large set of analog stimulus-response associations may again be achieved with relatively few reinforcement learning trials using the enhanced encoding process as presented by [31]. Evaluating the complex matrix inverse $[H]^{-1}$ as per [34] however requires both the entire suite of stimulus patterns to be present, and is far more computationally intensive. The inverse matrix approach does not appear to present a practicable real-time solution for neural based systems.

The matrix solution indicated in [31] presents a generalized form of the iterative learning process and represents one reinforcement learning trial over the complete suite of stimulus-response associations contained in [S], [R]. Reiterating, the enhanced encoding procedure may be performed over multiple reinforcement learning trials to achieve convergence to the desired stimulus-response mappings. To clarify, the indices of the complex matrix formulation for the stimulus field [S], response field [R], and correlation matrix [X] used within the above solutions [31] to [33] may be written in an expanded notation.

$$[S] = \begin{array}{c} \downarrow \\ t \\ i \\ m \\ e \\ \downarrow \end{array} \begin{pmatrix} s_{1,t_1} & s_{2,t_1} & s_{3,t_1} & \cdot & \cdot \\ s_{1,t_2} & s_{2,t_2} & s_{3,t_3} & \cdot & \cdot \\ s_{1,t_3} & s_{2,t_3} & s_{3,t_3} & \cdot & \\ \cdot & & & \cdot & \\ \cdot & \cdot & \cdot & & \cdot \end{pmatrix} \quad [35]$$

synaptic element index →

$$[R] = \begin{array}{c} \downarrow \\ t \\ i \\ m \\ e \\ \downarrow \end{array} \begin{pmatrix} r_{1,t_1} & r_{2,t_1} & r_{3,t_1} & \cdot & \cdot \\ r_{1,t_2} & r_{2,t_2} & r_{3,t_3} & \cdot & \cdot \\ r_{1,t_3} & r_{2,t_3} & r_{3,t_3} & \cdot & \\ \cdot & & & \cdot & \\ \cdot & \cdot & \cdot & & \cdot \end{pmatrix} \quad [36]$$

response element index →

$$[X] = \begin{array}{c} \downarrow \\ r \\ e \\ s \\ p \\ o \\ n \\ s \\ e \\ \downarrow \end{array} \begin{array}{c} i \\ n \\ d \\ e \\ x \end{array} \begin{pmatrix} x_{1,1} & x_{2,1} & x_{3,1} & \cdot & \cdot \\ x_{1,2} & x_{2,2} & x_{3,3} & \cdot & \cdot \\ x_{1,3} & x_{2,3} & x_{3,3} & \cdot & \\ \cdot & & & \cdot & \\ \cdot & \cdot & \cdot & & \cdot \end{pmatrix} \quad [37]$$

synaptic index →

Where each element of the stimulus and response field is again a complex value bounded typically within the unit circle.

The above formulations illustrate a method for encoding of multiple pattern associations extending across a given time interval. In practical application the encoding process generates a single stimulus-response mapping per each execution cycle to facilitate the real-time characteristics of learning. The recursion of the response difference terms ($R_{dif}$ in [29]) is somewhat analogous to the back-propogation of error terms used in conventional gradient approaches, however, the holographic neural process displays far more efficient properties of convergence, and the ability to construct a mapping topology which conforms more exactly to the set of desired analog stimulus-response associations.

This processes occurring within the neural system, on constructing a topology which converges to the desired set of associations, may be more clearly illustrated in the following manner. One may consider two distinct stimulus patterns which are largely identical, however varying between each other over a limited region. During encoding, these two highly similar stimulus patterns may be mapped to different analog responses. This is illustrated vectorially by the following relationship where the encoded response vector for stimulus 1 is given by:

$$R_1 = e^{i\theta_1} \quad [38]$$

Similarly, the encoded response vector for stimulus 2

$$R_2 = e^{i\theta_2}$$

and:

$$\phi_1 \neq \phi_2$$

Following encoding of stimulus-response pattern 1, decoding a response from stimulus pattern 2 will generate a vector close to $R_1$. As a first approximation, the difference vector ($R_{dif}$) encoded within the second pass of the learning process (i.e. encoding pattern 2) approximates the difference between $R_1$ and $R_2$. Illustrated vectorially below:

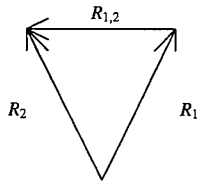

where: $R_{dif} \equiv R_{1,2} = \beta e^{i(\phi_{1,2})}$ [39]

and: $\beta \equiv 2\sin\left(\dfrac{\phi_1 - \phi_2}{2}\right)$

For the reverse order in which stimulus-response pattern 2 has been encoded, followed by an encoding of pattern 1, the reverse difference vector is generated ($R_{2,1}$). The following illustrates the mapping generated within correlation element $x_k$ for an encoding pattern 1 given 2 mapped prior:

$x_k += e^{i\theta_{k,1}} \beta e^{i(\phi_{1,2})}$

Similarly for one encoding pattern 2 given 1 mapped $x_k += e^{i\theta_{k,2}} \beta e^{i(\phi_{1,2})}$ where:

$e^{i\theta_{k,1}}$—corresponds to element k within the stimulus field
$e^{i\phi_{1,2}}$—is the phase orientation of difference vec [40].

In other words, the vector difference for the first situation ($R_{1,2}$) is approximately equivalent to the conjugate difference vector produced for the reverse encoding order (i.e. $R_{2,1}$). For regions which are largely isometric between the above two stimulus patterns, the net contribution within the correlation matrix elements $x_k$ over one learning trial largely cancels out i.e.:

for $\theta_{k,1} \cong \theta_{k,2}$ (isometric regions over k)

$\left|\sum\limits_{t=1,2} X_{k,t}\right| \to 0$ where: $X_{k,t}$ are the correlation values for element k and s [41].

In actuality, during multiple reinforcement learning trials, the mapping of stimulus patterns t=1,2 over isometric regions k converge to an interpolation between the two vector orientations $R_1$ and $R_2$. These response vector components derived from a decode operation over the isometric stimulus regions k in patterns 1 and 2 are denoted below by $r_1$ and $r_2$ respectively. Convergence to an interpolation between the two desired response mappings ($R_1$ and $R_2$) is illustrated graphically in FIG. 6 over three reinforcement learning trials, again where:

$r_1 = x_k \cdot s_{k,1}$ $r_2 = X_k \cdot S_{k,2}$

For regions of the stimulus field however which are non-isometric over the different response classifications, these vector differences inherently amplify the associated mapping within the correlation set. For dissimilar regions within the stimulus field (i.e. $\theta_{k,1} \neq \theta_{k,2}$), one learning trial accumulates a vector addition within the correlation value ($x_k$), on the order of:

$\left|\sum\limits_{t=1,2} X_{k,t}\right| = 2\beta \sin\left(\dfrac{\theta_{k,1} - \theta_{k,2}}{2}\right)$ [42]

The convergence process occurring within the correlation mapping for non-isometric regions over multiple learning trials is again somewhat complex, and is illustrated in FIG. 6:

Reiterating, the enhanced learning process inherently attenuates mappings within the correlation set [X] corresponding to regions in the stimulus fields which are isometric however mapped to separate or distinct response values. The process also tends to establish a mapping which produces an interpolation between the set of distinct response phase orientations. Conversely, [X] elements corresponding to regions of dissimilarity are effectively amplified as indicated by above. This feature, intrinsic to the method of convergence presents an ability to differentiate between stimulus fields which are highly similar, but separated into different response values or categories. The above affects a correlation mapping which converges stably to nearly any desired set of stimulus-response associations, and intrinsically modifies the mapping topology to amplify hidden features (or differentiating features as in the above example). Again, relatively few numbers of reinforcement learning trails (typically one to four) are required to substantially reduce response recall error for large sets of stimulus-response associations.

The accuracy of mapping generated for higher order systems (expanding the stimulus field to higher order terms, see the section on page 57) is also significantly enhanced by employing reinforcement learning as illustrated above. In application one may observe that a stimulus field of 20 inputs expanded to 4th order statistics is capable of encoding 2400 randomly generated stimulus-response associations. Following 2 further reinforcement learning trials, responses are generated (decoded) from the stimulus set displaying an accuracy in response recall better than ±2% of the analog output range. These empirical results indicate an extraordinary ability to encode large numbers of associations and illustrate a convergence to a near ideal analog response recall. Mapped regions within the control state space are not strictly hyperspheroid, but have a topological form controlled by the order of statistics used and shaped directly by the suite of learned stimulus-response associations.

The enhanced encoding process also increases operational stability within the holographic neural system. In other words, encoded associations displaying non-symmetric distributions incur a minimal influence upon other enfolded mappings and do not limit encoding densities. In addition, a re-encoding of similar stimulus-response associations will influence the correlation values in [X] by a diminishing degree due to the fact that associations have been largely mapped out (i.e. $R_{dif}$ in [29] tends towards 0.0). Automatic control over "attention" is facilitated in this manner whereby only novel stimulus-response associations maximally influence the mapping substrate (correlation set). Again, within the basic or non-enhanced learning system (i.e. learning is NOT a function of encoded information) all stimulus-response associations are encoded with equal weighting exhibiting no control over attention and facilitating no means for reinforcement learning.

One highly advanced characteristic in using the enhanced encoding process is the ability to encode a virtually unbounded set of stimulus-response associations for an arbitrary visual object subject to a continuous range of translation and scale. The enhanced encoding process is capable of learning similar objects (different orientations and images of a cup for instance) to an associated response, with minimal saturation of encoding capacity. In other words, the holographic process exhibits a capacity to construct a deterministic mapping over a wide class of similar objects creating in the above example, an abstraction or mapped generalization of the visual form of "cupness". These enhanced generalization properties are of course not strictly limited to the visual sensory mode of vision but extend to any form of data or stimulus-response association.

Symmetry Considerations

Symmetry of data field distributions is of fundamental importance within the holographic neural process. The ability to enfold multiple stimulus-response associations onto the identically same set of complex correlation elements is derived from the manner in which complex vectors are summed within a reasonably symmetric system. Assuming a symmetrical distribution of vectors, these values tend to accumulate in a manner analogous to a random walk. Diffusion in a liquid medium operates on a similar principle of Brownian movement.

In general, the summation of N random steps of unity magnitude over any higher dimensional orthogonal space, exhibits a distribution centred about the origin of walk, and establishing a mean of the radial distribution approaching:

$$\sqrt{N}$$

It is again the above principle of symmetry which fundamentally enables the superposition, or enfolding, of information within the holographic based neuron cell. Symmetry as referred throughout this text is defined by a uniform probabilistic distribution of complex vectors oriented about the origin on a Riemann or complex plane. FIG. 7 graphically illustrates this concept of symmetry over a data set. To illustrate once again this concept of enfolding information, the state of symmetry ensures that stimulus patterns which are distinct from previously learned stimulus patterns produce a vector response which is essentially a sum over random walks. The average magnitude for these random walks establishes the median background level for non-recognition responses.

Conversely, stimulus patterns which have been previously encoded, display a magnitude or confidence level close to unity. Consider, for example, a neuron cell of N=1000 synaptic inputs (small by biological standards) having encoded P=250 patterns. On exposing the holographic cell to previously learned stimulus fields a response vector with magnitude probabilistically centred about 1.0 is generated. Unlearned stimulus input patterns however exhibit the characteristic random accumulation of vectors, and produce a response with magnitudes centred about:

$$\sqrt{\frac{P}{N}} = 0.5$$

This magnitude, as stated previously, presents a measure of confidence in the generated response and may be employed appropriately in several ways to flag or trigger a valid recognition response. Systems operating within a state of symmetry facilitate optimum discrimination between recognition and non-recognition responses. This property of symmetry within data field distributions are achieved in two principal ways. These are:

1) Through the use of sigmoid transforms to map normal (Gaussian) distributions from the external real number domain to the internal information or phase domain.

2) Through expansion of the input data field to higher-order statistics (see section page 57). Both processes are elaborated below.

As mentioned on page 39, the sigmoidal function or sigmoid forms (i.e. arctan, hyperbolic tan, etc.) may be employed to transform an essentially unbounded real-valued range to a closed range extending about the complex plane. The transformed information elements (complex vectors) optimally are distributed uniformly about the origin, forming an azimuthally symmetric distribution. This mapping of normal or Gaussian distribution to symmetric form in phase space is again illustrated by the density distribution plots presented in FIG. 3.

The ideal process for symmetrization of data fields is capable of measuring and compensating for a range of input distributions which lie between normal and uniform distributions. An interpolation of this type requires a measure of the initial symmetry over the input data field. This measure of symmetry (Sym), may be obtained simply by performing a vector summation over the stimulus field as follows:

$$Sym = \frac{\sum\limits_{k}^{N} \lambda_k e^{i\theta_k *}}{\sum\limits_{k}^{N} \lambda_k *} \quad [43]$$

In the event that the stimulus field is highly symmetric, the above vector summation approaches 0 for any data field of reasonable size. Conversely, for non-symmetric distributions the vector summation will approach unity. This concept is illustrated graphically in FIG. 7.

The above summation [43] produces both a measure of symmetry bounded between 0.0 and 1.0, and a value for the mean of phase orientation within the data distribution. Both of these statistical measures are factored within the sigmoidal transform to redistribute input data fields to a highly symmetric form, given a wide range of initial distribution states.

A second and possibly more effective means of obtaining a highly symmetric state over input data distributions is to expand the stimulus field to higher-order statistics. Higher-order statistics refers to the generation of Mth order product terms over elements within the raw stimulus data field. One may illustrate numerically the generation of a higher order term simply as:

$$\prod_{m}^{M} \lambda_m e^{i\theta_m} \quad [44]$$

Where M refers to the "order" of the above product solution. The number of combinations of unique Mth order product terms which can be generated from a data field of size N may be defined by the following factorial relationship:

$$\frac{N!}{M!(N-M)!}$$

In this manner stimulus input fields of relatively small size may be expanded to extremely large sets. An inherent property of the complex domain indicates that as one increases the dimensionality of a cell by expanding to higher-order terms or "statistics", the distribution of the resultant complex data field asymptotically approaches a nearly optimal symmetric state, irrespective of the initial field distribution. Symmetry is attained over the vast majority of initial data distributions, with the exceptional case excluded (i.e. a state of singularity where all phase elements within [S] are identically oriented along the positive real axis, forming effectively a NULL data field).

A stimulus field expansion to higher order terms is illustrated in FIG. 8 for a restricted binary system where information is defined at only two locations on the phase plane (i.e. 0 and p). The first frame indicates a highly asymmetrical distribution where 12.5% of the inputs are defined at 1 (or p). Following one generation of second order terms, the distribution has been modified such that 25% of elements are now at the zero phase orientation. Following three iterations (i.e. 8th order terms) the data distribution is virtually symmetric about the imaginary axis (i.e. 50% zeros). The above expansion to higher-order terms operates as effectively on symmetrizing data distributions which are analog in nature.

Dynamic Memory

Within the holographic neural process, each stimulus-response association maps out its own generalization in the sense that input states of a determined closeness to a learned stimulus state are concurrently mapped to the associated response. If one were to apply dynamic decay to the correlation set [X], which may contain a large number of such enfolded mappings, characteristics of memory are observed whereby the confidence of prior encoded mappings decay out over time. Correspondingly, an increase in the degree of deterministic "error" or fuzziness occurs within the response expressed for these attenuated mappings. Mappings decay out in essentially an analog manner and are overwritten by subsequent encodings of stimulus-response associations. One may illustrate mathematically the concept of memory attenuation by applying the following first order decay terms to the correlation set elements $\{x_k \in [X]\}$:

$$x_k = \frac{1}{c} \int_{t_0}^{T} \lambda_{k,t} \gamma_t e^{i(\phi_t - \theta_{k,t})} e^{\frac{t-T}{\tau}} dt \quad [45]$$

$\tau$ = decay constant
$T$ = current time frame

In the above formulation, long term memory is characterized by a slow decay rate (long time constant $\tau$), and short term by a proportionally faster rate of decay. In practical application, emory may be specified by setting an upper threshold level for the average magnitude of complex values stored within the correlation set. This threshold level effectively determines the point at which memory decay is initiated. One may establish an upper limit on memory (i.e. long term memory) such that the confidence level expressed for non-learned stimulus patterns is at a statistical mean of 1.0. At this point, the magnitude for complex values within the correlation set approaches a mean of:

$$x_{k,j} \cong \sqrt{N} \quad [45B]$$

where N is the number of elements within the stimulus field.

Memory decay within the neural system functions in a manner that as the average vector magnitudes of the correlation set [X] exceeds the threshold limit, scaling is applied to readjust the average magnitude within the correlation set back to the threshold limit. This feature renders the holographic process stable in the sense that, when approaching the limit of numeric resolution for the correlation values (i.e. 256 integer discrete in the event that a byte storage is used), long term memory decay may be invoked avoiding adverse effects incurred by data truncation or clipping. Only numbers of relatively low resolution (8 or 16 bit) are therefore required to represent the real and imaginary components of complex values within the correlation set [X]. This characteristic also permits analog storage devices of relatively low dynamic resolution to be used effectively with little degradation in operational capabilities (i.e. storage density/ recall accuracy).

A limit on short term memory may be set by establishing the memory threshold limit at a fixed value scaled to 2.0. It is important to note that this threshold value establishes a proportional mean magnitude (or confidence) for responses generated from non-learned or unrecognized input stimulus. Random statistical tests indicate that the average correlation set magnitudes stabilize somewhat below the upper limit in magnitude presented by [45B], irrespective of the number of encodings. In other words, the holographic property displays a characteristic whereby an unbounded number of stimulus-response associations may be encoded into a correlation set of limited finite resolution, without the requirement for memory decay. Long term or permanent memory (~1.0) therefore displays an unbounded capacity for stimulus-response encodings, however a high degree of fuzziness in response recall. Conversely, short term memory profiles (<1.0) display a significantly reduced level of fuzziness in the expressed response, however, a limited capacity for storage of distinct stimulus-response mappings. The confidence levels expressed for non-recognition stimulus within the short term memory characteristic are reduced over the long term memory providing a greater band for recognition discrimination. Using this modifiable feature of dynamic memory characteristics, one may configure a neural network whereby distinct groups of neuron cells possess different memory profiles extending over any range from immediate short term to long term or permanent memory.

Higher Order Systems

Conventional ANS models are reasonably restricted in terms of the numbers of associations that may be accurately encoded into a network. Within the holographic process, limitations on storage density are largely overcome by using a preprocessing operation involving the generation of higher order product terms from the raw stimulus set [S]. The response recall error relationship presented in equation [27], relating storage density to size of stimulus field, remains valid for the situation in which the cells stimulus field is expanded to a higher order dimensionality, whereby each element is comprised of a higher order product generated from even a small initial data set. This error relationship [27] relating pattern storage density and stimulus field size is valid providing the set of higher order product terms are unique. That is, no two higher order product terms have been constructed from the identically same set of raw input values.

In one limited example, the input data field may be expanded to a Hermitian matrix form in generating a complete set of second order terms. This Hermitian form may be obtained by representing a set in [S] as a 1 by N linear matrix, and evaluating the following outer product:

$$[H] = [\bar{S}]^T \cdot [S] \quad [46]$$

A matrix of the following form is thus generated:

$$[H] = \begin{pmatrix} 1 & \lambda_1\lambda_2 e^{i(\theta_1-\theta_2)} & . & . \\ \lambda_2\lambda_1 e^{i(\theta_2-\theta_1)} & 1 & . & . \\ . & . & . & . \\ . & . & . & . \end{pmatrix} \quad [47]$$

The above form is skew symmetric, therefore a redundancy exists in that the lower diagonal forms a set of terms not unique to the matrix upper diagonal. From simulation one may verify that the same encoding densities are attained using the entire matrix expansion vs only the upper or lower diagonals. The number of unique terms generated from the above Hermitian expansion are:

$$N/2(N-1) \qquad [48]$$

The process may be further generalized such that a data field represented by linear matrix [A], forming a set of M elements disjoint to data field [B] having N elements may be expanded as an outer product solution. The expansion may involve, but does not necessarily require, the conjugate transform of phase elements within either data set. One possibility is the following second order outer product expansion:

$$[H]=[A]^t \cdot [B] \qquad [49]$$

For stimulus data fields expanded as above and providing that all product terms are unique, the deterministic "error" within a response recall (decode operation) follows the relationship defined by [27] now realizing that the stimulus field contains MxN distinct complex elements. One may expand the process still further to facilitate mapping of higher (>2nd) order statistics into the neuron cell. An input data field expanded to 4rth order statistics, for example, may be generated by the following product solution for a higher order term k:

$$s_k = \prod_{m=1}^{4} \lambda_{r(k,m)} e^{i\theta_{r(k,m)}} \qquad [50]$$

where r(k,m) is some arbitrary function which selects the input data element as a function of k and the product term m.

The above product solution performs both a phase rotation over the group of data elements and evaluates a net confidence level for the higher order term. The extraction of terms (i.e. r(k,m) in equation 50) from the initial raw stimulus data set may also be applied in a pseudo-random manner to obtain an even distribution of statistical measures. Again, this production of higher order terms is applied such that a uniform distribution is obtained over the total possible set. These higher order product terms form essentially an "anded" condition over the input elements evaluating the net confidence value (magnitude) for the higher order term in accordance with probabilistic rules. This concept may be illustrated more directly where the confidence for the information element m is simply the magnitude:

$$\lambda_m \qquad [51]$$

Any single data element therefore of low confidence will attenuate the net confidence within an associated higher order product term. This maintains a valid confidence profile over higher order terms. For instance, in a fourth order product as indicated previously:

$$|s_k| = \lambda_1 \cdot \lambda_2 \cdot \lambda_3 \cdot \lambda_4 \qquad [52]$$

These higher order expansion terms may be incorporated both within the encoding and decoding operations to form the following generalized sigma-pi form encoding $$x_k = \sum_{t}^{p} \gamma_t e^{i\phi_t} \prod_{m=1}^{M} \lambda_{r(k,m)} e^{-i\theta_{r(k,m)}} \qquad [53]$$

decoding $$r = \frac{1}{c} \sum_{k}^{N} X_k \prod_{m=1}^{M} \lambda^*_{r(k,m)} e^{i\theta^*_{r(k,m)}} \qquad [54]$$

Reiterating, the number of phase elements within the above product terms (M) defines the order of the statistic. The response recall error characteristic for any statistic of order >0 follows the relationship defined in equation 27 providing that the expanded set form unique product groups. Uniqueness again refers to the set of all combinatorial groups of N input elements in which no two product groups are comprised of the same set of raw stimulus elements, irrespective or commutative order or conjugation. The limit imposed by uniqueness establishes a theoretical upper limit for the total number of higher order terms that may be generated for a given data set, and correspondingly an upper limit for the storage density of the neural cell (assuming static data fields).

The number of unique higher order terms may be extremely large for initial data fields of relatively small size. The following relation, well known within combination theory, determines the number of unique statistics based on an initial data field size N and order of statistic M:

$$\frac{N!}{M!(N-M)!} \qquad [55]$$

Table 1 lists values for the above combinatorial relationship for input data fields ranging from 2 to 20 elements. For any size of data field, the total number of unique combinations summed over all higher order statistics is given simply by: $2^N$. Again, where N is the number of complex elements within the initial input data field. Implications of the above are extremely important in that generation of higher order statistics provides a mechanism whereby extremely large numbers of stimulus-response mappings may be enfolded onto one correlation set (i.e. one neuron cell) given a small stimulus set. For instance, consider a relatively small stimulus field comprised of 20 values. In this case, greater than several million unique higher order product terms may be generated permitting a proportionate number of separate mappings to be enfolded onto the neuron cell. One million mappings confined within a state space bound by 20 degrees of freedom, defines a system not limited in any reasonable sense by linear non-separability concerns.

Figure 9:
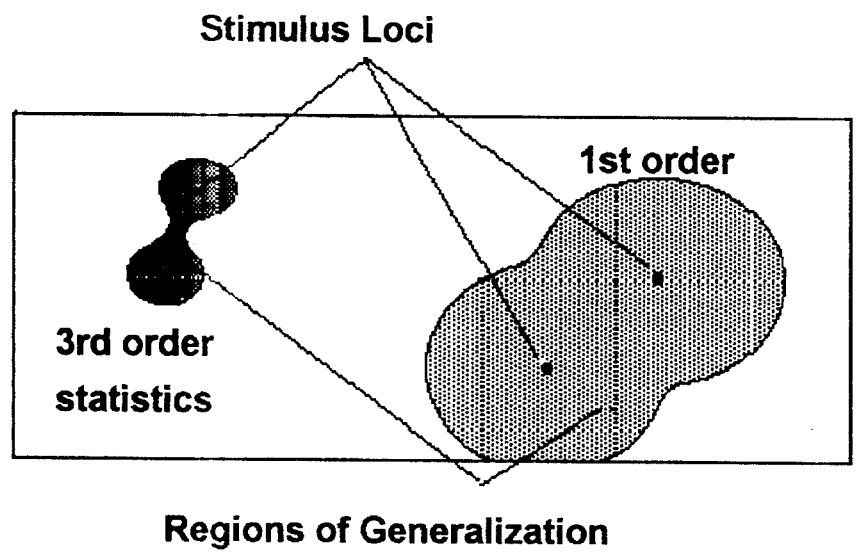
FIG. 9 illustrates the generalization region about the stimulus loci as a function of the order of statistic.

A further characteristic observed is that the region of generalization about the mapped locus point reduces in size as one increases the order of terms generated (see FIG. 9). Modifying the statistical nature of the data expansion thus facilitates a large degree of control over both the mapping and generalization characteristics within the neuron cell. Expansion of stimulus data fields to higher order terms performs a function somewhat analogous to hidden layers within gradient descent methods. For such models, hidden layers are believed to extract higher order statistics isometric between pattern templates categorized within a given class. The fundamental problem encountered within such models is that one cannot analytically determine which higher order statistics have been interpreted. Correspondingly, if the patterns vary by statistics other than those presumed to have been interpreted, pattern associations may not be correctly classified. Deterministic control of higher order statistics defining the mapping and generalization characteristics, as defined for the holographic process, is not possible within gradient descent or standard back propagation techniques.

One may deterministically modify the mapping characteristics within each individual neuron cell to suit requirements of the application. For instance, in application towards vision systems, a high capacity to discern between images may be required in the central region of the visual field (fovea centralis), while the periphery displays a lower storage capacity or mapping "resolution". Visual systems may be explicitly modified such that the central portion generates a significantly large set of higher order terms or "statistics", facilitating a more dense stimulus-response mapping topology. One may construct a system which provides the flexibility to both separate out regions of the stimulus field and provide a high level of customization in the generation of higher order statistics.

TABLE 1

Number of Terms as Function of Order of Statistic

| | Order of Statistic | | | | | | | |
|---|---|---|---|---|---|---|---|---|
| | 1 | 2 | 3 | 4 | 5 | 6 | 7 | 8 |
| 1 | 1 | 0 | 0 | 0 | 0 | 0 | 0 | 0 |
| 2 | 2 | 1 | 0 | 0 | 0 | 0 | 0 | 0 |
| 3 | 3 | 3 | 1 | 0 | 0 | 0 | 0 | 0 |
| 4 | 4 | 6 | 4 | 1 | 0 | 0 | 0 | 0 |
| 5 | 5 | 10 | 10 | 5 | 1 | 0 | 0 | 0 |
| 6 | 6 | 15 | 20 | 15 | 6 | 1 | 0 | 0 |
| 7 | 7 | 21 | 35 | 35 | 21 | 7 | 1 | 0 |
| 8 | 8 | 28 | 56 | 70 | 56 | 28 | 8 | 1 |
| 9 | 9 | 36 | 84 | 126 | 126 | 84 | 36 | 9 |
| 10 | 10 | 45 | 120 | 210 | 252 | 210 | 120 | 45 |
| 11 | 11 | 55 | 165 | 330 | 462 | 462 | 330 | 165 |
| 12 | 12 | 66 | 220 | 495 | 792 | 924 | 792 | 495 |
| 13 | 13 | 78 | 286 | 715 | 1287 | 1716 | 1716 | 1287 |
| 14 | 14 | 91 | 364 | 1001 | 2002 | 3003 | 3432 | 3003 |
| 15 | 15 | 105 | 455 | 1365 | 3003 | 5005 | 6435 | 6435 |
| 16 | 16 | 120 | 560 | 1820 | 4368 | 8008 | 11440 | 12870 |
| 17 | 17 | 136 | 680 | 2380 | 6188 | 12376 | 19448 | 24310 |
| 18 | 18 | 153 | 816 | 3060 | 8568 | 18564 | 31824 | 43758 |
| 19 | 19 | 171 | 969 | 3876 | 11628 | 27132 | 50388 | 75582 |
| 20 | 20 | 190 | 1140 | 4845 | 15504 | 38760 | 77520 | 125970 |

Commutative Property

Neuron cells based on the holographic principle display a property referred to in this text as "commutativity". What this means is that neuron cells may be connected together through summing their response outputs (see FIG. 10) while maintaining operational characteristics in proportion to the net stimulus size. In other words, groups of cells connected in this manner display operational characteristics identical to a single cell possessing the sum total of all synaptic inputs over all separate neuron cells. Information storage capacity increases in an exponential relationship to the number of cells connected in this manner. This commutative property may be indicated in a general form by the following mathematical equality:

$$[X]'[S]' = \sum_{r}^{N} [X]_r [S]_r \qquad [56]$$

The above linear matrices may be represented in the following form:

$$[X]'=([X_1],[X_2],[X_3], \ldots ,[X_N])$$

$$[S]'=([S_1],[S_2],[S_3], \ldots ,[S_N]) \qquad [57]$$

Within a practicable general purpose neural development system this property may utilized in the construction of compound cell structures. One possible compound cell structure may be constructed from multiple cells of type stellate defined as executing the enhanced encoding/decoding process described herein, each having their response fields forming the input to a pyramidal cell defined as a complex vector summation unit. The pyramidal cell essentially sums the response outputs over the connected stellate cells.

Figure 10:
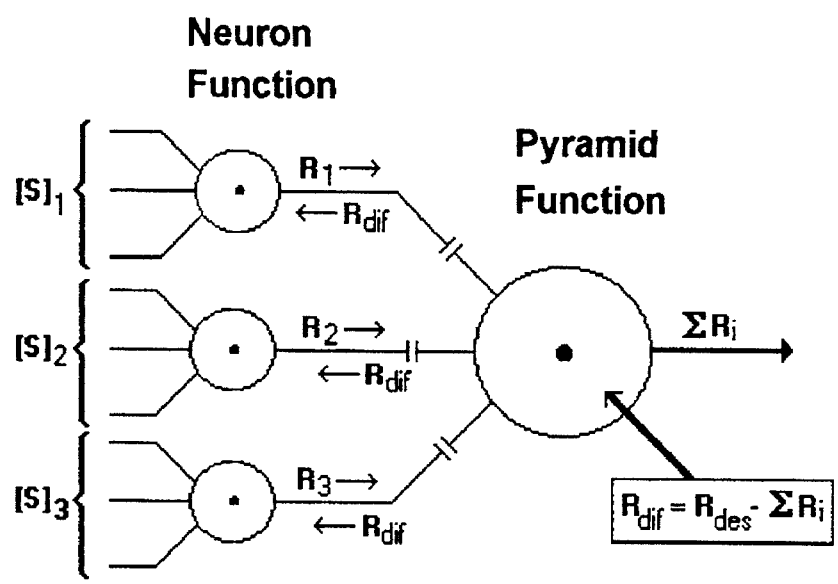
FIG. 10 illustrates the internal structure and data flow paths for the cortex module.

Cell structures configured in this manner function in a highly integrated manner as indicated above by FIG. 10. Recursion of vector difference terms ($R_{dif}$) across stellate and pyramidal cell boundaries are required to facilitate the enhanced encoding process within this compound cell structure. The desired responses over all stellate cells are defined by the response fed into the connecting pyramidal cell. Again the cortex function internally configures the above compound structure of pyramidal and stellate cells.

For a practical example, consider a system comprised of 64 neurons—each possessing 16K synaptic inputs. Individually each cell can encode up to 32K random stimulus-response associations at a reasonable degree of accuracy (~3% analog error following two learning trials). The total number of synaptic inputs over the entire system is however 1 million, and by combining multiple cells within a structure as illustrated in FIG. 10, a proportionate number of independent stimulus-response mappings (~500,000) may be enfolded onto the neural structure indicating the error characteristic on response recall.

The dynamic range of complex elements within the correlation matrix, (16 bits) permits only a theoretical limit of 32K random associations prior to saturation at this limit of numeric resolution. During configuration, the neural operating kernel determines the number of pyramided input cells and the size of each cell, allowing the pyramidal function to rescale the internal unit vector representation (default 128 integer) to a smaller magnitude. This unit representation within the generated response is rescaled to 128 at the pyramidal cell output. For instance, 16 cells each with 64K synaptic inputs establishes a total of one million synaptic inputs. Internally the neural engine rescales the unity representation for trigonometric conversions within the encoding process (i.e. rescales the 128 internal integer representation for unity to 16). The resulting effect is that resolution of trigonometric conversions within the encoding transform is decreased, however incurring a negligible effect in recall accuracy for the significantly larger synaptic array sizes.

The pyramidal cell has been designed to accommodate this commutative property as illustrated for a series of connected stellate cells (see FIG. 10) whereby the generated or decoded vector responses are summed over cells i=1 to N:

$$R_{sum} = \sum_{i}^{N} R_i \qquad [58]$$

A vector difference ($R_{dif}$) between the above vector summation term and the desired response vector R is evaluated within the summing unit (pyramidal cell) as follows:

$$R_{diff}=R-R_{sum} \qquad [59]$$

This vector difference is propagated back to each of the originating stellate cells on the subsequent encode pass. The above compound cell structure therefore requires a bi-directional transfer of information along the synaptic connections established between stellate cells and the pyramidal cell as illustrated in FIG. 10. The cortex function internally allocates multiple neuron cells (determined by the number of stimulus input fields to the cortex function) each of which are connected together in the above manner, effectively forming a "superneuronal" structure operating within an enhanced learning mode as described herein.

Content Addressable Memory

The holographic neural process ideally embodies the concept of content addressable memory. Multiple pattern associations, at nearly arbitrary levels of complexity, may be enfolded onto a neuron cell. Encoded responses or "outputs" may subsequently be generated or accessed from the cell via content of input. Input fields may be representative of addressing schemes or tags, and are transformed in an inherently parallel manner through all of the content "addresses" enfolded within the cell. In response to an address or stimulus signal, the cell regenerates the associated output vector indicating also the degree of confidence in that output association. The holographic process can be structured to operate directly within the context of content addressable memory whereby input-output associations enfolded within a given memory "cell" are expressed directly through content of input. Realizing this capability one may construct expert or automated reasoning systems along an associative network in which each neuron cell functions, in an analog sense, as one unit of content addressable memory. Expressed associations may propagate along several neural pathways either within feed forward configuration or within a recurrent structure.

The holographic neural based process facilitates reasoning by association in the above manner, functioning within a content addressable manner. Such neural based systems may be configured to form, for instance, the operational kernel of an inference engine, for applications within expert or diagnostic systems. An illustration of a simple content addressable memory scheme operating within a recurrent loop structure is presented in the recurrent association description presented under Preferred Embodiments of the Invention.

Description of the Preferred Embodiments

Figure 11:
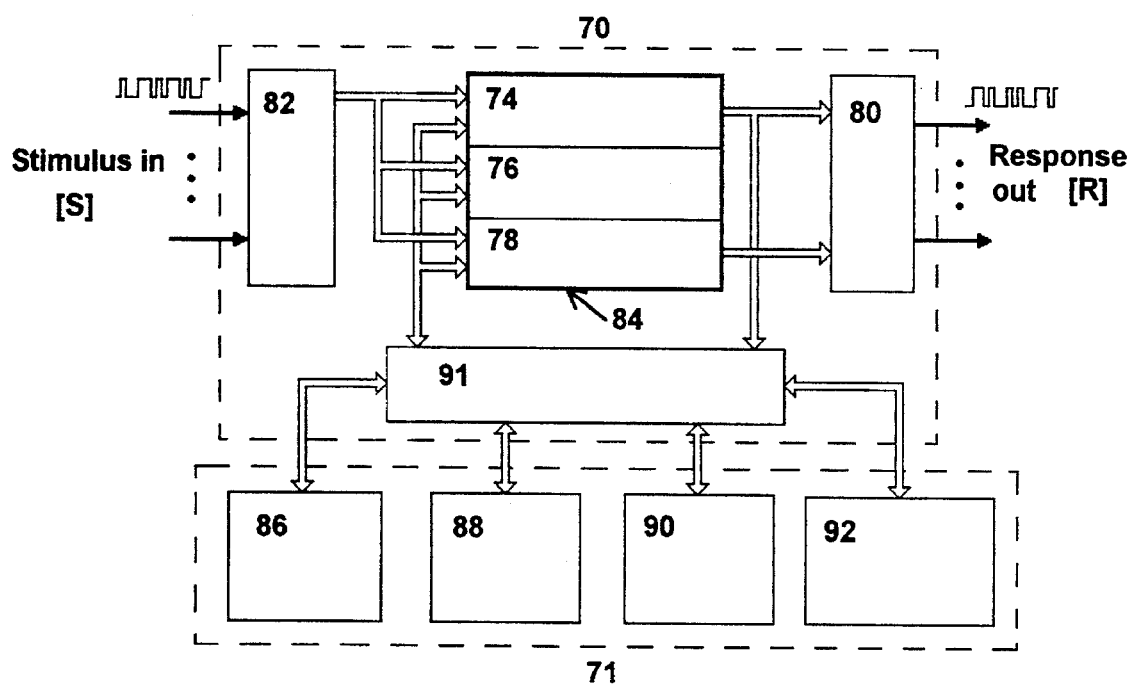
FIG. 11 illustrates a possible hardware configuration for one processing node of the neural engine.

This example of a hardware embodiment forms a conceptual basis for a possible future generation computer prototype employing as a basis of operation the holographic neural process described herein. This device shall be referred to as a neurocomputer. The neurocomputer is intended to be a general purpose in operation as facilitated by a reprogramming utility. This programming methodology however is significantly different from conventional programming methodologies and is illustrated in FIG. 11.

The hardware basis may be comprised of one or a plurality of processing nodes arranged in a manner by which data may be transferred between nodes. A single processing node within this hardware embodiment contains the following significant features:

1) A processing means (70) by which the required mathematical process to execute complex based transformations which comprise the encoding, enhanced encoding, decoding, and supplementary preprocessing operations. This processor would be general purpose in nature in order that it may execute the variety of complex manipulations as described under theory of the invention. Ideally a hardware structure capable of achieving operations in parallel would be employed.

2) Data storage means (72) by which the stimulus data and associable responses may be addressable stored. Similarly a data storage means by which correlation set data may be addressable stored, i.e. correlation substrate (86). The data storage means may also be required to storage supplementary values for executable instructions, neural configuration information classifying the cell operational category and features, and synaptic interconnect map or the data flow structure between the plurality of cells configured within the neural processor (84).

3) Memory interface unit (91) for providing access to the processor for addressable accessing the data storage means in retrieval of stimulus-response data (88, 90), correlation set data (86), executable instructions and neural configuration parameters (92).

4) Within a parallel processor configuration, means to communicate stimulus-response data to other similar processing nodes configured within a parallel processing hardware environment. This communication may be performed through a serial or parallel data transfer protocol (80, 82).

In the specific hardware embodiment illustrated in FIG. 11 two principle components are indicated within one processing node, that is the single chip microcomputer (70) and the external memory storage unit i.e. RAM, ROM, magnetic or optical storage media (72). The single chip microcomputer is representative of a component currently available on the marketplace and contains the following general features:

1) central neural processing unit (84)
2) internal addressable data bus
3) data storage registers
4) external memory interface unit (91)
5) system services/processor control interface
6) serial data communication means (82, 80)

This describes a device that configures neural cells in a virtual mode whereby these functional blocks are software configurable. These "virtual cells" in functionality perform the operations of the encoding, enhanced encoding, and decoding features of the holographic neural process. Additional virtual cells may be configured within the processor node as delineate above in the performance of supplementary tasks of generation of higher order statistics, sigmoidal redistribution of data fields, conversion from real valued to complex valued number domains, modification of memory profiles, modification of neural plasticity, and other aspects of operation indicated under the section entitled Theory of Operation.

In consideration of a fundamental operation of the device the process involved in data transfer and enhanced encoding, and decoding will be elaborated further. The complex valued elements of the stimulus and response sets may be communicated by either their real/imaginary or phase/magnitude parts. For purposes of illustration we will assume that the phase/imaginary representation is taken. Phase and magnitude are ideally expressed as analog values however in the binary representation required in digital computers one may descritize the analog range in a suitable manner. In the case of the phase valued numerical limits are established at the $0-2\pi$ regions. This range for illustration is descritized to a 0 to 255 binary representation. Similarly for the magnitude typically bounded within the 0.0–1.0 probabilistically relevant range, a integer representation may be established, for instance, over a 0 to 128 binary representation. One element or component of information within the stimulus or response fields is in this case represented by two bytes arranged in the above manner. These elements of the stimulus or response fields may be transmitted between external processor or memory unit and the neural processing unit (84) via either via the memory interface unit (91) or serial data links (80, 82) as indicated prior.

Encoding Operation

In execution of the encoding process, elements of the stimulus input set may be read into the neural processor unit either via one of the plurality of serial communication means (82), or addressable accessed from the external memory means providing facility for memory mapped input (88). Similarly the element or plurality of elements within a response set may read into the central processing means by similar access (80, 90). Note again for each of the stimulus and response elements, a two byte binary representation of phase and magnitude are read into an encoding unit within the central processor. For purposes of computational efficiency it is preferable that the correlation set [X] be stored within the external memory unit be represented in real/imaginary syntax. In similar manner the central processor reads the corresponding correlation value ($x_{i,j} \in [X]$) by addressable accessing the external memory means The encoding unit performs the process steps in operation of the encoding transform by execution of the following transformation as defined in [28] to [31] under Theory of the Invention.

$$[X] += [\bar{S}]^T \cdot ([R]_{des} - [S] \cdot [X])$$

where

[S] being the new stimulus set

[R]$_{des}$ the associated or desired response set.

The above transform superposes the learned a learned analog stimulus to response mapping onto the existing correlation set [X]. Note that for the hardware configuration presented and exhibiting the functionality of a general purpose processor, requires that the operations within the above matrix evaluations be performed in a sequential manner. The preferred embodiment would optimally employ a parallel processing hardware to execute the matrix product evaluation. The encoded element or elements of the correlation set [X] are addressable stored back into the memory storage unit which performs an analogous function to the synaptic connections of the biological analog.

Decoding Operation

In execution of the encoding process, elements of the new stimulus input set may be read into the neural processor unit (84) either via one of the plurality of serial communication means, or addressable accessed from the external memory means providing facility for memory mapped input. The corresponding complex valued element from the correlation set ($x_{i,j} \in [X]$) are addressable accessed from the external memory unit. The decoding unit performs the process steps in operation of the response recall by execution of the following transformation as defined in [14] under Theory of the Invention:

$$[R] = 1/c [S] \cdot [C]$$

Note again that the exemplary hardware configuration presented, exhibiting the functionality of a general purpose processor, requires that the operations within the above matrix evaluation to be performed in a sequential manner. The preferred embodiment would optimally employ a parallel processing hardware to execute the matrix product solution. The response recall [R] may be transferred to external processing nodes via a plurality of serial data transfer links or vis the addressable accessed external memory unit for memory mapped output. Note again that the response set generated in the recall is comprised of a set of complex values represented in phase/magnitude format and within a binary (two byte) value for this illustration.

Supplementary Operations

A third function block as described in FIG. 11 within the central processing unit is related to the supplementary features of the process (78). These functional units access and store stimulus-response data in a similar manner to the encoding/decoding processes as described previous. The types of supplementary processes are varied however include the functions of generation of higher order statistic, sigmoidal processing, complex vector summation operations, outerproduct generation, modification of magnitude values within the composite complex values, matrix conjugation, matrix inversion, to name a subset of possible transformations. This functional group includes all of the supplementary operations described under the section pertaining to Theory of the Invention.

Figure 12:
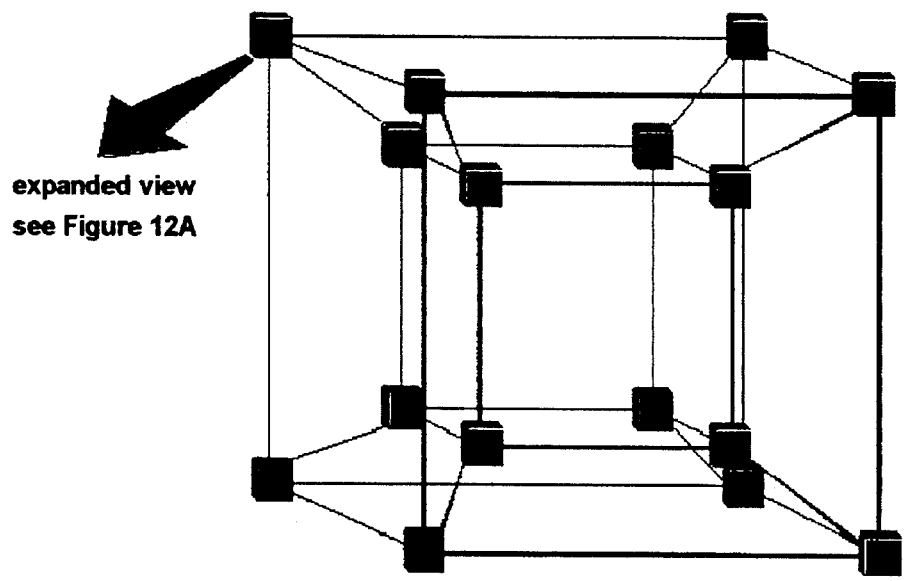
FIG. 12 illustrates data communication between processing nodes of a multiple node configuration (16 node hypercube).
Figure 12A:
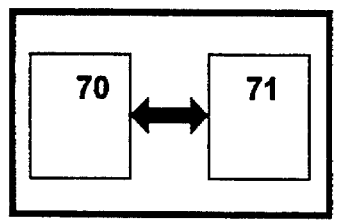

A plurality of processing nodes, as depicted in FIG. 11, may be interconnected via serial or parallel communication means to form an array of neural elements in a parallel and possibly asychronous fashion. One possible parallel configuration is illustrated in FIG. 12 and this embodiment is comprised of 16 processing nodes of similar type. Again each processing node may for instance consist of the hardware embodiment presented in FIG. 11. The interconnection arrangement presented is generally referred to as a Boolean hypercube. In this arrangement, each processing node addressable accesses its own local memory and communicates directly with the neural processing unit of the four nearest nodes via bidirectional communication means. In illustrating the likely characteristics of the above artificial neural device in terms of total number of possible synaptic connections and rate of processing in terms of synaptic connects per second, a system is evaluated (as presented in FIG. 12) using the operational specifications from existing available components. The specifications for the constituent processor and external memory components are as follows:

| | |
|---|---|
| -local memory/node | 4 Megabytes |
| -Processing speed/node | 15 Million instruction cycles per second |
| -Instruction cycles/synaptic connect | 200 |

The memory requirements for each element of the correlation set ($x_{i,j} \in [X]$) may be established at 4 bytes determining a 16 bit resolution each for the real and imaginary components of the complex value. The number of synaptic analogues that may be stored within the above 16 node embodiments is therefore: 16 million synaptic analogues.

Similarly the rate of processing is evaluated as follows:

(number of nodes) * (instructions/second)/(instructions/ synaptic connect) =1.2 Million connections/second The above illustrative example of a preferred embodiment is capable of flexibly configuring a arrangement of functional cells within neural configuration having a potential storage of 16 million synaptic connections and a rate of execution at 1.2 synaptic connects per second.

Although the preferred embodiment as well as the operation and use has been specifically described in relation to drawings, it should be understood that variation in the preferred embodiments could easily be achieved by a skilled man in the trade without departing from the spirit of the invention. Accordingly, the invention should not be understood to be limited to the exact form revealed in the drawings.

Structure of a Proposed Neural Engine

The HNeT (for Holographic NEural-neT) operating kernel permits the user to structure the neural engine as a virtual array of cells, having data flow paths established between these cells. A general purpose neural computing system of this type allows the applications developer to structure a wide range of cell configurations as well as establish the associated data flow paths between such cells. Naturally a device of similar operation may be constructed in a non-virtual manner whereby the cells are specifically hardwired within the physical embodiment to optimization operation over a more restricted class of neural configurations or dedicated applications. The holographic neural process forms essentially a non-connectionist model in which each individual cell may exceed the functionality of highly complex neural network structures of the prior art (i.e. functionality in terms of memory storage capacity, speed of learning, and accuracy of recall). The HNeT system is structured such that the entire neural kernel is resident within the dedicated neural microprocessor on-chip RAM and structures allocated for the configuration of cells are located in the slower off chip memory. Off chip memory access in this arrangement is required therefore only in the access to cell allocation parameters, data fields, and correlation sets associated with a category of neural cells. Executable code and associated trigonometric lookup tables within this "neural engine" are access soly from the higher speed cash memory.

Figure 13:
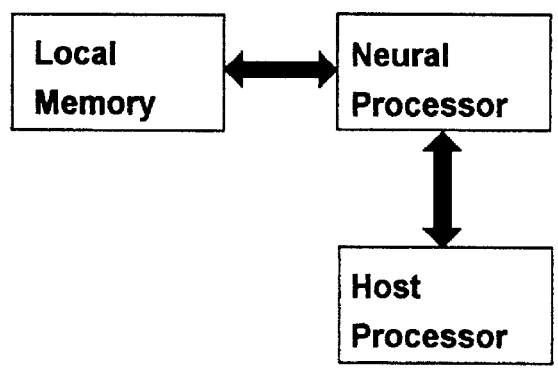
FIG. 13 illustrates a possible hardware configuration for a neural based applications system.

The users application program, resident within a host processor, facilitates the initial configuration of the neural engine as stated 1 above, and means to transfer complex valued data sets to the neural coprocessor as well as set the neural engine into execution. This neural coprocessor and host processes may communicate via a high speed port or data bus, but otherwise function in an independent manner, accessing both executable code and data from their own local memory. FIG. 13 presents a functional block diagram for the above hardware structure for the HNeT neural based system.

Cell types which may be configured within the neural engine may be coarsely segregated into three categories as follows:

input cells operator cells neural cells

Figure 14A:
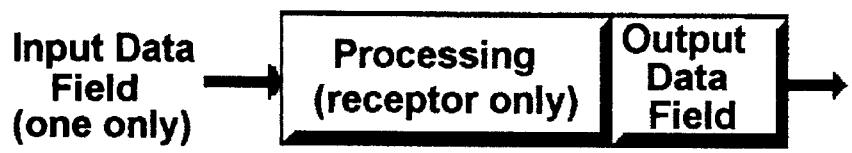
FIG. 14 illustrates the general structure of cells within the neural engine kernel.
Figure 14B:
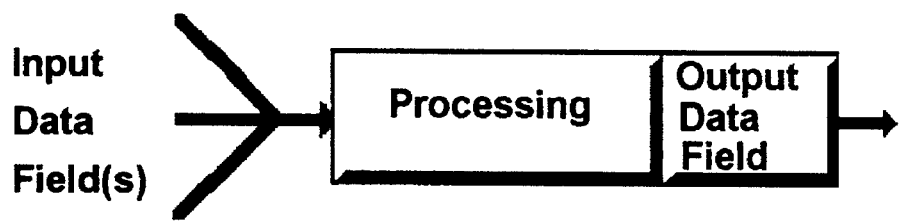
Figure 14C:
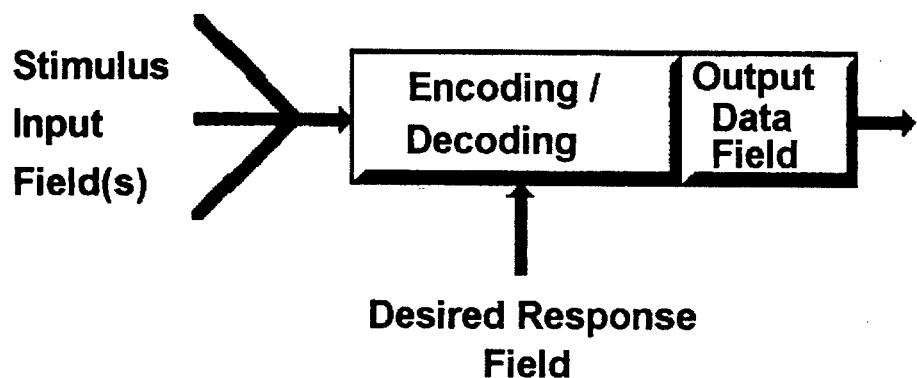

Cells within each of these categories have a general structure possessing one or more input fields and one output data field as indicated in FIG. 14.

Input cells operate primarily as storage buffers for data fields read into the neural engine from the host processor. Other cells within the neural configuration (neural or operator cell types) read data fields which are stored within these input cells. An illustrative but not comprehensive list of possible input cell functions are provided in Table 2.

Operator cells permit one to structure a wide range of data manipulation operations and complex vector transforms over data fields, storing the result within the cells output field. These cells are used essentially to perform preprocessing operations over the data fields read into the neural engine. Operator cells perform a wide range of functions, for instance, expanding an input field to higher order statistics genstat, extracting a portion of a data field extract, performing a complex conjugate transform over data field elements reflect, and a number of other operations. An illustrative but not comprehensive list of possible operator cell functions is provided in Table 3.

Neural cells are illustrated here by two exemplary cells cortex and cerbelum. This category of cell perform the encoding/decoding processes within the neural engine, storing stimulus-response mappings onto one or more correlation sets. Holographic neural cells both function and are structured in a highly generic manner. Each cell is capable of receiving one or more stimulus input fields (each field comprised of a set of complex values), and can both learn (encode) and express (decode) a response field associated to that input stimulus. This generic structure for neural cells, combined with the flexibility to structure data flow between cells in any manner. An illustrative but not comprehensive list of possible neural cell functions is provided in Table 4.

In general, the output data field of any cell type may provide input to any other cell subsequently configured within the neural engine. A pseudo-code format has been adopted in the illustrative examples whereby, configuration calls for allocating cells within the neural engine return a label to the cells output data field. For instance, one may configure an input cell receiving a 10 by 20 data field array from the host application program. This cell is allocated within the neural engine simply by the following configuration call:

A=buffer(10, 20);

The above label A may be used within the parameter list of subsequent cell allocation calls, for configuring cells within the neural engine. These cells subsequently use the output data field referenced by label A (i.e. data field stored within above buffer cell) as their input. Below is an example for the functional cell genstat which expands its input data field to higher order statistics. This operator cell reads the data field referenced by label A, and returns a label to its output field (B), containing for instance 200 second order terms as illustrated below. Again, the genstat operator cell accesses data field (A) stored within the buffer cell by reference to the label returned i.e.

Figure 15A:
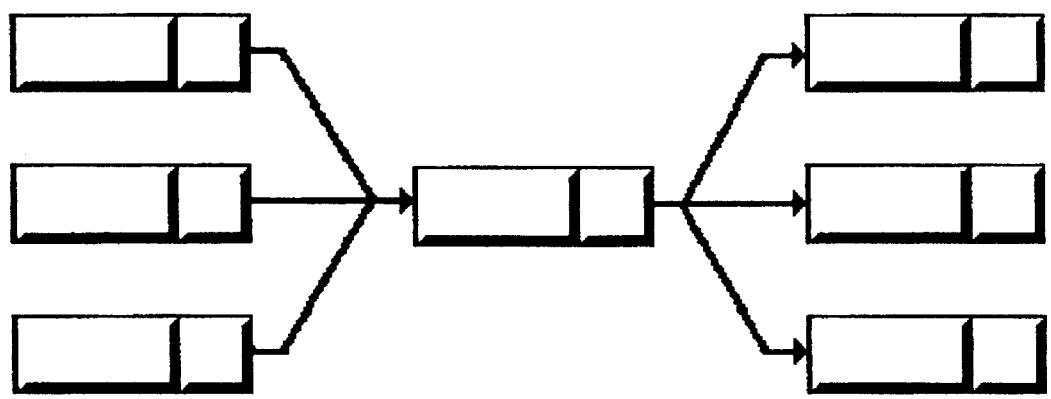
FIG. 15 illustration possible data flow assignments between cells within a multicellular neural configuration.
Figure 15B:
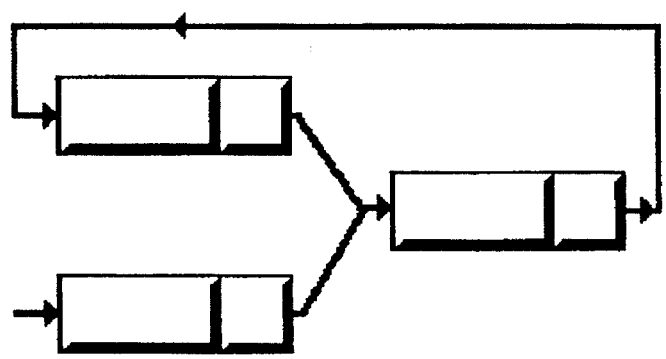

B=genstat(2, 200, A);

In this manner, a configuration within the neural engine is built up from a series of configuration calls. Using combinations of feed forward and recurrent data flow paths, arrays of cells may be structured in nearly any manner. One may, for instance, fan out a cells output field to any number of subsequent cells. Recurrent data flow paths may be established, whereby data fields generated within higher layers may be fed recursively to the input fields of cells located within lower layers. Expanding further, a general purpose neural based system may configure operator cells which combine subsets of output data fields within a single cell (i.e. fan in structure). These various structures for data flow (i.e. fan in, fan out, recurrent flow) are illustrated below in FIG. 15.

A data field as defined herein refers essentially to a set of complex values. The size of the data field of course indicates the number of complex values, or information elements, within that field. For purposes of extracting and appending sections of these data fields, the fields may be arranged as two dimensional arrays or "matrices" of complex values (see FIG. 16).

Figure 17:
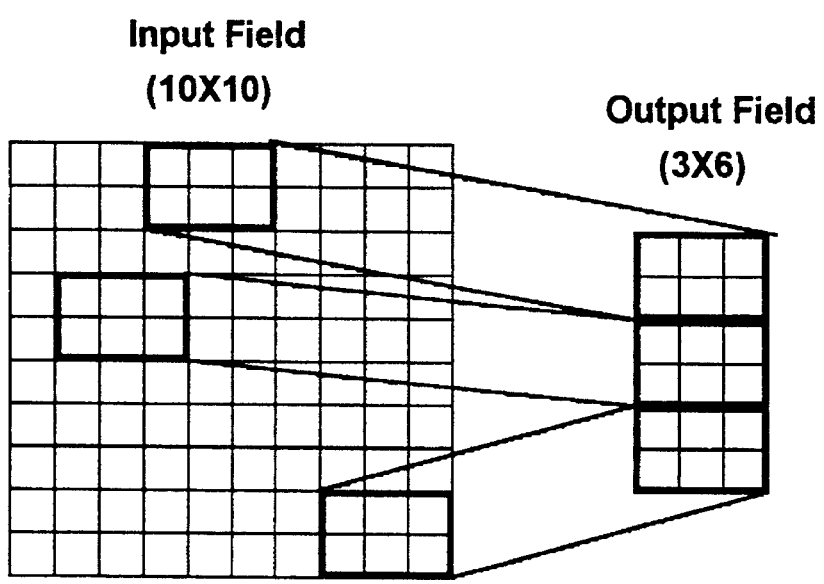
FIG. 17 illustrates the extraction of data elements from within defined windows of a data field.
Figure 18A:
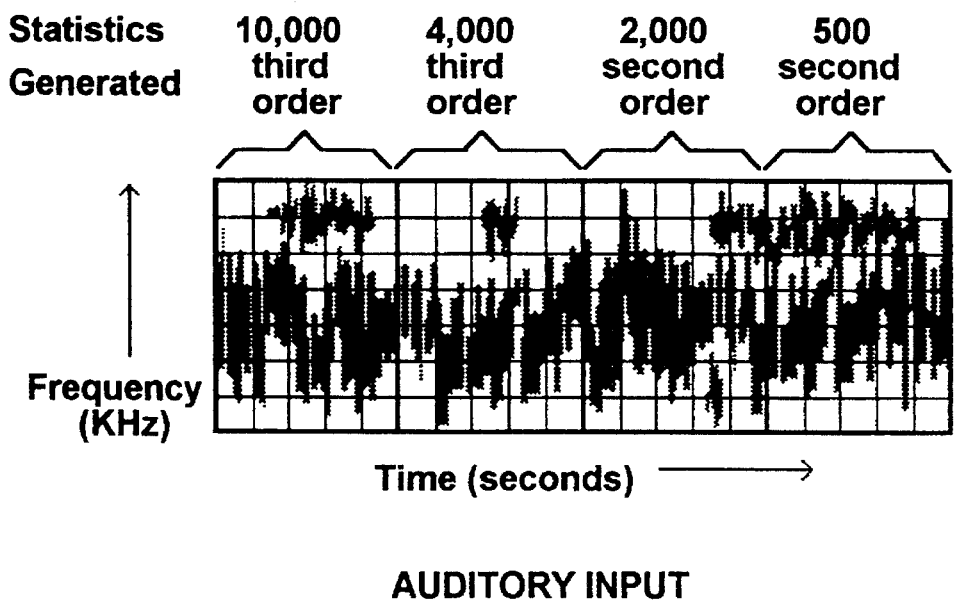
FIG. 18 illustrates possible types of data transferred to the neural engine.
Figure 18B:
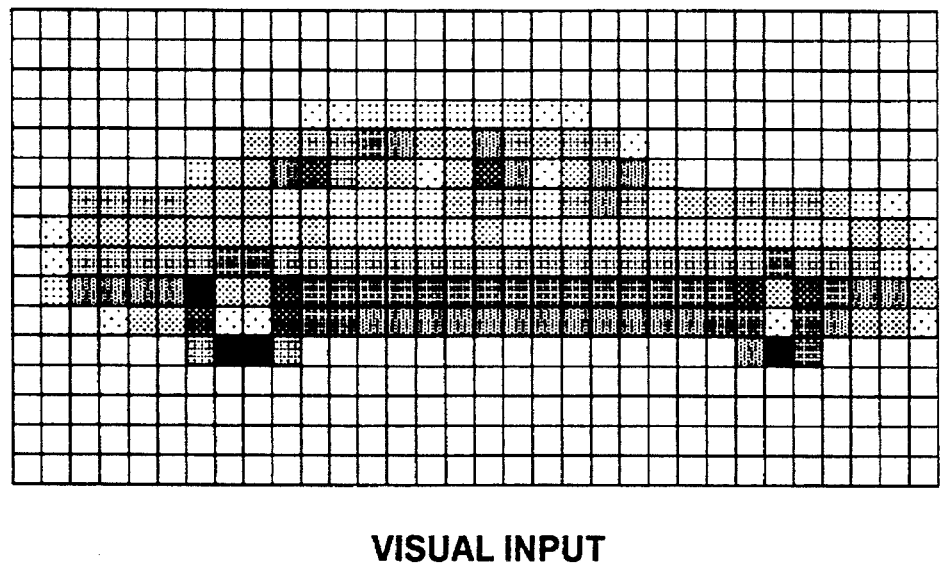

A set of operator functions may allow one to perform operations over defined windows within these data fields, permitting a greater level of control over manipulation of data. Operations involving the appending or extraction of window regions within data fields may correspond to sections of data defined over a physical domain. FIG. 17 illustrates an example of the extract_wnd function used to configure a cell which extracts window regions from its input field (see section pertaining to operator cell functions).

Figure 16:
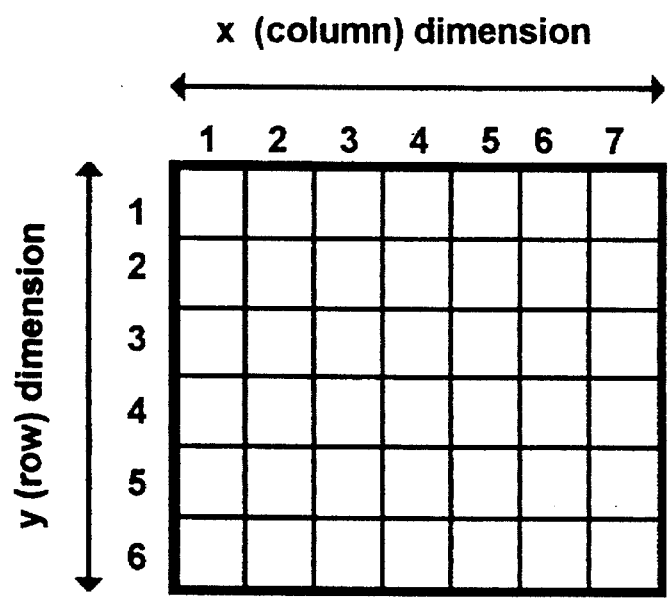
FIG. 16 illustrates a two dimensional (matrix) format for data fields.

The two dimensional axis for a data field may represent physical parameters such as frequency/time as in an auditory input, or the x/y pixel position within a visual field (see FIG. 16). Manipulation of data sets within this two dimensional format permits one to design separate neural configurations operating over different regions within a visual field, spectral frequencies, etc. Using these library functions provided to operate over window regions of a data field, the user may construct several separate neural configurations within the neural engine, each dedicated to separate regions or aspects of the raw input data.

Figure 19:
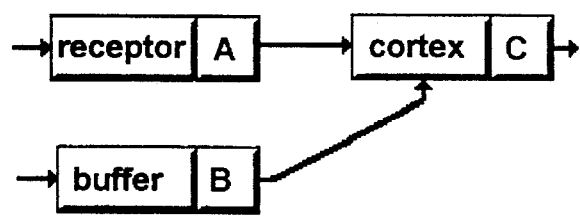
FIG. 19 illustrates a simple feedforward neural configuration.

This convention as used within a general purpose neural based development system may construct highly powerful networks, requiring relatively few configuration calls to establish the internal arrangement of cells. The following provides an example of a neural configuration established through three configuration calls, this configuration consisting of two input cells and a neural (cortex) cell. Input cell (A) receives a stimulus field of size 10 by 10 and cell (B) receives a desired response field of size 1 by 4. These two cells provide input to the respective stimulus and desired response input fields for the cortex cell. This configuration is illustrated by FIG. 19 and an illustration of the form of configuration calls required to establish this configuration within the neural engine is presented as follows:

A=receptor(10, 10);
B=buffer(1, 4);
C=cortex(B, A, ENDLIST);

This simple neural configuration may be used to encode or generate a mapping of a stimulus field comprised of 100 analog values to a response field comprised of 4 analog values. One may subsequently express these associations during decoding cycles of the neural engine. Many useful and highly advanced applications may be fulfilled using only a very simple neural configuration of the type illustrated above.

The neural engine functions in essentially two modes of operation, that is;

1) configuration of the neural engine as defined above, and
2) neural engine execution.

The execution phase consists principally of porting raw input data fields to the neural engine, enabling an execution cycle, and reading generated response values back to the host processor. During this execution phase, the host may functions principally as the interface for system console, I/O servers or controller over any peripheral devices. The bulk of tasks performed by the host resident program will normally be related to the processing or conversion of data read from peripheral devices, and porting of these data fields to the neural engine. During an execution cycle, the coprocessor resident neural engine and the host resident application optimally function concurrently, maximizing usage of both neural and host processing facilities.

Input Cells

The structure of cells belonging to the input cell category is indicated in FIG. 14. Input cells function essentially as buffers for data transferred from the host processor into the neural engine, prior to an execution cycle. An illustration of possible input cell types is presented in Table 2 below and a brief description offered each following:

TABLE 2

List of Input cells

| Name | Description |
| --- | --- |
| BUFFER | Operates as a storage buffer for data fields read if from the host processor. This data subsequently read in from other cells within the neural configuration. |
| RECEPTOR | Input buffer as above and redistributes the phase elements within the input data field to symmetrical form using sigmoidal transform described by [5] and [43]. |
| RECURSE | Copies the output data field from a designated cell within the configuration to this cell data field permit recursive data flow within the arrangement of cells |

(note - this list is merely illustrative and does not provide an exhaustive set of possible cell functions)

Subsequent cells allocated within the neural configuration generally perform either preprocessing transformations on these data fields read in (operator cells) or perform the encoding/decoding operations of neural cells. In this illustration the buffer input cell remains dormant during an execution phase of the neural engine and performs only allocation of memory for storage of data fields, read or transferred from the host application. The receptor input cell performs a similar function as above; however, during the initial phase of an execution cycle within the neural engine, a sigmoidal transformation is performed within this cell to redistribute the data field to a symmetric form (see section pertaining to symmetry considerations on page 67).

Figure 20:
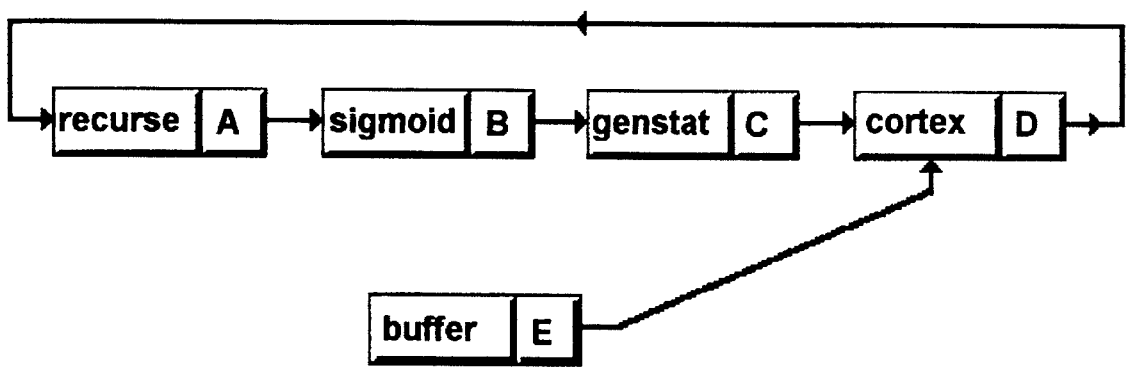
FIG. 20 illustrates a simple recurrent neural configuration.

The last input cell illustration, recurse copies a data output field generated by the designated source cell to its own output data field. The source cell may be any cell defined within the neural configuration. Due to the order of execution by which cells may be generally resolved (i.e. input cells resolved prior to execution of operator or neural cells), recurrent data fields may be transferred on the following cycle of execution as illustrated in FIG. 20. In this configuration, the output field of cortex cell (E) forms a recurrent data flow to the recurse cell (A). During the execution cycle at $t_n$ the neural engine generates the output field (E) from stimulus input data read into cells A and B. At the commencement of the next execution cycle $(t_{n+1})$, the input cells are resolved initially whereby, in this example, the recurse cell copies data field (E) onto its data field. Operator and neural cells are then executed in the sequence by which they appear within the configuration code. In this example, the sigmoid cell (C) is executed, followed by execution of the genstat cell (D) and cortex cell (E). A new data output field for the cortex cell (E) is produced at the termination the next execution cycle $(t_{n+1})$. Recurrent data flow within any neural configuration is facilitated in a manner similar to the above.

Operator Cells

The structure of the operator cell contains one or more input data fields and one data output field. This structure is illustrated in FIG. 14. Operator cells function in a manner whereby they receive input data fields, perform a defined operation on that data field, and store the generated result in the cells output field. The primary function for this category of cells are the manipulation and/or preprocessing of data fields prior to input into a neural cell for encoding and decoding of stimulus-response associations. The decoding/encoding functions are not performed within operator cell. An illustration of possible operator cells operations are presented in Table 3.

TABLE 3

List of Possible Operator Cells

| Name | Description |
| --- | --- |
| APPEND | Appends multiple input data fields from designated cells into this cells output data field. |
| CONFSET | Sets vector magnitudes of complex elements within the designated cells output data field to a specified value. Stores the result in this cells output data field. |
| EXTRACT | Extracts complex data elements from the designated cells output field. Elements are extracted in a linear sequence and stored on this cells output data field. |
| PROD | Multiplies all elements within a designated data field by a COMPLEX constant. Stores the resultant values within its output data field. |
| GENSTAT | Receives data from a designated cells and expands these terms to higher order products using a process described by eq[50]. Stores result in this cells output data field. |
| REDUCE | Reduces the designated cells data field to smaller dimension by averaging adjacent elements in the matrix. Stores the result in this cells data field. |
| REFLECT | Reflects the phase component for elements within the designated cells data field about an intersection through the origin. |

TABLE 3-continued

List of Possible Operator Cells

| Name | Description |
|---|---|
| | Stores the result in this cells data field. |
| ROTATE | Rotates the phase component for elements within the designated cells data field by a specified angle. Stores the result in this cells output data field. |
| SIGMOID | Redistributes phase orientations of elements within the designate cells data field to a symmetric state using a sigmoidal transform. Stores the result in this cells output. |
| THRESHOLD | Non-linear scaling of complex elements magnitudes about a threshold value. Stores the result in this cells data field. |
| OUTERPROD | Evaluates the outer product solution over the data stored within two designated cells and stores the resultant set of COMPLEX values within its data output field. |
| TRANSPOSE | Performs a matrix transpose operation on a designated cells output data field. |
| WINDOW-BASED OPERATOR CELLS | |
| AVERAGE-WND | Evaluates complex vector average over windows assigned within a designated cells output data field. Stores the result within this cells output data field. |
| CONFSET-WND | Sets the elements magnitude component to a specified value over a series of windows assigned within a designated cells output data field. Stores the result in this cells output data field. |
| EXTRACT-WND | Same as above except this cell extracts data from specified window regions. |
| PRODUCT-WND | Same as above except evaluates the complex product over elements located within the specified window region. |
| SUM-WND | Same as above except evaluates the complex summation over elements located within the specified window region. |

(note - this list is merely illustrative and does not provide an exhaustive set of possible operations)

The general functions that may be performed within the various operator cells are grouped as follows:

1) Extracting or Appending Data Fields

One may configure operator cell to extract subsets of complex elements from existing data fields. Elements from these data fields may be extracted in either a predefined or pseudo-random manner ie. extract/extract_rnd. Extracted values may also be defined over a linear array or within a window region of the input data field extract_wnd. Similarly, any number of data fields may be appended into a single field via the use of the append function. Various optimization methods may be used to minimize the amount of memory required to store appended data fields.

2) Data Field Transformation

This functional group performs complex vector transformations over data fields. Transformation operations include generation of higher order terms genstat, complex vector rotation/translation rotate/reflect, and complex vector product/sum operations prod/sum, matrix transpose operation transpose, formation of outer product from two input fields outerprod, to illustrate a limited variety of possible trans- form cell types. Also included is a cell performing a sigmoidal transform over its input data field sigmoid, where phase orientations are redistributed to optimize symmetry characteristics.

3) Modification of Confidence Values

These class of functions may perform operations on the confidence levels (magnitudes) of the complex elements within a data field. These operator cells facilitate user control over confidence levels established within information or data fields. Confidence levels may either be set to specified values confset or linearly scaled by a specified factor confscl. Confidence levels may also be scaled over a non-linear (sigmoid) relationship using the threshold function.

4) Window Based Operations

As defined previously, window cells permit the user to define multiple windows within an input data field and perform complex vector transforms or data extraction for elements located within that window. Transform operations may include but are not exclusively limited to vector product, sum, and averaging, as well as modification of magnitude (confidence) levels.

Within a general purpose architecture as described previous, any of the above operator cell functions may be implemented on any data field within the neural configuration, permitting maximum flexibility in construction of design. Again, operator functions are generally configured to perform preprocessing operations on data fields prior to input to neural cells.

Cortical Cells

The category of cells have a structure somewhat different from both the input and operator cells. Cortical cells have one or more stimulus input data fields and an associated desired response input field. The desired response input field is read only during an encode execution cycle of the neural engine. The cortical cell generates a mapping of the input stimulus fields to the set of values contained within the desired response input field. By means of holographic encoding, a plurality of such stimulus-response mappings may be enfolded onto the identically same correlation set. This cell category therefore performs the principal function within the neural engine, that is, encoding (learning) and decoding (response recall) of analog stimulus-response associations. The cortical cell generates as output a single data field, this field containing the generated outputs for response recall (i.e. decoding). The structure for this category of cells is indicated below in FIG. 14. A variation of composite cortical cell types may be configured combining the fundamental operational (stellate/pyramidal) cell and various operator cells as described previous.

TABLE 4

List of Cortical Cells

| NAME | DESCRIPTION |
|---|---|
| STELLATE | Executes the fundamental encode/decode processes of holographic neural process generating in generation of the correlation set [x] and response recall. |
| PYRAMID | Ancillary cell permits the outputs from multiple stellate cells to be summed realizing the "commutative" property described in [57] to [59] and FIG. 10. |
| CORTEX | Compound cell structure composed of the above stellate and pyramidal cells arranged in connective paths illustrated in FIG. 20. |
| CERBELUM | Compound cell structure composed of a genstat operator cell and stellate and pyramidal cells as defined above. The internal structure is illustrated in FIG. 20. |

(note - this list is merely illustrative and does not provide an exhaustive set of possible composite neural cell structures)

Figure 21A:
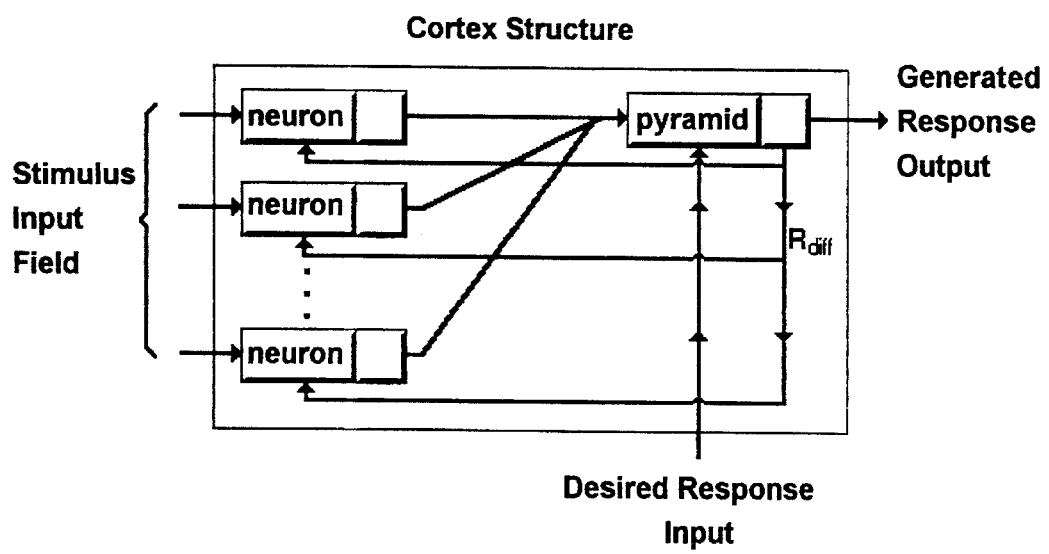
FIG. 21 illustrates the cortex and cerebellum compound cell structures that may be formed within the neural engine.
Figure 21B:
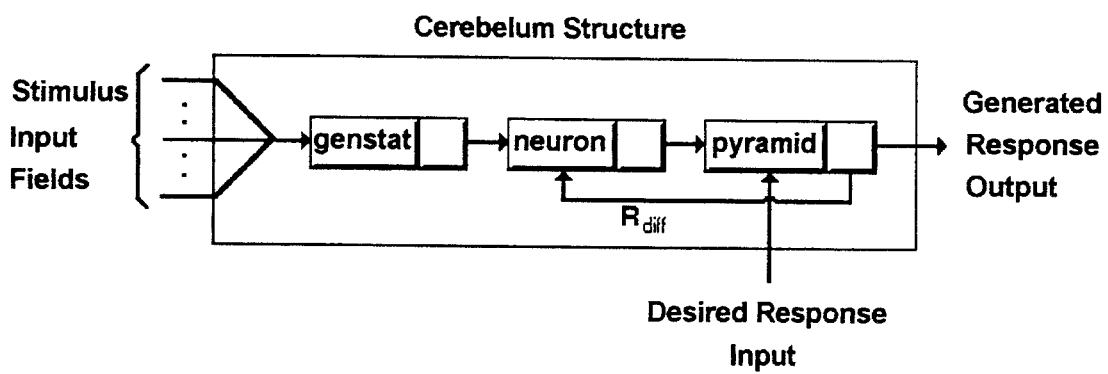

For instance the composite cell (cortex) establishes a compound cell structure built upon of unitary cells of type stellate and pyramidal. This compound cell structure forms what has been referred to as a superneuronal structure (see section in Theory of the Invention pertaining the commutative property) whereby the generated response fields from multiple cells of type stellate performing the holographic based encoding/decoding process and generation of the correlation set are fed into a single pyramidal cell which executes the vectorial addition over corresponding elements within a plurality of generated response fields (see FIG. 10). This configuration permits multiple stimulus fields to be fed into a single cell structure, with this cell structure operating as an integrated whole. A second example of a composite neural cell is illustrated by the cerbelum cell which again configures a compound structure similar to the above, however the user has the option of expanding the stimulus input field size up to any order and number of higher order terms or "statistics". The cerbelum cell configures a structure which executes the sigma-pi encoding/decoding process as indicated in [53] and [54]. The cell structures configured by both the cortex and cerbelum functions are illustrated graphically in FIG. 21.

For the above illustration of composite neural cell types, an enhanced encoding process may be functionally employed whereby learning is a function of the memory previously enfolded within the cell's correlation set. This enhanced encoding process facilitates automatic control over attention, whereby only new stimulus response associations influence the mapping substrate (memory means storing the correlation set). This process also permits reinforcement learning whereby the analog error on response recall may be substantially eliminated over few (typically <4) reinforcement learning trials.

Memory

Memory embodies the stimulus-response associations or "mappings" enfolded within the correlation set, allocated for cells belonging to the neural category. These correlation sets are comprised of arrays of complex numbers having any predefined resolution (ie. possibly ±32K integer or 16 binary bits resolution along the real and imaginary axis). One element within the correlation set in this case is saved in four bytes of memory. The byte format for one element of the correlation set in this limited example is illustrated below:

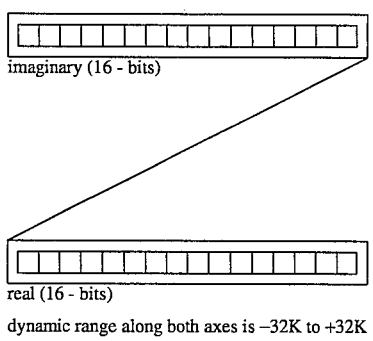

dynamic range along both axes is −32K to +32K

The size of the correlation set for a neural cell having N elements in its stimulus input field and M elements in the response field is NxM. In reading or retrieving correlation sets using the memory file transfer functions (see sections following), correlation values are retrieved by row followed by column in the format illustrated in FIG. 22. Retrieving the first row therefore presents the correlation set associating the stimulus field to the first element in the response field. The correlation set may be thus arranged in the format illustrated in FIG. 22 assuming in this example one stimulus input field, having 10 elements in the stimulus and 5 elements in the response. The neural engine allocates storage space for these correlation sets in computer memory above the neural operating kernel and cell configuration structures. These correlation sets may be read either from or loaded into the neural engine kernel using appropriate data transfer schemes.

A compound cell structure such as that configured by the cortex function may contain several stellate cells and thus allocate a proportionate number of correlation sets. The number of stellate cells within this structure is equivalent to the number of stimulus input fields defined within the cortex function parameter list. In other words, one stellate cell is internally constructed for each stimulus field read into the cortex function (see FIG. 21).

All neural cell types permit a modifiable memory profile whereby the user may specify characteristics extending from long term to short term memory. Modification of memory profile is facilitated by a memory function, see [45]. The default value specified on configuration of cortical cells is the limit of long term or permanent memory where response recall, on a cell having reached saturation encoding, produces a mean of 1.0 in the magnitude component. Random statistics tests indicate that the correlation set magnitudes however stabilize at this long term limit, irrespective of the number of encodings. The implications are that the holographic cell displays an unbounded capacity to encode stimulus-response mappings without need for memory decay, given the physical finite resolution of the storage substrate for correlation sets. A high degree of fuzziness is however displayed during response recall due to the nature by which densely populated mappings influence their proximal regions. The number of synaptic inputs (i.e. order and size of stimulus field) controls the form of the mapping topology or the capacity to map out discreet sets of encoded stimulus-response associations.

Neural Engine Execution

Following configuration of the neural engine, using executive operations on the neural engine as indicated in the previous sections, the second portion of the host program may be implemented. This comprises the execution stage of the prior structured neural engine. The basic steps normally performed during this execution phase are listed below:

1) write stimulus data fields into the neural engine 2) command an execution cycle 3) read generated response recall back from the neural engine The above indicates the general steps required for one execution cycle. One may wish to execute the neural engine in an iterative manner possibly for real time applications, or to allow the neural engine to learn temporally varying stimulus-response or "spatio-temporal" patterns. The user may also configure iterative processing among recurrent data flow loops facilitating applications in linear association or associative reasoning through recurrent networks.

One execution cycle is performed by enabling an execute command. This executive command may provide an option to enable decode only or both decode/encode functions within one execution cycle as is permissable within the holographic neural process. Internally, the neural engine may resolve initially all input cells whereby recurse cells copy the source data field onto their data field, followed by execution of the operator and neural cell groups in the order by which they have been configured. The speed of execution may be measured in connections per second where one connection refers to the correlation element or synaptic connection established between one element of a stimulus input field and one element of a response field. A neural engine described in this example of an embodiment is capable of performing approximately 1.2 Million connections/second and has been constructed employing the prior stated operational features.

Functional modules may be included within the general purpose neural system to permit modification of the neural configuration between executive cycles. Two illustrative examples of the type of modules that may be provided are memory and confmod. The memory functional module in this example may permit adjustment of memory profiles within cells belonging to the neural category. The confmod function facilitates limited control over neural "plasticity" whereby the user may interactively modify the confidence level associated with the confset operator cell (see Table 3) allocated within the neural configuration.

TABLE 5

List of Possible Executive Functions

| FUNCTION | DESCRIPTION |
| --- | --- |
| CONFMOD | Modifies confidence or magnitude component for data elements stored in the designated CONFSET operator cells output data field. |
| EXECUTE | Initiates an execution cycle within the neural engine. The neural engine may perform either encoding or decoding processes or both. |
| MEMORY | Modifies the memory profile of the correlation set generated and stored by neural cells. |
| SETEXE | Enables/disables specific groups of cells within the neural configuration. |
| SYSCLR | Clears the configuration of cells within the neural engine. |

(note - this list is merely illustrative and does not provide an exhaustive set of possible functions)

Data Transfer Between Host and Neural Engine

Several variational methods may be employed for porting data fields between designated cells within the neural engine and the host processor. An illustrative list is provided in Table 6 below. These data transfer operations may accommodate values expressed in either floating point or COMPLEX format to be ported to the neural engine from the host application program, and converted into the internal COMPLEX data type (if required). Typically, only the input category of cells define the cells written to within the neural engine. Functions performing the reverse data transfer operation (i.e. neural engine to host processor) are also supplied and may perform the reverse data conversion of COMPLEX to floating point.

TABLE 6

List of Possible Data and Memory Transfer Functions

| FUNCTION | DESCRIPTION |
| --- | --- |
| INPUT_FLT | Converts data from floating point format to neural engines internal COMPLEX format and ports the data into the designated cell within the neural engine. |
| INPUT_CPX | Ports data array containing elements in COMPLEX format from host processor into the neural engine. |
| OUTPUT_FLT | Ports a COMPLEX data field from the designated cell within the neural engine to host and processor and converts to floating point format. |
| OUTPUT_CPX | Ports data field from a designated cell in the neural engine to host processor in COMPLEX data format. |
| READMEM | Ports correlation data stored in a specific neural cell to the host processor. |
| WRITEMEM | Loads correlation data stored in the host processor to a designated neural cell within the neural engine. |
| LOADMEM | Loads all correlation sets for the current neural configuration from a mass storage device to the neural engine. |
| SAVEMEM | Saves all correlation sets within the neural configuration to a mass storage device. |

Configuring the Neural Engine

The following sections illustrate some general programming structures that may be used in configuration of the neural engine. Again, operation of the neural engine is structured in two parts, that is, configuration code for setting up the neural engine, followed by the execution code performing tasks related to transferring data between host and the neural engine, and initiating execution cycles within the neural engine.

Feed Forward Neural Configuration

Figure 23A:
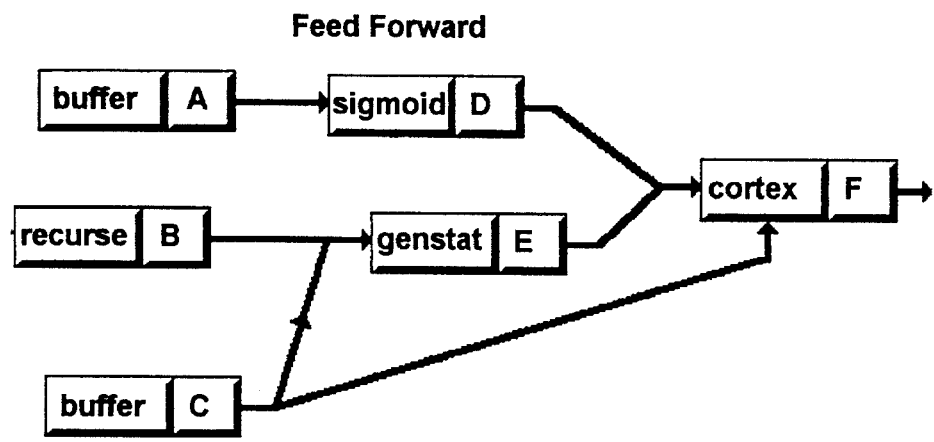
FIG. 23 illustrates various classes of possible neural configurations.
Figure 23B:
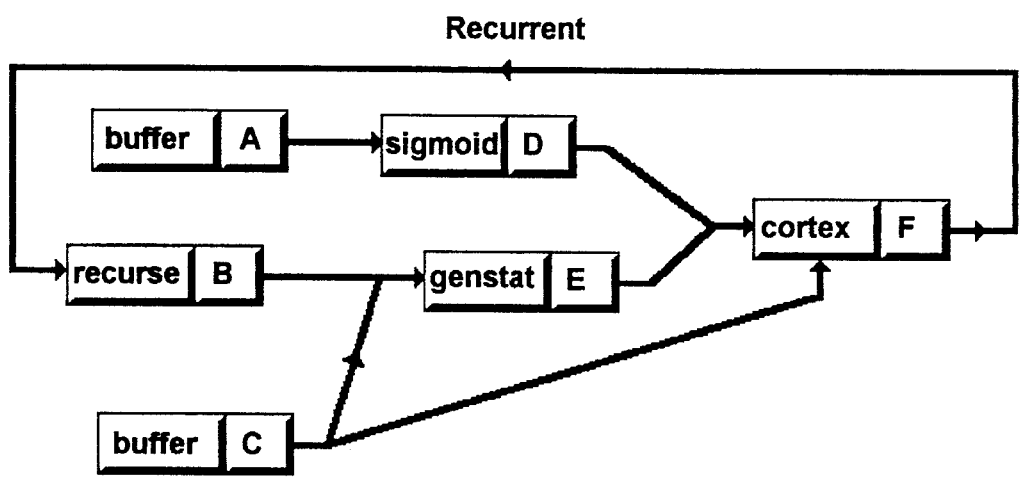
Figure 23C:
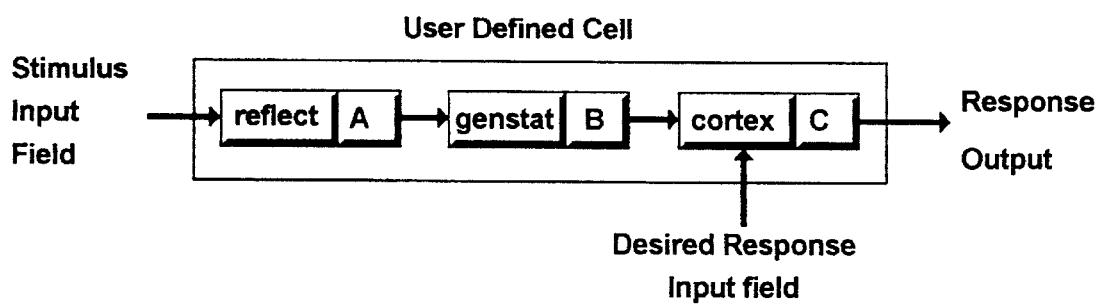

Any feedforward configuration at an arbitrarily defined level of complexity may be constructed within the neural engine, and permitting a high level of flexibility in establishing the data flow paths interconnecting these cells. The structure of a feedforward neural configuration is of the general form indicated in FIG. 23 where usually input cells are the first specified within the configuration. These input cells operate essentially as buffers for data transmitted from the host processor. The second stage in the configuration is typically allocation of operator cells, used to perform various preprocessing operations on the input data fields. Subsequent layers within the configuration are usually comprised of cortical cells, receiving stimulus and response fields from previous layers within the neural configuration. Multi-layered structures of cortex cells may be configured whereby the output or response fields from neuron cells may be fed into subsequent layers of cells. A simple feedforward configuration is indicated below. FIG. 23 illustrates a configuration which preprocesses stimulus data along a series of cells and transfers the desired response values to a cortex cell. This feedforward configuration can perform both the encoding (learning) and decoding (response) functions during one execution cycle. The configuration code required to program the neural configuration illustrated in FIG. 23 is presented below:

A=buffer(15, 12);
B=buffer(5, 5);
C=buffer (2, 1);
D=sigmoid(A);
E=genstat(2, 500, B, C, ENDLIST);
F=cortex(C, D, E, ENDLIST);

Recurrent Neural Configuration

A recurrent data flow structure defines a neural configuration in which the data output fields generated at higher layers within the neural system are fed back as input to cells within the same or lower layers. The neural engine kernel described herein facilitates recurrent data flow by use of the recurse input cell function. Any number of recurrent loops may be formed within a neural configuration, limited only by memory and cell allocation resource. The configuration code to establish the recurrent configuration illustrated in FIG. 23 is presented below:

A=buffer(15, 12);

B=recurse (5, 5, F);

C=buffer (5, 5);

D=sigmoid(A);

E=genstat(2, 500, B, C, ENDLIST);

F=cortex(C, D, E,ENDLIST);

Compound Cell Structures

A particular cell structure may be required many times within a neural configuration, this structure possibly consisting of multiple operator or cortical cell types. It may then be useful to construct a configuration call which internally structures the compound cell. A desirable feature is to allow the user to construct his own function for allocation of a compound cell structure, while conforming to the general pseudo code protocol. That is, a configuration call which is structured in a manner that it receives input data fields labels through its parameter list, and returns a label to the output data field, i.e. output_label=user_cell(parml, . . . parmN; input_label1, . . . , input_labelN); For instance, the following function establishes a cell structure in which input data is loaded from the output data fields of two cells, the conjugate evaluated for one data field (label_A) and expanded to second order terms. A function of this type may use the following format in its parameter list:

A=user_func(number, label_A, label_B)

This user defined function would return a single label to the output data field (A). This label corresponds to the output field for the final cell within the structure allocated by the user-defined function, in this case being a genstat cell. The above example requires the use of two implicit operator cells to perform the required functions, and the configuration code to allocate this user-defined cell structure may be as follows:

A=reflect(0.0, 100.0, label_A)

B=genstat(2, number, A, label_B, . . . ENDLIST);

This example of a compound neural cell structure is illustrated in FIG. 23 where a stimulus data field is read in, a vector reflection (conjugation) applied to 50% of the phase elements in the stimulus field and the set expanded to 3rd order statistics. The above composite cell structure is configured by the following sequence of configuration calls:

A=reflect(0.0, 50.0, stimulus);

B=genstat(3, 1000, A, ENDLIST);

C=cortex(des_resp, B, ENDLIST);

Embodiments of Application

The first stage, naturally, in designing any application is the specification of functional requirements. The type of application you may wish to design can fall into one of several categories (i.e. classification or pattern recognition, signal processing, process control, expert systems, data compression, simulation, forecasting, etc.). Each group of applications requires a somewhat specialized neural structure. A general purpose neural development system provides a high level of flexibility to accommodate nearly any type of configuration. The following indicates some general classes of applications and illustrates various neural configurations that may be designed to suit.

Pattern Classification System

Within the realm of pattern classification, the neural system designer must decide how to represent classification within the response field. For instance, the simplest means of classification would be to employ a binary scheme at the response, using phase orientations along the positive real axis (0) to represent one group and an orientation along the negative real axis ($\pi$) for the second classification group. This classification is of course quite limited and does not take advantage of the inherent analog nature of the holographic neural process. One should also note that in addition to phase information, the response indicates a confidence level (magnitude) whereby the network is capable of identifying stimulus which falls within the generalization region of previously learned mappings. The neural system responds to recognized stimulus generating close to unity confidence (magnitude) within the response value, and non-recognized stimulus with a low magnitude (<1.0) response vector.

Figure 24:
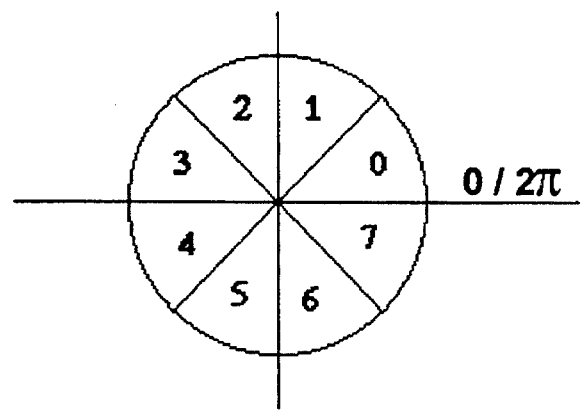
FIG. 24 illustrates descritization of the phase plane (8 regions).

For a slightly more advanced scheme, the phase plane for the response may be divided into an arbitrary number of phase regions, permitting a single neural cell to generate a corresponding number of classifications. One may employ multiple neural cells within a configuration permitting each cell indicating a base N value (where N is the number of phase regions). Considering a system in which the response plane has been segregated into 8 phase regions of equal size (see FIG. 24), each output within the response field would therefore indicate a number base 8 value.

Three response values descritized in manner as illustrated above would be capable of classifying up to 512 separate categories . In designing an application as above, some investigation into the mapping topology is required to determine the optimum threshold on magnitude (confidence) to be used to flag a recognition response, and prevent the neural system from classifying incorrectly. This threshold level establishes essentially a trade off between the neural systems ability to generalize, and its immunity to incorrect classification. Features within preprocessing stages, such as generation of higher order terms, may be modified to achieve optimum characteristics for classification within a given application.

Analog Control System

Far more sophisticated applications may be realized using holographic neural technology within analog control regimes. One example has been constructed indicating the analog control of a satellite navigational system whereby three neurons are configured to control pitch yaw and roll of a satellite in response to learned ground topographies. Current ANS methods do not lend themselves particularly well to analog control applications due to the nature by which most operate in a binary nature and are configured to operate in either a classification or heteroassociative mode. The holographic system, again, operates inherently in within an analog manner and is ideally suited to a wide range of analog control applications. The design of preprocessing stages is similar in most respects to the neural configuration for classification applications. The principal difference is in the manner in which the response field is structured.

Figure 25:
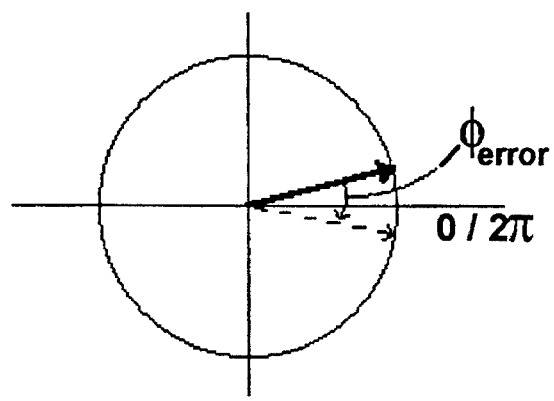
FIG. 25 illustrates the operation of traversing the phase boundary during response recall.

Response values may be defined within a continuous range varying between possibly unbounded limits. The principle consideration within this field of application is that typically analog control signals are defined by real values. The phase values generated by the neural engine however are defined within a closed range extending about $2\pi$. On translation of the internal phase data representation to the external real number system a $0/2\pi$ discontinuity establishes typically the external real valued boundary limits. On response recall, phase values which are oriented near to this 0/2π discontinuity boundary may express a small degree of response recall error. This error ($\phi_{error}$) can cause the generated output to flip over the discontinuity boundary (see FIG. 25). Response values close to this boundary and exhibiting sufficient recall error, may produce a spasmodic behaviour, whereby response values effectively oscillate between the maximum and minimum boundary limits within the external real number domain. In some sense, this spasmodic behaviour may be considered somewhat analogous to the neurological induction of muscle spasms experienced following excessive physical stress or activity. The above problem however can be resolved in several manners. The most direct being to establish a region or distribution of valid response values at a defined margin from the 0/2π discontinuity boundary. The appropriate margin may be determined from the error relationship between confidence level and phase error in the recall response considering both the encoding density and preprocessing structure of the neural system.

Figure 26:
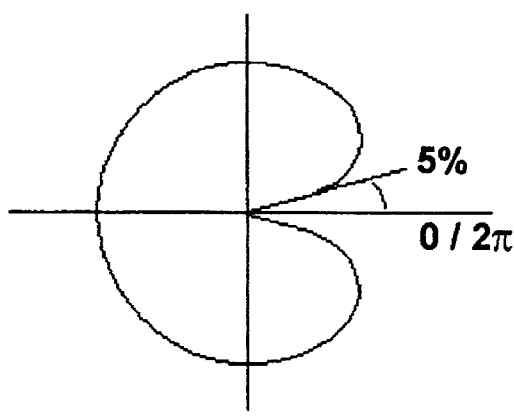
FIG. 26 illustrates a cardiodal distribution of phase elements within a data field.

For a defined neural configuration a relationship describing the variation in distribution of confidence (magnitude) as a function of the response recall error may be determined either empirically or from theoretical estimates. This estimate may be used to establish the confidence threshold value at which a response action is activated. For example, assume that the confidence threshold for a recognition response is set as 0.5. Empirical analysis over a data set may establish that at this confidence level, the variance in response recall error is approximately 5% of the phase range. To reduce this spasmodic behaviour in the analog response, one may map response phase components to a cardioid distribution, as illustrated by FIG. 26.

A second manner of dealing with this phase discontinuity problem may be to average the analog responses over several neural cells. The probability of crossing the 0/2π phase discontinuity is reduced in proportion to the number of response elements averaged. Say for instance, each response element has a 2% probability of crossing the boundary, and stimulus input fields to each neuron cell form a unique set. Averaging the output values over 3 stellate cells will reduce the probability of boundary crossing to approximately:

$3 * p^2$ or 0.12%

Figure 27:
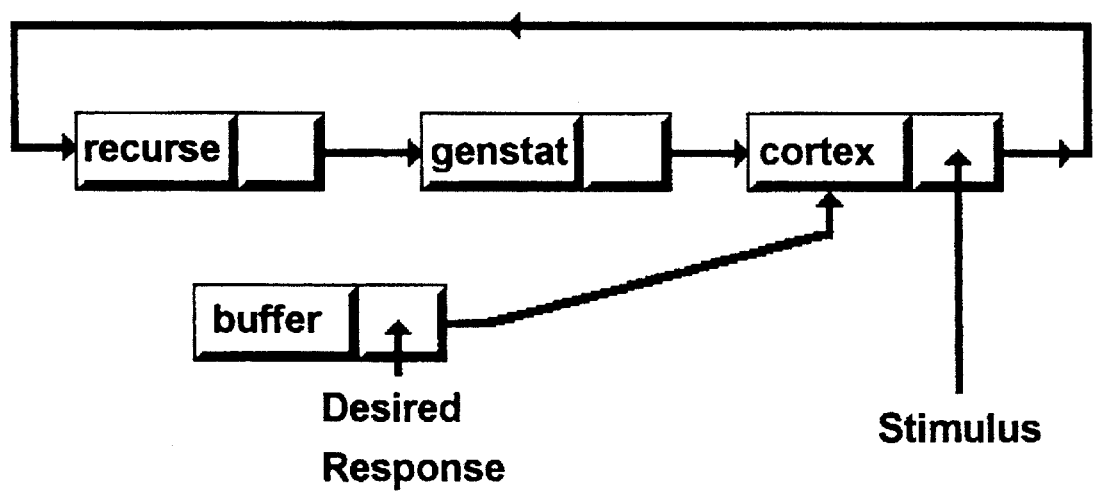
FIG. 27 illustrates a simple neural configuration for learning and response recall of spacio-temporal patterns.

One may conversely map the response output to a real value along a line intersecting the complex origin. This effectively eliminates any instability about the reference point as seen within the closed range, however, merges the confidence with the analog information aspect of the response mapping. Still more sophisticated applications may be realized due to the manner in which the holographic system follows the non-disturbance rule. One may map temporally varying associations onto the neural system where the inputs states of a current time step (i.e. time t) are mapped to the next incremental time step (t+1). In this manner a neural configuration may be constructed to both learn and express spatio-temporal patterns. FIG. 27 illustrates a neural configuration which may perform learning and expression of spatio-temporal patterns. This type of capability may be applied towards applications related to control of robotic movement where the neural system may both learn and express sequences of movements relating current position and rate of change to effector response.

The generalization and characteristics permit the user to construct spatic-temporally based control systems which exhibit high stability of operation, Stability in this sense indicates a control system capable of setting into motion a spacio-temporal movement sequence and display a high immunity to distortion of the initial starting state. Similarly for such systems, an expressed sequence will stably converge to the learned spatic-temporal pattern following a disturbance due to say an obstruction. Control systems of this type would typically operate in a feedback manner where the current state vector is fed hack into the neural system to produce the next movement sequence. Depending upon the size of the cortical cell (i.e. number of stimulus inputs) and order of terms evaluated in its operation, very large numbers of spatic-temporal patterns may he enfolded onto the identically same set of neural cells. Within this control scheme, one may usefully apply other time dependant factors (i.e. rate, acceleration) over the input state vector.

Expert Systems

The current mainstream of artificial intelligence applications are based on heuristic methods. Heuristics is a term used to define the concept of rule based programming. In general, the approach applying multiple decision or "inference" rules against input states in order to issue a seemingly intelligent response. Heuristics was initially employed within the field of game playing (i.e. chess) and displayed particularly impressive results. Rule based programming has become the mainstream of AI research and has found more practical applications within the field of expert systems. The principle drawback with the heuristic approach is that decision or inference rules must he applied in a largely sequential fashion prior to arriving at a given decision or outcome. For expert systems operating within applications involving some degree of complexity, the number of rules and thus search time required increases dramatically, thus limiting the capabilities of the rule based approach.

Figure 28:
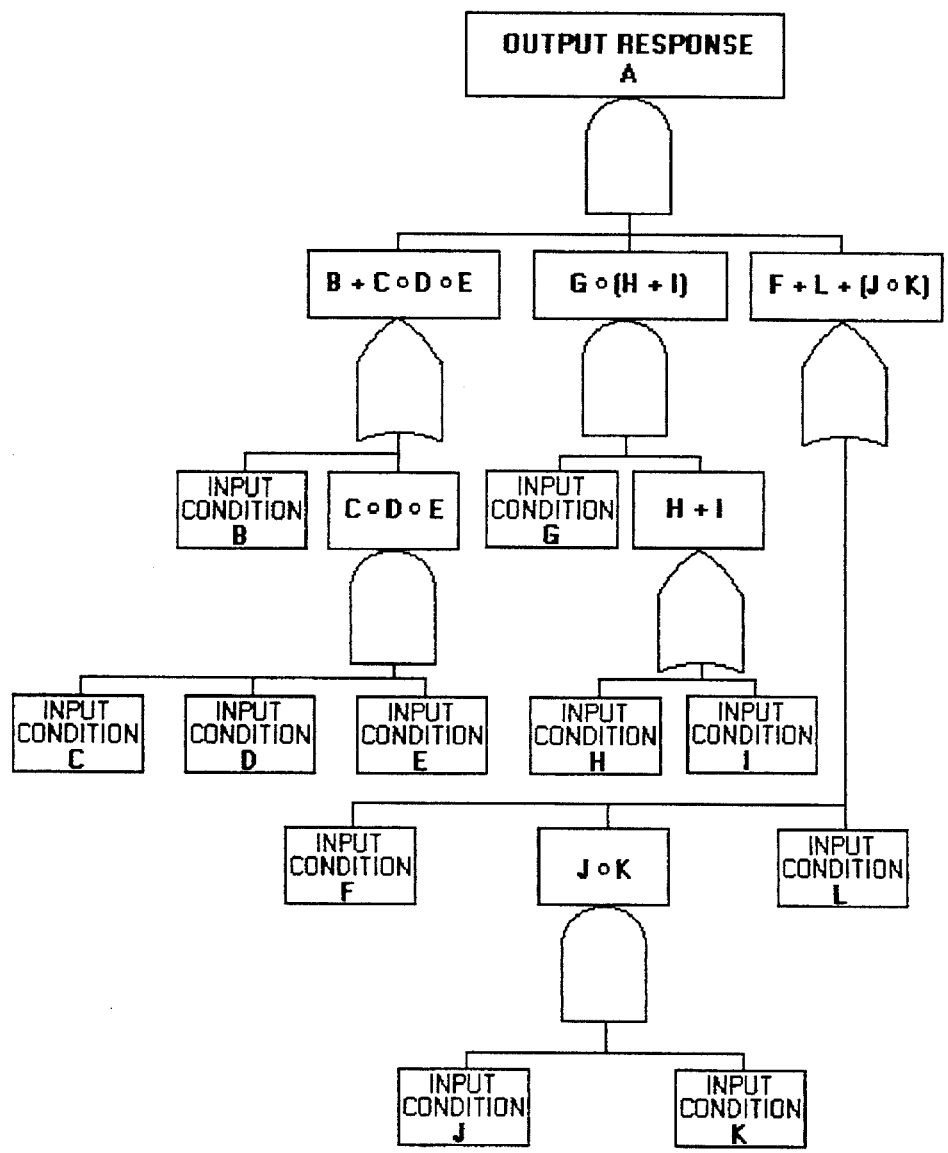
FIG. 28 is an example of a heuristic based decision tree.

A simple analogy between the holographic neural process and functional aspects of the heuristic technique shall be made using the general concept of the decision tree. The form of the decision tree is represented in FIG. 28. The top event is defined as one possible outcome, and the branching network below describes the boolean relationship which arrives at this top event. The boolean tree describes all conditioning inputs leading to the top decision event in the form of AND (.) and OR (+) relationships (in the simplest case). Multiple decision trees are employed within any expert systems and the desired output decision arrived at by a combination of forward or backward chaining rules. In the example given here:

Event $A$ is true IF $[B + (C \cdot D \cdot E)] \cdot$
$[G \cdot (H + I)] \cdot$
$[F + L + (J \cdot K)]$ Applying a boolean cutset reduction to the decision tree given in the above example yields the following result:

1. $B \cdot G \cdot H \cdot F +$
2. $C \cdot D \cdot E \cdot G \cdot H \cdot F +$
3. $B \cdot G \cdot I \cdot F +$
4. $C \cdot D \cdot E \cdot G \cdot I \cdot F +$
5. $B \cdot G \cdot H \cdot L +$
 . " " "
 . " " "
 . " " "
12. $C \cdot D \cdot E \cdot G \cdot I \cdot J \cdot K$ Each of the above minimal cutsets (1 to 12) consists of a series of anded conditions, in other words, states occurring simultaneously in time which lead to the top event or decision. Assuming that each of the input states may in some way be represented by a series of real valued numbers, the above cutsets or "input scenarios" may be enfolded into a neural element in the form of stimulus-response associations, the response being the decision or top event in the logic tree. The holographic neural process provides an enormous capacity for storage of stimulus-response associations and is capable of generalizing about these associations. This holographic neural methodology facilitates a means for replacement of extremely large and complex rule based systems. Again, very large numbers of associations or rules may be enfolded within the holographic neural system. Expression (decoding) operates in a manner that the highest correlated response or decision is arrived at in an inherently parallel manner. Employing this method, the generated output intrinsically generates a level of confidence (magnitude) within the response decision.

A further application for the holographic neural system falls within the realm of associative reasoning. A form of association may be performed within a recurrent structure in which multiply connected stimulus-response associations are enfolded onto the identical array of neuron cells. One may for instance encode a set of stimulus-response associations connected in time. These events may correspond to connected pairs of visual objects. A series of associations relating states connected in time may be enfolded within the identically same array of neuron cells. Consider the following case in which a series of states (say images A to F, as indicated below) are encoded onto a recurrent neural structure.

|       | stimulus |    | response |
|-------|----------|----|----------|
| state | A        | →  | B        |
|       | D        | →  | E        |
|       | B        | →  | F        |
|       | E        | →  | A        |

Establishing a recurrent loop within the neural configuration provides the ability to regenerate on each execution cycle, one association pair within a linear sequence of associations. For instance, from the above set of associations, state D is indirectly associated to F. Following learning of the above association pairs, one may expose the recurrent neural system to an input state, say B. On multiple execution cycles the neural engine will re-express the stimulus-response associations in the proper connected order, i.e.

| cycle | 1 | D | → | E |
|-------|---|---|---|---|
|       | 2 | E | → | A |
|       | 3 | A | → | B |
|       | 4 | B | → | F |

The above capability has direct implications within expert or automated reasoning systems operating in a manner analogous to an inference engine. The advantage naturally is that several inference rules may be enfolded onto the same neuron cell, and the, input states are effectively processed through all of these enfolded rules, again in an inherently parallel manner. The above may easily be extended to more sophisticated examples in which many more associations rules are enfolded and several distinct and/or disjoint paths of linear association may be expressed within the recurrent data flow structure.

This above recurrent structure may also be useful in image compression for sets of images which vary by a relatively small degree between consecutive frames. It is expected that for a sequence of visual images varying in a continuous manner, such as that encountered in a video recording, reasonable high data compression ratios could be attained with little degradation in gray scale resolution. This method may be applied to any form of data reduction involving spatio-temporal patten sequences which vary in a continuous manner (i.e. visual or auditory data streams).

Simulation/forecasting

Figure 29:
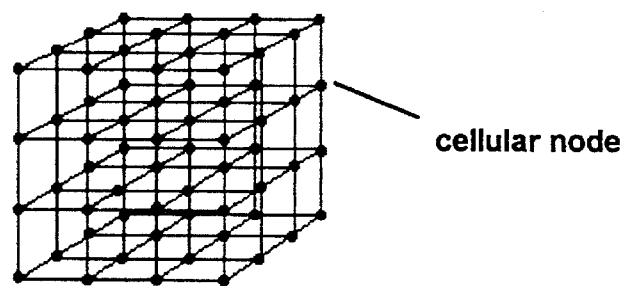
FIG. 29 is a simple example of a mesh cellular structure as applied towards simulation applications or finite element analysis.

Generation of higher order statistics permit the designer to construct a neural system whereby the entire stimulus input space is virtually mapped out to desired response values or functions. Applications may be extended to analysis or simulation, whereby neurons can function as nodes within a finite element analysis, receiving input conditions from proximally located nodes within the mesh structure (see FIG. 29).

As in standard finite elements analysis schemes, a node (or cell) may read its input state conditions from a number of adjacent nodes of current or previous time steps. One principle advantage may be realized in that the neural system is capable of generating highly complex input/output state functions by allowing it to "learn" the set of parametric conditions from either simulation or model mockup. The holographic process may permit the entire input/output state conditions for one node to be mapped onto a neural cell. The neural engine as revealed herein can accommodate a plurality cells and permits these cells to be interconnected in various mesh structures.

The above process may be usefully applied towards forecasting, whereby state conditions are applied from previous time steps. Useful applications may be in relation to weather forecasting, thermohydraulic analysis, stress analysis, etc.

Control System(robotics/navigation)

The following illustrates one possible application within the domain of analog control for navigational and/or robotic systems. This particular example of an analog control system has been applied to navigational control. The stimulus field is obtained from simulated ground topographies, these (sensor) inputs are encoded or mapped to an arbitrarily assigned set of axial and positional coordinates for pitch, yaw, and roll within a satellite. One response value controls each of the three stated coordinate axes. The simulation encodes a plurality of topographies to satellite movement control mapping in a linear sequence, where each mapping of topographical stimulus data and desired positional response of the satellite is enfolded within the cells correlation set.

Figure 31A:
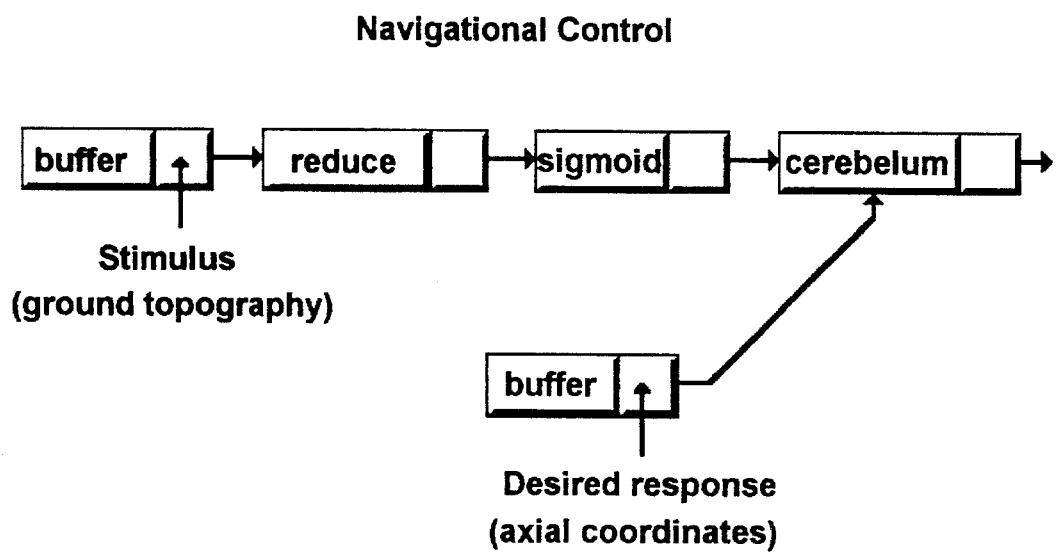
FIG. 31 illustrates one possible neural configuration for control applications or recurrent association.
Figure 31B:
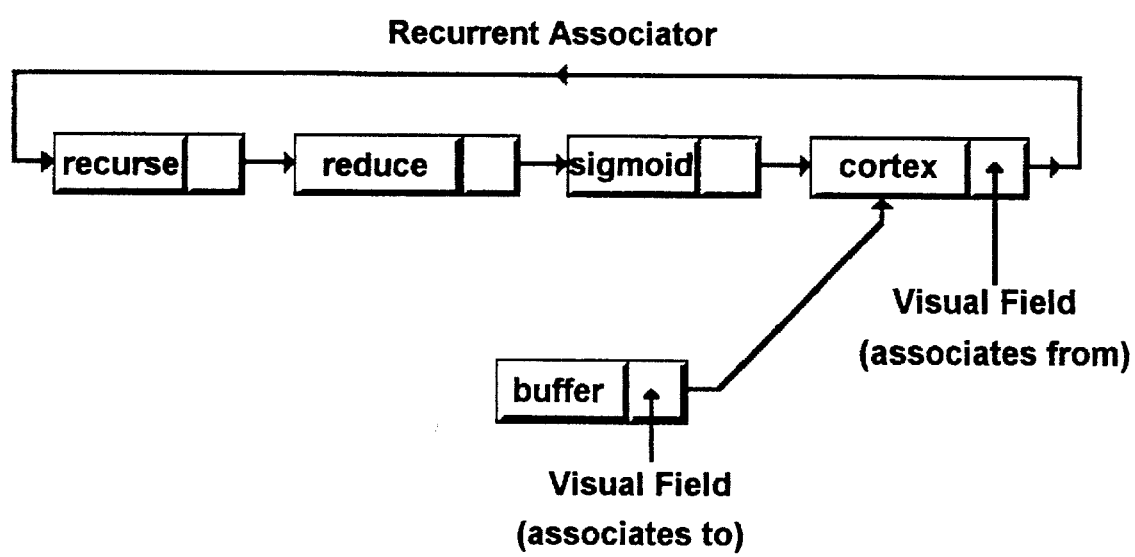

The configuration for this neural system is illustrated in FIG. 31. Raw stimulus data is comprised of a 48 by 48 data field representing ground elevations. This input field is reduced to an 8 by 8 data field and a sigmoid cell allocated to redistribute phase elements using the relatively straightforward transform described in [5]. Sufficient levels of symmetry are achieved over most classes of distributions using this pre-processing transform, particularly for cases where distributions are of approximately Gaussian form (as in most naturally occurring distributions). The data field from the sigmoid cell is then fed into a cerbelum cell stimulus field. This cell has been configured to expand its input stimulus field to second order statistics. The neural process implements a one pass encoding/mapping from the stimulus field (ground topography) to the desired response navigational control coordinates.

Similar concepts may be applied to any type of control system, particularly for the case in which the input field is highly complex. Holographic neural based control may, for instance, be similarly applied to automatic guidance, robotic control, multivariable process control, or monitoring applications.

Automatic Targeting and Recognition (visual)

This illustration of a possible embodiment indicates capabilities in visual targeting and recognition using two cerbelum cells, each having stimulus fields of 250 and 500 synaptic inputs respectively. During the training session, the neural system may index through the suite of visual images, displaying each image on the screen. The user teaches the neural system the set of visual associations and targeting movements by positioning the cross hairs to target an arbitrary object within each visual frame and specifying an ASCII tag to associate with that object. Training on each object may be performed only once (no reinforcement learning). During the decoding (response recall) process, images may be randomly retrieved from the visual data base and processed through the neural configuration for both targeting and identification responses. One cerbelum cell is used to encode the coarse positional orientation of the object and one cell is used for fine targeting and identification. Different processes are used within each of the coarse and fine targeting subsystems as described following.

Coarse Targeting Subsystem

This portion of the neural configuration receives possibly a 64 by 64 pixel array as the stimulus field. The neural configuration of the coarse targeting subsystem is presented in FIG. 30. A reduce function configures an operator cell which averages the input visual field down to an 8 by 8 pixel field. The output from this cell is processed through a sigmoid operator cell to redistribute phase elements to a symmetrical distribution. The output field from this cell is then fed into the stimulus field of a cerbelum cell which expands its stimulus input field to 500 third order statistics. This stimulus field is associated to the coarse x/y targeting position of the visual object supplied by the user. In this subsystem then, the entire visual frame provides the stimulus field and the encoded response is associated to the value indicating the approximate position of the object within the visual frame. On decoding, this neural configuration operates in a peripheral capacity to provide approximate targeting of the object. The second subsystem is then actuated to perform fine targeting and identification (recall of ASCII tag) functions.

Fine Targeting and Identification Subsystem

This subsystem is again comprised of a cerbelum cell and executes fine targeting of the object and identification. Targeting within this configuration is performed in a fundamentally different manner than the coarse targeting system described above. In this system, the magnitude component of the generated response vector is used to determine if the cell recognizes an object that has been previously encoded. In other words, for an object which has been previously learned, the expressed magnitude (confidence level) on response recall (decoding) is approximately unity while non-recognized objects express a much reduced magnitude. Targeting systems may employ this feature usefully in expression of confidence (magnitude) by scanning a window over the visual field and monitoring the magnitude of the expressed response. For a response magnitude indicating a high confidence level (close to unity), the probability is high that the cell is targeted precisely upon an object it has previously learned. Similarly, the phase components for the generated response vectors indicate an analog value which can be used to classify or identify the object.

Figure 30A:
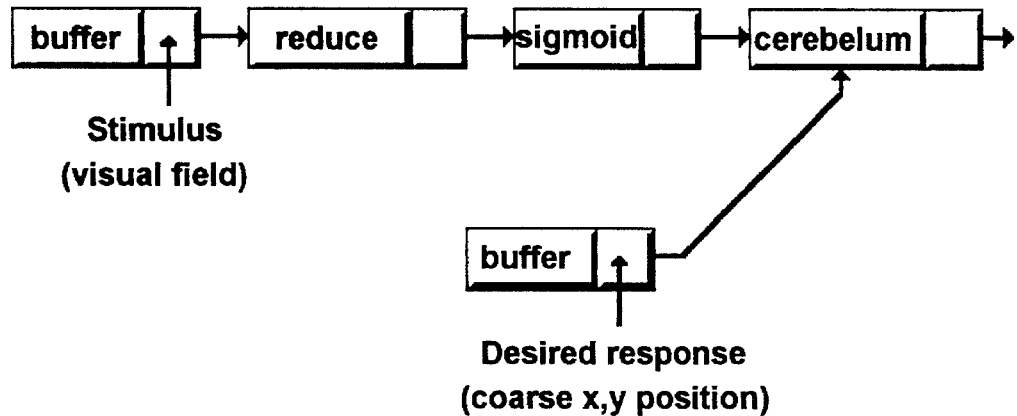
FIG. 30 illustrates one possible neural configuration for construction of an automatic target recognition application.
Figure 30B:
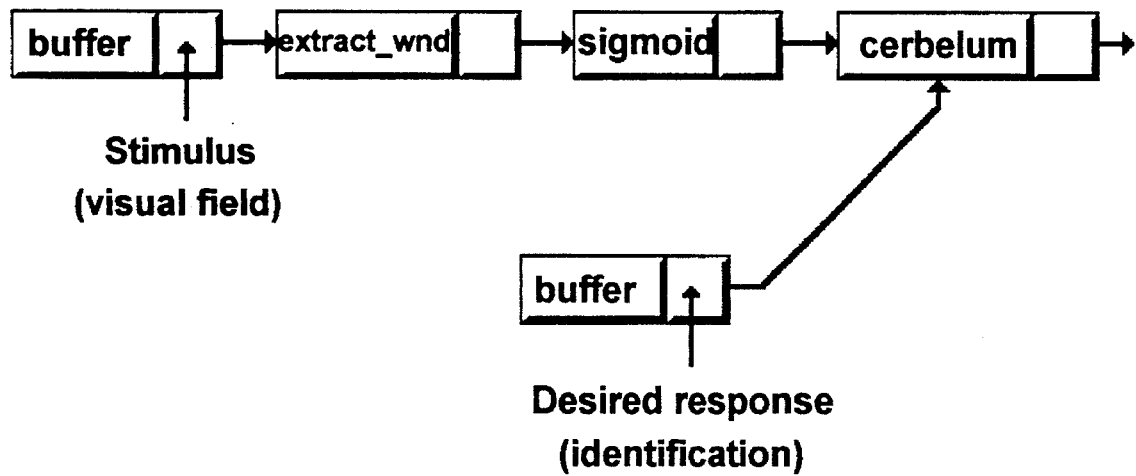

Within this simple ATR configuration, the two neurons perform both tasks of targeting and identification. The configuration for this subsystem is illustrated in FIG. 30. The stimulus field is obtained from an 8 by 8 window placed within the 64×64 visual frame. The second stage of preprocessing redistributes the phase elements via the sigmoid operator function. The output data field from this cell is then expanded to 250 fifth order statistics within the cerbelum cell. For identification, the response phase angles from the cerbelum cell are separated into four phase regions of equal size. This permits each response element (of which there are three) to generate a base 4 numeric digit. Three neurons may then be used to identify or generalize to 64 separate images.

On decoding (response recall), this subsystem uses the coarse targeting subsystem to obtain an approximate location for the object, and then scans along a 9 by 9 axis about that position to determine the exact location of the object. In some senses the coarse targeting subsystem functions as the peripheral vision and the second subsystem emulates aspects of the central region within the retina. It is expected that in expanding this rather simple neural configuration to larger sizes and/or higher order systems, considerably greater numbers of images may be learned.

Response testing using dynamically varying visual frames indicate that highly ideal generalization over visual data is readily attained using the holographic neural process. High speed of operation is exhibited by the capacity to enfold a plurality of visual inputs to targeting/identification associated responses onto the identically same correlation set. Generalization properties exhibited within the holographic process permit one to construct systems capable of accurate recognition and targeting of learned images having undergone high levels of distortion in scale and rotation. This capability, although normally intractable, is straightforward to implement within the holographic neural system using relatively few neural cells.

A distinct advantage of the holographic system is realized whereby multiple representations of an image over wide ranges of scale and rotational translation may be encoded to the same response association. The neural cells essentially build up a mapping of the object, in all of its visual orientations, to the associated response. Identification may then proceed, irrespective of the orientation of the object to be identified.

Linear Associative Memory

This example illustrates a simple exercise in associative reasoning. Such methods may be applicable to expert systems or control applications. Associative reasoning may be performed by configuring recurrent loops within the neural configuration where associations encoded within the cell essentially unfold as data fields flow recursively through the network. Configuring holographic cells within a recurrent loop is, in a very coarse sense, analogous to the Hopfield net or Bi-directional Associative Memory models. The operational characteristics of this recurrent configuration, based on holographic principles however, indicate capabilities far in advance of either of the above prior art methods.

The holographic network is capable of enfolding associations in the sense that input of one pattern prototype will induce the issuance of the second. Patterns generated within a recurrent data flow may express a linear sequence of associations, each pattern association connected through its encoding within one temporal frame (i.e. associations are linked by their proximity in time). This process of linear association may be considered to be somewhat analogous to the associative reasoning processes in animal cognition, where a thought train may be expressed through a sequence of associations initially linked in time. For example, the image of a fork may invoke the impression of eating, subsequently invoking an impression response associated with turkey or roast dinner etc. In this manner the holographic system courses through a sequence of sensory impressions, each of which has been formed by associations temporally connected.

This feature is characteristic only of the holographic process due to the manner in which highly accurate responses are generated on a single pass decoding transformation. An illustration has been constructed to emulate this characteristic of linear association. The example constructed consists of a cortex cell arranged within a recurrent structure as illustrated in FIG. 31. The response field from this set of neural cells is averaged down to a 8 by 8 array and fed back into the stimulus input field for the cortex cell. During encoding, a sequence of 20 related images are exposed o the network. These associations are somewhat arbitrary; however, pairs may be constructed that embody some form of practical association. These association pairs are encoded in a manner that supplying the stimulus field with one pattern will evoke a response in generating the associated output image.

During the decoding (or expression) phase of the program, one of the images is exposed to the network. On each iterative execution cycle the cortex cell expresses one association within a linear sequence of connected associations, with output being fed back into input, and regenerating a sequence of patterns along multiple execution cycles in the proper temporally connected order. This example may actually encode multiply disconnected trains of visual associations within the same cell. Depending on which initial patterns you present to the neural engine, the system will course through one of the connected trains of visual associations.

One may apply similar recursive techniques within expert systems, to facilitate capabilities in associative reasoning. Similarly, within an expert system application, one may view the input field not as visual images but input state conditions. For instance, one input field consisting of say 1000 values may store the input state conditions for a particular system. The holographic system may enfold a vast number of scenarios for those state conditions and associated responses onto the neural system. In this manner the expert system need not parse through a logical or heuristic tree structure. The holographic process permits all input/output scenarios to be enfolded onto the same correlation elements, and one stimulus pass through the neural system will generate the closest associated response.

Data Compression

This neural configuration may also provide applications in signal compression as applied to video images, for instance. Considering that video frames are updated approximately 30 frames per second, and that the difference between consecutive frames is generally quite small, the holographic system may be applied to enfold a sequence of video frames and subsequently re-express them in the manner indicated above. If the neural system is optimally configured, re-expression of these enfolded video frames can be performed with little or no signal distortion. It is expected that reasonably high data compression ratios may be achieved using the described holographic neural method to enfold adjacent frames over a temporal axis, particularly when optimization is performed on the correlation set to select only the elements of the correlation set (synapses) of large magnitude (i.e. $x_{i,j}>$a preselected threshold).

I claim:

1. An artificial, auto-associative memory storage device for retrievably storing a response together with an associated at least one input analog stimulus, each response and stimulus having respective ones of representative, pre-assigned complex polar values, said device comprising:

a re-writable correlation substrate including a quantum of required physical storage space for storing a addressably mapped, congruous stimulus-response association thereon, wherein said association is thus stored as an initial correlation value which is the outer product of:
the conjugate of the stimulus one of said preassigned values; and,
the response one of said pre-assigned values, and, whereby said association represents a certain contemporaneous state of association between said input analog stimulus and said response;

a data bus, for conveying data received by or transmitted from said storage device, to and from said substrate, said data bus being connected in data communicating relation with said substrate, whereby said correlation substrate is subsequently addressably re-written responsive to supervisory intervention input delivered through said bus as a congruency-enhancing association between said at least one input analog stimulus and a predetermined desired response, each having respective, representative ones of a pre-assigned subsequent stimuli and desired response complex polar values which are combined as an inner product of said subsequent stimulus value through said initial correlation value to yield a transformed response value having a measurable vector difference value from said desired response value, which vector difference value is in turn used to perform an element by element vector addition to said initial correlation value to yield said enhanced-correlation value;

whereby, said enhanced, mapped association is stored on said substrate by replacing said initial correlation value with said enhanced correlation value, to thereby enhance the addressable information content stored within a quantum of re-written storage space equal in size to said quantum of required space.

2. The memory storage device according to claim 1 wherein said response, and an associated plurality of stimuli arranged as an N×1 set, are represented by respective ones of said pre-assigned complex polar values, and are addressably mapped as a single pattern of congruous stimulus-response associations on said re-writable correlation substrate, as a correlation set of correlation values of a corresponding N products of the conjugate of a selected one of said response or stimulus values, and the other of said response or stimulus values, wherein said mapped association represents a certain contemporaneous state of association between said input analog stimuli and said response.

3. The memory storage device according to claim 2 wherein an N plurality of temporally sequenced associations, are mapped as a corresponding plurality of mutually temporally unique patterns arranged as a corresponding plurality of respective correlation sets, and are addressable mapped in superposed relation as a set of congruous stimulus-response association on said re-writable substrate, as a correlation matrix containing N elements corresponding to respective ones of summations of correlation values in each of said correlations sets, wherein said plurality of mapped associations stored on said correlation substrate represent a certain most contemporaneous state of association between each of said input analog stimuli and said response.

4. The device according to claim 3, further including a neural processing engine connected in data communicating relation to said memory storage device and operable to receive analog stimulus input data, and assign and manipulate representative complex polar values thereof, and to communicate same to said storage device.

5. The device according to claim 4 wherein said engine comprises a compound neural processing cell architecture.

6. The device according to claim 5 wherein said engine includes selected ones of input buffer cells for storing data received from a processor; operator cells for receiving input data and performing a predetermined operation on said data, and storing a result generated through said predetermined operation; and, a neural cell comprising an at least one memory storage device according to claim 1.

7. The device according to claim 5 wherein at least some of said cells are mutually commutatively interconnected.

8. The device according to claim 5 wherein said cells are configured in a feed forward architecture.

9. The device according to claim 5 wherein said cells are configured in a concurrent architecture.

10. The device according to claim 4 wherein said neural engine is a virtual device operable in a general purpose computer.

11. The device according to claim 10 wherein said general purpose computer comprises an at least one hardware processing node, and a data bus, arranged in complex value signal communicating relation, for routing said signals between said processing node and said memory storage device.

12. The device according to claim 10 wherein a plurality of hardware processing nodes are co-operable in conjunction with distributed processing control means.

13. The device according to claim 4 wherein said engine and storage device comprise a pattern classification device.

14. The device according to claim 4 wherein said engine and storage device comprise a spatio-temporal learning system comprising a recurrent network architecture of processing cells.

15. The device according to claim 14 wherein said engine and storage device comprise an analog control signal generation system.

16. The device according to claim 4 wherein said engine and storage device comprise an expert system.

17. The device according to claim 4 wherein said engine and storage device comprise an analog simulation and forecasting system.

18. The device according to claim 4 wherein said engine and storage device comprise a navigational control system.

19. The device according to claim 4 wherein said engine and storage device comprise an automatic target recognition and targeting control system.

20. The device according to claim 4 wherein said engine and storage device comprise a linear associative memory system.

21. The device according to claim 4 wherein said engine and storage device comprise a data compression system.

* * * * *